(12) United States Patent
Ochiai et al.

(10) Patent No.: US 10,978,710 B2
(45) Date of Patent: Apr. 13, 2021

(54) ELECTRODE, POWER STORAGE DEVICE, ELECTRONIC DEVICE, AND MANUFACTURING METHOD OF ELECTRODE

(71) Applicant: SEMICONDUCTOR ENERGY LABORATORY CO., LTD., Atsugi (JP)

(72) Inventors: Teruaki Ochiai, Kanagawa (JP); Takahiro Kawakami, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 88 days.

(21) Appl. No.: 16/374,785

(22) Filed: Apr. 4, 2019

(65) Prior Publication Data

US 2019/0229340 A1 Jul. 25, 2019

Related U.S. Application Data

(62) Division of application No. 14/977,888, filed on Dec. 22, 2015, now Pat. No. 10,256,470.

(30) Foreign Application Priority Data

Dec. 26, 2014 (JP) ................. 2014-264159

(51) Int. Cl.
*H01M 4/62* (2006.01)
*H01G 11/30* (2013.01)
(Continued)

(52) U.S. Cl.
CPC .......... *H01M 4/622* (2013.01); *H01G 11/30* (2013.01); *H01G 11/46* (2013.01); *H01G 11/50* (2013.01);
(Continued)

(58) Field of Classification Search
CPC ...... H01M 4/622; H01M 4/505; H01M 4/623; H01M 4/366; H01M 4/1391; H01M 4/583;
(Continued)

(56) References Cited

U.S. PATENT DOCUMENTS 4,302,518 A 11/1981 Goodenough et al.
4,668,595 A 5/1987 Yoshino et al.
(Continued)

FOREIGN PATENT DOCUMENTS

EP 1909345 A 4/2008
EP 2615673 A 7/2013
(Continued)

OTHER PUBLICATIONS

Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.
(Continued)

*Primary Examiner* — Ula C Ruddock
*Assistant Examiner* — Matthew W Van Oudenaren
(74) *Attorney, Agent, or Firm* — Nixon Peabody LLP; Jeffrey L. Costellia

(57) ABSTRACT

A power storage device with excellent charge and discharge characteristics. A power storage device in which a decrease in capacity in charge and discharge cycles is inhibited. An electrode which includes a current collector and an active material layer and in which the active material layer includes an active material and a binder and the binder includes polybenzoxazine. An electrode that includes polybenzoxazine and another material as a binder. A basic material may be used as the active material. The electrode may be formed under high temperatures.

9 Claims, 35 Drawing Sheets

(51) Int. Cl.
*H01G 11/46* (2013.01)
*H01G 11/50* (2013.01)
*H01M 4/36* (2006.01)
*H01M 4/505* (2010.01)
*H01G 11/48* (2013.01)
*H01M 4/1391* (2010.01)
*H01M 4/583* (2010.01)

(52) U.S. Cl.
CPC .......... *H01M 4/366* (2013.01); *H01M 4/505* (2013.01); *H01M 4/623* (2013.01); *H01G 11/48* (2013.01); *H01M 4/1391* (2013.01); *H01M 4/583* (2013.01); *Y02E 60/13* (2013.01)

(58) Field of Classification Search
CPC .. H01M 4/8668; H01M 4/8673; H01M 4/621; H01M 4/624; H01M 4/625; H01M 4/626; H01G 11/30; H01G 11/46; H01G 11/50; H01G 11/48
See application file for complete search history.

(56) References Cited

U.S. PATENT DOCUMENTS

| | | |
|---|---|---|
| 5,443,929 A | 8/1995 | Yamamoto et al. |
| 5,783,333 A | 7/1998 | Mayer |
| 5,834,139 A | 11/1998 | Shodai et al. |
| 5,871,866 A | 2/1999 | Barker et al. |
| 5,910,382 A | 6/1999 | Goodenough et al. |
| 6,085,015 A | 7/2000 | Armand et al. |
| 6,514,640 B1 | 2/2003 | Armand et al. |
| 7,393,476 B2 | 7/2008 | Shiozaki et al. |
| 7,927,506 B2 | 4/2011 | Park |
| 7,935,270 B2 | 5/2011 | Park |
| 8,153,297 B2 | 4/2012 | Ohzuku et al. |
| 8,241,790 B2 | 8/2012 | Ohzuku et al. |
| 8,557,440 B2 | 10/2013 | Yu et al. |
| 9,203,077 B2 | 12/2015 | Oh et al. |
| 9,666,326 B2 | 5/2017 | Kawakami et al. |
| 2001/0010807 A1 | 8/2001 | Matsubara |
| 2002/0195591 A1 | 12/2002 | Ravet et al. |
| 2004/0234857 A1 | 11/2004 | Shiozaki et al. |
| 2006/0051671 A1 | 3/2006 | Thackeray et al. |
| 2006/0121352 A1 | 6/2006 | Kejha et al. |
| 2007/0026315 A1 | 2/2007 | Lampe-Onnerud et al. |
| 2007/0099086 A1 | 5/2007 | Kang et al. |
| 2007/0122712 A1 | 5/2007 | Kang et al. |
| 2007/0160906 A1 | 7/2007 | Tooyama et al. |
| 2007/0212609 A1 | 9/2007 | Iwami |
| 2009/0087731 A1 | 4/2009 | Fukui et al. |
| 2009/0117440 A1* | 5/2009 | Choi .................. C08J 5/2256 429/500 |
| 2009/0123813 A1 | 5/2009 | Chiang et al. |
| 2009/0220862 A1 | 9/2009 | Toyama et al. |
| 2010/0233542 A1 | 9/2010 | Endo et al. |
| 2011/0189583 A1* | 8/2011 | Imai .................. H01M 4/9075 429/482 |
| 2011/0229757 A1 | 9/2011 | Kawakami et al. |
| 2011/0294009 A1 | 12/2011 | Kawakami et al. |
| 2013/0316237 A1 | 11/2013 | Miki |
| 2014/0332715 A1 | 11/2014 | Kawakami et al. |
| 2015/0014581 A1 | 1/2015 | Kawakami et al. |
| 2015/0014605 A1 | 1/2015 | Kawakami et al. |
| 2015/0099179 A1 | 4/2015 | Ikenuma et al. |
| 2015/0325855 A1 | 11/2015 | Kawakami et al. |

FOREIGN PATENT DOCUMENTS

| | | |
|---|---|---|
| JP | 08-037007 A | 2/1996 |
| JP | 11-025983 A | 1/1999 |
| JP | 2004-087487 A | 3/2004 |
| JP | 2006-265433 A | 10/2006 |
| JP | 2007-002113 A | 1/2007 |
| JP | 2008-091341 A | 4/2008 |
| JP | 2008-166156 A | 7/2008 |
| JP | 2009-021400 A | 1/2009 |
| JP | 2009-057437 A | 3/2009 |
| JP | 2011-060559 A | 3/2011 |
| JP | 2012-009418 A | 1/2012 |
| JP | 2013-541142 | 11/2013 |
| JP | 2014-237579 A | 12/2014 |
| JP | 2015-082374 A | 4/2015 |
| WO | WO-2013/108396 | 7/2013 |
| WO | WO-2014/181885 | 11/2014 |

OTHER PUBLICATIONS

Tamura.T et al., "First-principles Study of K-edge XANES for Li-rich layered cathode material", AMTC Letters, May 1, 2012, vol. 3, p. 2pages.

* cited by examiner

FIG. 4A
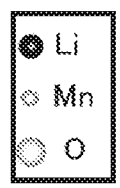
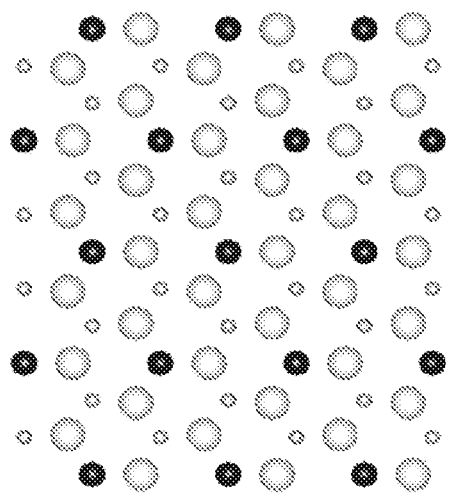
[-1 0 0] ←
FIG. 4B
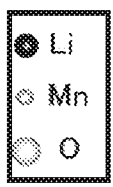
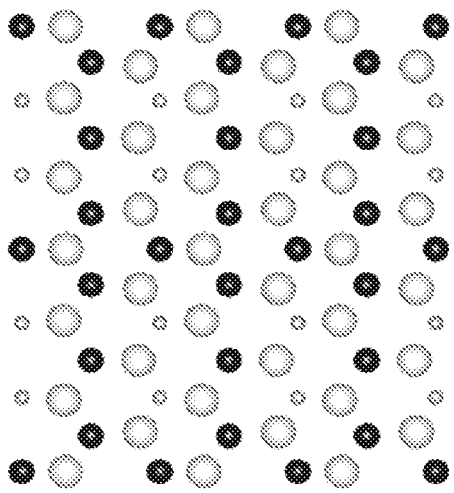
[0 -1 1]
[0 0 -1] ←
[0 1 1]

FIG. 19A1 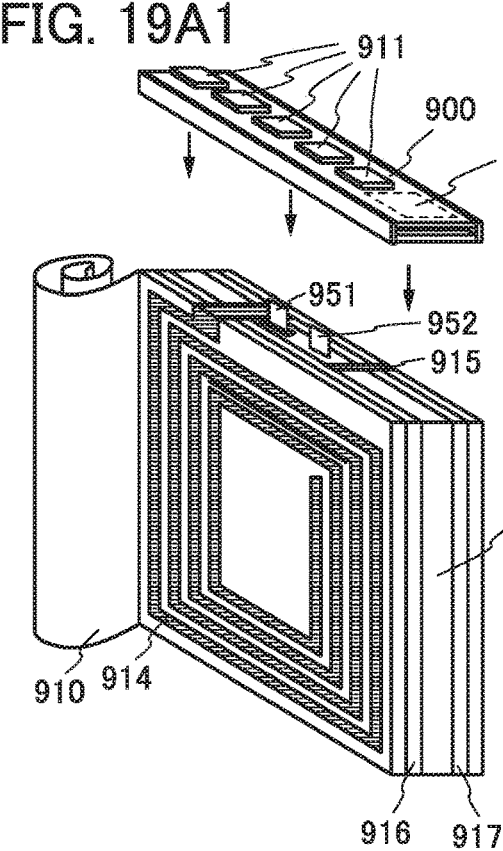
FIG. 19A2 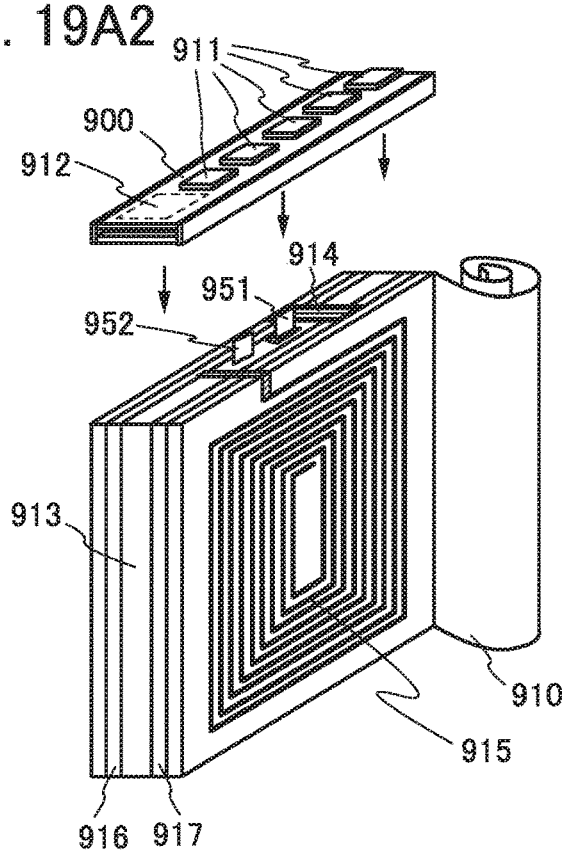
FIG. 19B1 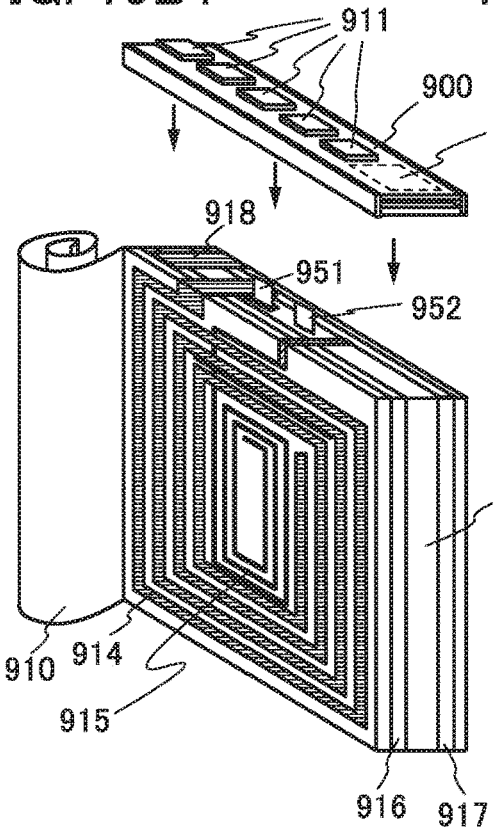
FIG. 19B2 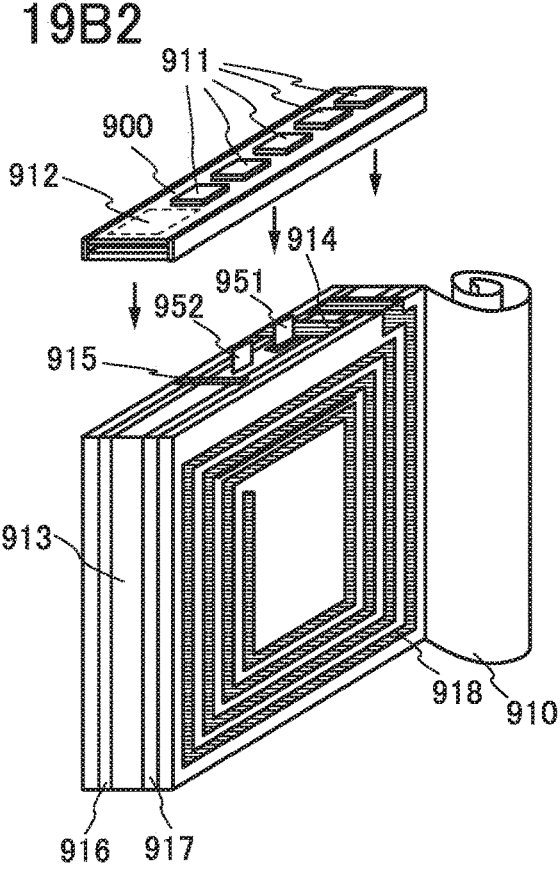

FIG. 25A
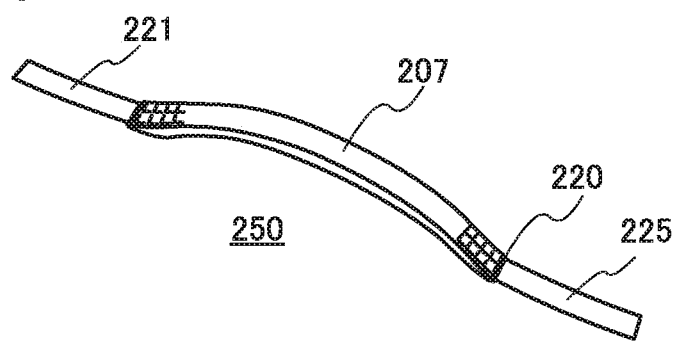
FIG. 25B
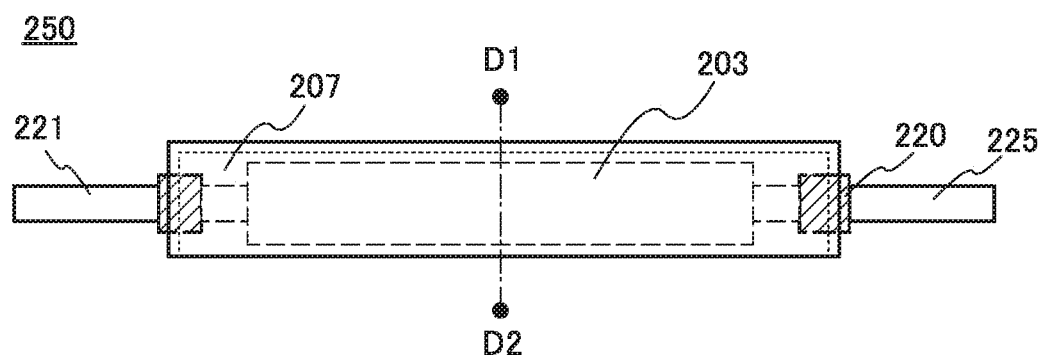
FIG. 25C1
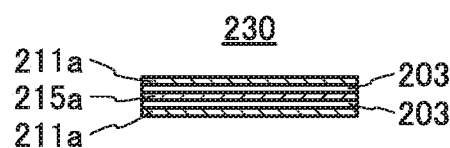
FIG. 25C2
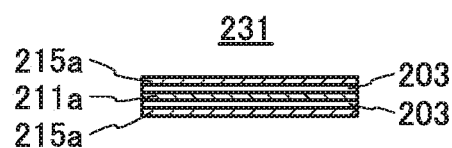

ELECTRODE, POWER STORAGE DEVICE, ELECTRONIC DEVICE, AND MANUFACTURING METHOD OF ELECTRODE

BACKGROUND OF THE INVENTION

1. Field of the Invention

One embodiment of the present invention relates to an electrode, a power storage device, an electronic device, and a method for manufacturing any of them.

Note that one embodiment of the present invention is not limited to the above technical field. Examples of the technical field of one embodiment of the present invention include a semiconductor device, a display device, a light-emitting device, a power storage device, a memory device, an imaging device, a method for driving any of them, and a method for manufacturing any of them.

In this specification, the power storage device is a collective term describing units and devices having a power storage function. For example, a storage battery such as a lithium-ion secondary battery (also referred to as secondary battery), a lithium-ion capacitor, and an electric double layer capacitor are included in the category of the power storage device.

2. Description of the Related Art

In recent years, a variety of power storage devices, for example, lithium-ion secondary batteries, lithium-ion capacitors, and air cells have been actively developed. In particular, demand for lithium-ion secondary batteries with high output and high energy density has rapidly grown with the development of the semiconductor industry, for portable information terminals such as mobile phones, smartphones, and laptop computers, portable music players, and digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

As described above, lithium-ion secondary batteries have been used for a variety of purposes in various fields. Properties necessary for such lithium-ion secondary batteries are high energy density, excellent cycle characteristics, safety in a variety of operation environments, and the like.

In addition, the lithium-ion secondary battery includes at least a positive electrode, a negative electrode, and an electrolytic solution (Patent Document 1).

REFERENCE

Patent Document

[Patent Document 1] Japanese Published Patent Application No. 2012-009418

SUMMARY OF THE INVENTION

Development of lithium ion secondary batteries is susceptible to improvement in terms of charge and discharge characteristics, cycle characteristics, reliability, safety, cost, and the like.

An object of one embodiment of the present invention is to provide a power storage device with excellent charging and discharging characteristics. Another object of one embodiment of the present invention is to provide a power storage device in which a decrease in capacity in charge and discharge cycles is prevented. Another object of one embodiment of the present invention is to provide a power storage device with a high degree of safety or high reliability.

Another object of one embodiment of the present invention is to increase the capacity per volume and/or weight of a power storage device. Another object of one embodiment of the present invention is to increase the capacity per volume and/or weight of an electrode.

Another object of one embodiment of the present invention is to cause a battery reaction stably at a high potential in a positive electrode containing a positive electrode active material. Another object of one embodiment of the present invention is to fabricate an electrode with a uniform thickness.

Another object of one embodiment of the present invention is to provide a novel substance, a positive electrode active material, a binder, an electrode, a lithium ion secondary battery, a battery, a power storage device, or a method for manufacturing any of them.

Note that the descriptions of these objects do not disturb the existence of other objects. In one embodiment of the present invention, there is no need to achieve all the objects. Other objects can be derived from the description of the specification, the drawings, and the claims.

One embodiment of the present invention is an electrode that includes a current collector and an active material layer. The active material layer includes an active material and a binder. The binder includes polybenzoxazine.

Another embodiment of the present invention is an electrode that includes a current collector and an active material layer. The active material layer includes an active material and a binder. The binder includes polybenzoxazine and a fluororesin.

In the above structures, the active material layer may include an oxide containing lithium, manganese, an element M, and oxygen, and the element M may be chromium, cobalt, aluminum, nickel, iron, magnesium, molybdenum, zinc, indium, gallium, copper, titanium, niobium, silicon, or phosphorus. In that case, the active material layer may include a compound including a bond between lithium, manganese, the element M, or oxygen and an element of the binder.

In the above structures, the active material layer may include a particle containing the oxide, the particle may have a first region and a second region; the second region may be in contact with at least part of the first region; the first region and the second region may each include lithium and oxygen; at least one of the first region and the second region may include manganese; and at least one of the first region and the second region may include the element M.

In that case, the first region may include a first crystal with a layered rock-salt crystal structure; the second region may include a second crystal with a layered rock-salt crystal structure; and the $\{0\,0\,1\}$ plane of the first crystal may be parallel to at least one of the $\{1\,0\,0\}$ plane, the $\{1\,3\,-1\}$ plane, and the $\{-1\,3\,1\}$ plane of the second crystal.

Alternatively, the first region may include a first crystal with a layered rock-salt crystal structure, the second region may include a second crystal with a layered rock-salt crystal structure; and the direction of the first crystal and the direction of the second crystal may be different from each other.

Alternatively, the first region may include a first crystal with a layered rock-salt crystal structure; and the second region may include a second crystal with a spinel crystal structure.

In the above structures, the first region and the second region may include manganese, the element M, and oxygen; an atomic ratio of manganese to the element M to oxygen in the first region may be represented by a1:b1:c1; an atomic ratio of manganese to the element M to oxygen in the second region may be represented by a2:b2:c2; c1/(a1+1) may be greater than or equal to 2.2; and c2/(a2+b2) may be less than 2.2.

In the above structures, the particle may have a third region, and the third region may be in contact with at least part of the second region. For example, the third region may include carbon. For example, the third region may have a thickness of greater than or equal to 0.4 nm and less than or equal to 40 nm.

In the above structures, the second region may have a layered region, and the layered region may have a thickness of greater than or equal to 0.4 nm and less than or equal to 40 nm.

Another embodiment of the present invention is a power storage device that includes a positive electrode and a negative electrode. The positive electrode or the negative electrode is the electrode having any of the above structures.

Another embodiment of the present invention is an electronic device that includes the above power storage device, and a display device, an operation button, an external connection port, a speaker, or a microphone.

Another embodiment of the present invention is a method for manufacturing an electrode that includes the following steps: forming a mixture including a benzoxazine monomer, an active material, and a solvent; forming a layer including the mixture over a current collector; and heating the layer including the mixture at higher than or equal to 150° C., preferably higher than or equal to 200° C., further preferably higher than or equal to 250° C. to form an active material layer including polybenzoxazine over the current collector.

One embodiment of the present invention can provide a power storage device with excellent charging and discharging characteristics. One embodiment of the present invention can provide a power storage device in which a decrease in capacity in charge and discharge cycles is prevented. One embodiment of the present invention can provide a power storage device with a high degree of safety or high reliability.

One embodiment of the present invention can increase the capacity per volume and/or weight of a power storage device. One embodiment of the present invention can increase the capacity per volume and/or weight of an electrode.

One embodiment of the present invention can cause a battery reaction stably at a high potential in a positive electrode containing a positive electrode active material. One embodiment of the present invention can fabricate an electrode with a uniform thickness.

One embodiment of the present invention can provide a novel substance, a positive electrode active material, a binder, an electrode, a lithium ion secondary battery, a battery, a power storage device, or a method for manufacturing any of them.

Note that the description of these effects does not disturb the existence of other effects. One embodiment of the present invention does not necessarily achieve all the effects listed above. Other effects can be derived from the description of the specification, the drawings, and the claims.

BRIEF DESCRIPTION OF THE DRAWINGS

FIGS. 4A and 4B illustrate examples of a crystal structure.
FIGS. 19A1, 19A2, 19B1, and 19B2 illustrate examples of a power storage system.
FIGS. 25A, 25B, 25C1, and 25C2 illustrate an example of a power storage device.

DETAILED DESCRIPTION OF THE INVENTION

Figure 1A:
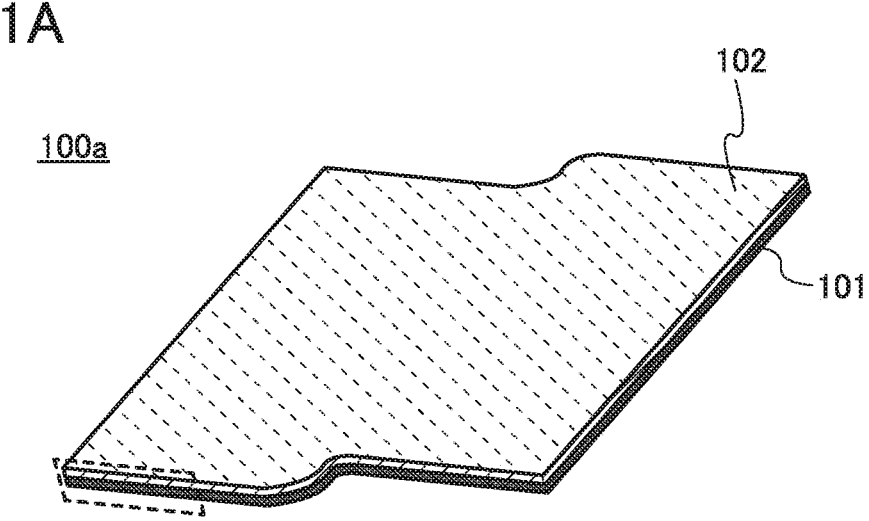
FIGS. 1A to 1D illustrate examples of an electrode.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

The position, size, range, or the like of each structure illustrated in drawings is not accurately represented in some cases for easy understanding. Therefore, the present invention is not limited to the position, size, range, and the like disclosed in the drawings.

Note that the terms "film" and "layer" can be interchanged with each other depending on the case or circumstances. For example, the term "conductive layer" can be changed into the term "conductive film." Also, the term "insulating film" can be changed into the term "insulating layer."

Embodiment 1

In this embodiment, an electrode of one embodiment of the present invention is described with reference to FIGS. 1A to 1D.

In this embodiment, an example in which an electrode of one embodiment of the present invention is applied to a lithium ion secondary battery is described; however, the use of an electrode of one embodiment of the present invention is not limited to this. An electrode of one embodiment of the present invention can be applied to any of a battery, a primary battery, a secondary battery, a lithium air battery, a lead storage battery, a lithium ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air cell, a zinc-air battery, a capacitor, a lithium ion capacitor, an electric double layer capacitor, an ultracapacitor, a supercapacitor, and the like.

An electrode of one embodiment of the present invention includes a current collector 101 and an active material layer 102.

Figure 1B:
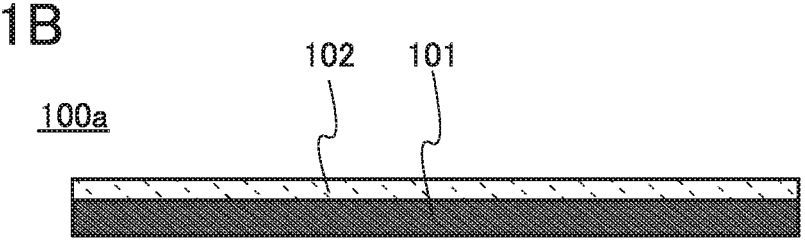

FIG. 1A is an overhead view of an electrode 100a, and FIG. 1B is a side view of a portion surrounded by the dashed line in FIG. 1A. The electrode 100a has a structure in which the active material layer 102 is provided over only one surface of the current collector 101.

Figure 1C:
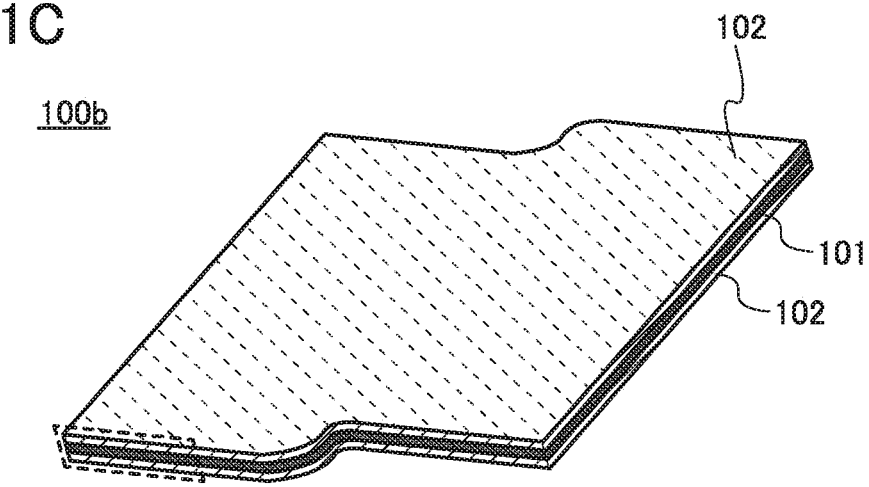
Figure 1D:
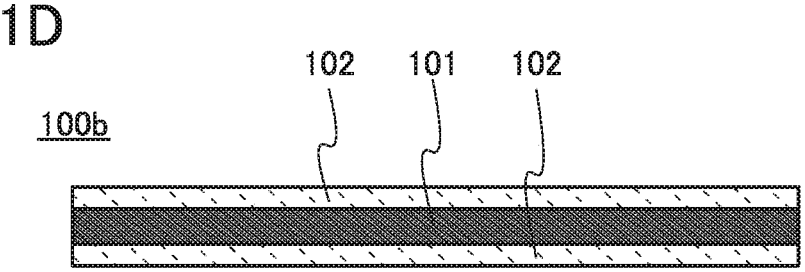

FIG. 1C is an overhead view of an electrode 100b, and FIG. 1D is a side view of a portion surrounded by the dashed line in FIG. 1C. The electrode 100b has a structure in which the active material layers 102 are provided over both surfaces of the current collector 101.

The active material layer 102 includes an active material and a binder.

In this specification, the binder has a function of binding or bonding the active materials and/or a function of binding or bonding the active material layer and the current collector. The binder is sometimes changed in state during manufacture of an electrode or a battery. For example, the binder can be at least one of a liquid, a solid, and a gel. The binder is sometimes changed from a monomer to a polymer during manufacture of an electrode or a battery.

Here, a basic material is one of active materials favorable in manufacture of a high-capacity lithium ion secondary battery. For example, many of lithium manganese complex oxides that can be favorably used as a positive electrode active material are basic.

In the case of using the binder that tends to be deteriorated under a basic environment, combination of the binder with a highly basic active material for formation of the active material layer 102 causes a problem. For example, poly (vinylidene fluoride) (PVdF) tends to be deteriorated under a basic environment and might be gelated when mixed with a highly basic active material. If the binder is gelated or aggregated, a mixture containing the binder and the active material is not mixed uniformly, which hinders formation of the active material layer 102 with a uniform thickness. Gelation is promoted by heat, moisture, or the like. For example, when a large volume of mixture is formed at a time, heat generated at the time of mixing promotes gelation. To prevent entry of moisture or the like contained in the air, formation of the active material layer 102 using the mixture needs to be performed quickly. Accordingly, when the binder is easily gelated, mass productivity in manufacture of the electrode is sometimes reduced.

The manufacturing process of the electrode sometimes involves heating. In that case, low heat resistance of a binder limits the heating temperature, resulting in insufficient characteristics of the electrode.

Thus, in one embodiment of the present invention, polybenzoxazine (also referred to as a benzoxazine resin) is used as a binder.

Polybenzoxazine is a thermosetting resin that can be used as a semiconductor sealant or the like. The present inventors have found that polybenzoxazine can be favorably used as a binder in an electrode of a power storage device.

Polybenzoxazine has high dimensional stability, high water resistance, high chemical resistance, high incombustibility, and the like. Polybenzoxazine is insoluble in an electrolytic solution. Furthermore, for its low water absorbing property, polybenzoxazine can be easily used as a binder without the need to use a thickener or the like.

For its resistance to a base, polybenzoxazine can be favorably used for an electrode including a basic active material. Note that an active material to be combined with polybenzoxazine is not necessarily basic and for example, polybenzoxazine may be combined with a neutral active material or an acidic active material.

In addition, polybenzoxazine is not easily decomposed or changed in quality even when high voltage is applied; thus, polybenzoxazine can be favorably used as a binder contained in a positive electrode active material layer. Note that polybenzoxazine may be used as a binder contained in a negative electrode active material layer.

Polybenzoxazine can be formed by, for example, polymerization of a monomer with a benzoxazine ring (hereinafter referred to as a benzoxazine monomer).

Polybenzoxazine can be obtained by, for example, ring-opening polymerization of a benzoxazine monomer. In formation of an electrode, first, an active material and a benzoxazine monomer are mixed to form a mixture. Then, the mixture is applied onto a current collector and then heating is performed to polymerize the benzoxazine monomer, whereby an active material layer containing polybenzoxazine is formed over the current collector. At the time of mixing the active material and the binder, a compound with a benzoxazine ring is monomeric, which can inhibit gelation or aggregation of the binder. Since a benzoxazine monomer is less likely to be changed in volume by polymerization, only a small change in volume (expansion or contraction) is caused at the time of formation of the active material layer by heating the mixture over the current collector. Therefore, uniformity in thickness of the electrode and adhesion between the current collector and the active material layer are less likely to be impaired.

The 5% weight loss temperature of a benzoxazine monomer or polybenzoxazine is preferably 250° C. or higher, further preferably 300° C. or higher, still further preferably 350° C. or higher. The use of a binder with high heat resistance allows heating at higher temperatures to be performed during formation of an electrode.

Examples of a benzoxazine monomer include an F-a benzoxazine compound formed by reaction between a bisphenol compound and an amine compound, and a P-d benzoxazine compound formed by reaction between a phenyldiamine compound and a phenol compound. Examples of an F-a benzoxazine compound include a bisphenol A benzoxazine compound and a bisphenol F benzoxazine compound. Examples of a P-d benzoxazine compound include a diaminodiphenylmethane benzoxazine compound.

Note that a compound with a benzoxazine ring such as a benzoxazine monomer as well as polybenzoxazine may be included in the electrode or the active material layer of one embodiment of the present invention. Non-limiting examples of the compound with a benzoxazine ring include a compound with a 3,4-dihydro-2H-1,4-benzoxazine ring.

In one embodiment of the present invention, the binder is not necessarily polybenzoxazine alone. A plurality of materials may be used as the binder in one embodiment of the present invention.

For example, polybenzoxazine and a binder that tends to be deteriorated under a basic environment may be used as the binder. In that case, gelation or aggregation of the binder that tends to be deteriorated under a basic environment can be inhibited more than in the case where the binder sensitive to that tends to be deteriorated under a basic environment is used alone as the binder.

For example, polybenzoxazine and a binder with low heat resistance may be used as the binder. In that case, the binder can sometimes endure heating at higher temperatures or for longer time than in the case where the binder with low heat resistance is used alone as the binder.

For example, as described later in Example 2, when polybenzoxazine and PVdF are used as the binder, discharge capacity can be higher than when PVdF is used alone as the binder.

The binder may be a composite material of a compound with a benzoxazine ring and another compound. For example, the binder may be a copolymer of a benzoxazine resin and any of a fluororesin, an epoxy resin, a phenol resin, and the like.

The electrode of one embodiment of the present invention can be used in a power storage device. The power storage device includes a pair of electrodes (a positive electrode and a negative electrode), and the electrodes each include an active material layer. Each of the positive electrode active material layer and the negative electrode active material layer preferably includes a binder.

In the power storage device of one embodiment of the present invention, polybenzoxazine is used as a binder in at least one of the positive electrode active material layer and the negative electrode active material layer. In the case where polybenzoxazine is used in only one active material layer, the kind of the binder used in the other active material layer is not limited. For example, in one embodiment of the present invention, the positive electrode active material layer includes polybenzoxazine as a binder. The positive electrode active material layer may include another material as a binder. In that case, the binder of the negative electrode active material layer is not particularly limited.

Other examples of the material that can be used as the binder are described. In the electrode of one embodiment of the present invention, both polybenzoxazine and at least one of the following materials may be contained in the active material layer.

For example, a water-soluble high molecular compound can be used as the binder. As the water-soluble high molecular compound, a polysaccharide or the like can be used. As the polysaccharide, a cellulose derivative such as carboxymethyl cellulose (CMG), methylcellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluororubber, or ethylene-propylene-diene copolymer can be used. Any of these rubber materials may be used in combination with the aforementioned water-soluble high molecular compounds. Since these rubber materials have rubber elasticity and easily expand and contract, it is possible to obtain a highly reliable electrode that is resistant to stress due to expansion and contraction of an active material by charging and discharging, bending of the electrode, or the like. On the other hand, the rubber materials have a hydrophobic group and thus are unlikely to be soluble in water in some cases. In such a case, particles are dispersed in an aqueous solution without being dissolved in water, so that increasing the viscosity of a composition containing a solvent used for the formation of the active material layer 102 (also referred to as an electrode binder composition) up to the viscosity suitable for application might be difficult. A water-soluble high molecular compound having excellent viscosity modifying properties, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

Alternatively, as the binder, a material such as PVdF, polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyacrylonitrile (PAN), polyvinyl chloride, ethylene-propylene-diene polymer, polyvinyl acetate, polymethyl methacrylate, or nitrocellulose can be used.

Two or more of the above materials may be used in combination for the binder.

The content of the binder in the active material layer is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %.

Other components of the electrode of one embodiment of the present invention are described in detail below.

<<Current Collector>>

There is no particular limitation on the current collector as long as it has high conductivity without causing a significant chemical change in a power storage device. For example, the positive electrode current collector and the negative electrode current collector can each be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like may be used. Alternatively, the current collectors can each be formed using an aluminum alloy to which an element that improves heat resistance, such as silicon, titanium, neodymium, scandium, or molybdenum, is added. Still alternatively, a metal element that forms silicide by reacting with silicon can be used to form the current collectors. Examples of the metal element that forms silicide by reacting with silicon include zirconium, titanium, hafnium, vanadium, niobium, tantalum, chromium, molybdenum, tungsten, cobalt, and nickel.

An irreversible reaction with an electrolytic solution is sometimes caused on a surface of the current collector. Thus, the current collector preferably has low reactivity with an electrolytic solution. Stainless steel or the like is preferably used for the current collector, in which case reactivity with an electrolytic solution can be lowered in some cases, for example.

The positive electrode current collector and the negative electrode current collector can each have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The positive electrode current collector and the negative electrode current collector may each be formed to have micro irregularities on the surface thereof in order to enhance adhesion to the active material layer. The positive electrode current collector and the negative electrode current collector each preferably have a thickness of 5 μm to 30 μm inclusive.

An undercoat layer may be provided over part of a surface of the current collector. The undercoat layer is a coating layer provided to reduce contact resistance between the current collector and the active material layer or to improve adhesion between the current collector and the active material layer. Note that the undercoat layer is not necessarily formed over the entire surface of the current collector and may be partly formed to have an island-like shape. In addition, the undercoat layer may serve as an active material to have capacity. For the undercoat layer, a carbon material can be used, for example. Examples of the carbon material include carbon black such as acetylene black and ketjen black (registered mark), a carbon nanotube, and graphite. Examples of the undercoat layer include a metal layer, a layer containing carbon and high molecular compounds, and a layer containing metal and high molecular compounds.

<<Active Material Layer>>

The active material layer includes the active material. An active material refers only to a material that is involved in insertion and extraction of ions that are carriers. In this specification and the like, a material that is actually an "active material" and the material including a conductive additive, a binder, and the like are collectively referred to as an active material layer.

The positive electrode active material layer includes one or more kinds of positive electrode active materials. The negative electrode active material layer includes one or more kinds of negative electrode active materials.

The positive electrode active material and the negative electrode active material have a central role in battery reactions of a power storage device, and occlude and release carrier ions. To increase the lifetime of the power storage device, the active materials preferably have a little capacity involved in irreversible battery reactions, and have high charge and discharge efficiency.

For the positive electrode active material, a material into and from which carrier ions such as lithium ions can be inserted and extracted can be used. Examples of a positive electrode active material include materials having an olivine crystal structure, a layered rock-salt crystal structure, a spinel crystal structure, and a NASICON crystal structure.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

As an example of a material having an olivine crystal structure, lithium-containing complex phosphate ($LiMPO_4$ (general formula) (M is one or more of Fe(II), Mn(II), Co(II), and Ni(II))) can be given. Typical examples of $LiMPO_4$ are compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$, (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charging).

The use of $LiFePO_4$ for the positive electrode active material allows fabrication of a highly safe power storage device that is stable against an external load such as overcharging. Such a power storage device is particularly suitable for, for example, a mobile device, a wearable device, and the like.

Examples of the material with a layered rock-salt crystal structure include lithium cobalt oxide ($LiCoO_2$); $LiNiO_2$; $LiMnO_2$; $Li_2MnO_3$; an NiCo-based material (a general formula thereof is $LiNi_xCo_{1-x}O_2$ (0<x<1)) such as $LiNi_{0.8}Co_{0.2}O_2$; an NiMn-based material (a general formula thereof is $LiNi_xMn_{1-x}O_2$ (0<x<1)) such as $LiNi_{0.5}Mn_{0.5}O_2$; and an NiMnCo-based material (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni or Mn), and the like can be given.

$LiCoO_2$ is particularly preferable because it has high capacity, stability in the air higher than that of $LiNiO_2$, and thermal stability higher than that of $LiNiO_2$, for example.

Examples of the material with a spinet crystal structure are $LiMn_2O_4$, $LiNi_{1+x}Mn_{2-x}O_4$ (0<x<2), $LiMn_{2-x}Al_xO_4$ (0<x<2), $LiMn_{1.5}Ni_{0.5}O_4$, and the like.

It is preferable to add a small amount of lithium nickel oxide ($LiNiO_2$ or $LiNi_{1-x}M_xO_2$ (0<x<1, M=Co or Al, for example)) to a material with a spinel crystal structure which contains manganese such as $LiMn_2O_4$ because advantages such as inhibition of the dissolution of manganese and the decomposition of an electrolytic solution can be obtained.

Alternatively, lithium-containing complex silicate such as $Li_{(2-j)}MSiO_4$ (general formula) (M is one or more of Fe(II), Mn(II), Co(II), and Ni(II); 0≤j≤2) may be used as the positive electrode active material. Typical examples of $Li_{(2-j)}MSiO_4$ are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\leq1$, $0<m<1$, $0<n<1$, and $0<q<1$), and $Li_{(2-j)}Fe_rNi_s$-$Co_tMn_uSiO_4$ ($r+s+t+u\leq1$, $0<r<1$, $0<s<1$, $0<t<1$, and $0<u<1$).

Still alternatively, a NASICON compound expressed by $A_xM_2(XO_4)_3$ (general formula (A=Li, Ni, or Mg, M=Fe, Mn, Ti, V, Nb, or Al, X=S, P, Mo, W, As, or Si) can be used for the positive electrode active material. Examples of the NASICON compound are $Fe_2(MnO_4)_3$, $Fe_2(SO_4)_3$, and $Li_3Fe_2(PO_4)_3$.

Further alternatively, a compound expressed by $Li_2MPO_4F$, $Li_2MP_2O_7$, or $Li_5MO_4$ (general formula) (M=Fe or Mn), a perovskite fluoride such as $FeF_3$, a metal chalcogenide (a sulfide, a selenide, or a telluride) such as $TiS_2$ and $MoS_2$, a material with an inverse spinel structure such as $LiMVO_4$ (M=Mn, Co, or Ni), a vanadium oxide ($V_2O_5$, $V_5O_{13}$, $LiV_3O_8$, or the like), a manganese oxide, an organic sulfur compound, or the like can be used as the positive electrode active material.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average diameter of primary particles of the positive electrode active material is preferably, for example, greater than or equal to 5 nm and less than or equal to 100 μm.

For example, lithium-containing complex phosphate having an olivine crystal structure used for the positive electrode active material has a one-dimensional lithium diffusion path, so that lithium diffusion is slow. Thus, in the case of using lithium-containing complex phosphate having an olivine crystal structure, the average diameter of particles of the positive electrode active material is, for example, preferably greater than or equal to 5 nm and less than or equal to 1 μm so that the charge and discharge rate is increased. The specific surface area of the positive electrode active material is, for example, preferably greater than or equal to 10 m²/g and less than or equal to 50 m²/g.

An active material having an olivine crystal structure is much less likely to be changed in the crystal structure by charging and discharging and has a more stable crystal structure than, for example, an active material having a layered rock-salt crystal structure. Thus, a positive electrode active material having an olivine crystal structure is stable against operation such as overcharging. The use of such a positive electrode active material allows fabrication of a highly safe power storage device.

As the negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, and carbon black. Examples of graphite include artificial graphite such as meso-carbon microbeads (MCMB), coke-based artificial graphite, and pitch-based artificial graphite and natural graphite such as spherical natural graphite. In addition, the shape of the graphite is a flaky shape or a spherical shape, for example.

Graphite has a low potential substantially equal to that of a lithium metal (higher than or equal to 0.1 V and lower than or equal to 0.3 V vs. Li/Li⁺) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and safety greater than that of a lithium metal.

For example, in the case where carrier ions are lithium ions, a material including at least one of Mg, Ca, Ga, Si, Al, Ge, Sn, Pb, As, Sb, Bi, Ag, Au, Zn, Cd, Hg, In, and the like can be used as the alloy-based material. Such elements have a higher capacity than carbon. In particular, silicon has a high theoretical capacity of 4200 mAh/g, and therefore, the capacity of the power storage device can be increased. Examples of an alloy-based material (compound-based material) using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Here, SiO is a compound containing silicon and oxygen. When the atomic ratio of silicon to oxygen is represented by α:β, α preferably has an approximate value of β. Here, when α has an approximate value of β, an absolute value of the difference between α and β is less than or equal to 20% of a value of β, more preferably less than or equal to 10% of a value of β.

Still alternatively, for the negative electrode active material, $Li_{3-x}M_xN$ (M=Co, Ni, or Cu) with a $Li_3N$ structure, which is a lithium transition metal nitride, can be used. For example, $Li_{2.6}Co_{0.4}N_3$ is preferable because of high charge and discharge capacity (900 mAh/g and 1890 mAh/cm³).

When a lithium transition metal nitride is used, lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the lithium transition metal nitride can be used for the negative electrode active material by extracting the lithium ions contained in the positive electrode active material in advance.

Alternatively, a material which causes a conversion reaction can be used for the negative electrode active material; for example, a transition metal oxide with which an alloying reaction with lithium is not caused, such as cobalt oxide (CoO), nickel oxide (NiO), and iron oxide (FeO), may be used. As a material which causes a conversion reaction, an oxide such as $Fe_2O_3$, CuO, $Cu_2O$, $RuO_2$, or $Cr_2O_3$; sulfide such as $CoS_{0.89}$, NiS, or CuS; nitride such as $Zn_3N_2$, $Cu_3N$, or $Ge_3N_4$; phosphide such as $NiP_2$, $FeP_2$, or $CoP_3$; and fluoride such as $FeF_3$ or $BiF_3$ can be given.

The average diameter of primary particles of the negative electrode active material is preferably, for example, greater than or equal to 5 nm and less than or equal to 100 μm.

The positive electrode active material layer and the negative electrode active material layer may each include a conductive additive.

Examples of the conductive additive include a carbon material, a metal material, and a conductive ceramic material. Alternatively, a fiber material may be used as the conductive additive. The content of the conductive additive in the active material layer is preferably greater than or equal to 1 wt. % and less than or equal to 10 wt %, more preferably greater than or equal to 1 wt % and less than or equal to 5 wt %.

A network for electrical conduction can be formed in the electrode by the conductive additive. The conductive additive also allows maintaining of a path for electric conduction between the particles of the negative electrode active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase electrical conductivity between the active materials or between the active material and the current collector.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene.

Graphene is capable of making low-resistance surface contact and has extremely high conductivity even with a small thickness. Therefore, even a small amount of graphene can efficiently form a conductive path in an active material layer.

In the case where an active material with a small average particle diameter (e.g., 1 µm or less) is used, the specific surface area of the active material is large and thus more conductive paths for the active material particles are needed. In such a case, it is particularly preferred that graphene with extremely high conductivity that can efficiently form a conductive path even in a small amount be used.

Next, a method for forming the electrode of one embodiment of the present invention will be described.

First, the active material, conductive additive, and binder are mixed. Then, a solvent is added to the obtained mixture and mixed until predetermined viscosity is obtained; thus, the electrode binder composition can be formed. In this step, the mixing and the addition of the polar solvent may be repeated more than once. The electrode binder composition may be slurry or a paste. As the solvent, for example, water or N-methyl-2-pyrrolidone (NMP) can be used. Water is preferably used in terms of the safety and cost.

For example, when a benzoxazine monomer is used as the binder, the proportion of the solid content is preferably higher than or equal to 40% and lower than or equal to 60%, further preferably higher than or equal to 44% and lower than or equal to 55%. In that case, the active material layer can be formed uniformly over the current collector.

Through the above steps, the electrode binder composition in which the active material, the conductive additive, and the binder are uniformly dispersed can be obtained.

Next, slurry is provided on one or both surfaces of the current collector by a coating method such as a doctor blade method.

Next, the slurry formed over the current collector is dried by a method such as ventilation drying or reduced pressure (vacuum) drying to form the active material layer. The drying is preferably performed using a hot wind with temperatures of 50° C. to 180° C. Through this step, the polar solvent contained in the active material layer is evaporated. Note that there is no particular limitation on the atmosphere.

The active material layer may be pressed by a compression method such as a roll press method or a flat plate press method to increase the density of the active material layer. When the pressing is performed while being heated at higher than or equal to 90° C. and lower than or equal to 180° C., preferably lower than or equal to 120° C., the binder contained in the undercoat layer or the active material layer is softened to such an extent that the characteristics of the electrode are not changed, further increasing the adhesion between the current collector and the active material layer.

Then, the active material layer is dried. The drying is preferably performed in a reduced pressure (vacuum) atmosphere or a reduction atmosphere. This drying step may be performed at temperatures of 50° C. to 300° C. for 1 hour to 48 hours, for example. The drying allows removal of the polar solvent and moisture in the active material layer.

The current collector over which the active material layer is formed may be further pressed. Thus, the adhesion between the current collector and the active material layer can be increased. In addition, the density of the active material layer can be increased. Further, by applying heat at higher than or equal to 90° C. and lower than or equal to 180° C., preferably lower than or equal to 120° C. when the pressing is performed, the binder contained in the undercoat layer or the active material layer is softened to the extent that the characteristics of the electrode are not changed; thus, the adhesion between the current collector and the active material layer is further increased.

Lastly, the current collector and the active material layer are stamped to have a predetermined size, whereby the electrode can be formed.

As described above, the electrode is fabricated using polybenzoxazine for the binder in this embodiment. Therefore, even when a basic active material is used, gelation or aggregation of the binder in formation of the active material layer can be inhibited. As a result, a mixture containing the active material and the binder can be mixed uniformly, which enables the active material layer to be formed to have a uniform thickness.

In addition, high-temperature heating can be performed in the fabrication process of the electrode, which enables the electrode to have sufficiently improved characteristics and the power storage device to have favorable charge and discharge characteristics.

This embodiment can be combined with any other embodiment as appropriate.

Embodiment 2

In this embodiment, an active material that can be used for the electrode of one embodiment of the present invention is described with reference to FIGS. 2A and 2B, FIG. 3, FIGS. 4A and 4B, and FIG. 5.

Note that an active material generally refers only to a material that is involved in intercalation and deintercalation of ions functioning as carriers; however, an active material described in this specification and the like also includes a layer (coating layer) that covers an "active material" in some cases.

In this embodiment, a "particle containing a lithium manganese complex oxide" that can be used for an active material and a manufacturing method thereof will be described.

A lithium manganese complex oxide is strongly basic. For its resistance to a base, polybenzoxazine can be favorably used as a binder in the case where an active material is formed using a lithium manganese complex oxide.

When the electrode including the active material described in this embodiment is subjected to heat treatment during its fabrication process, discharge capacity can be improved. Since polybenzoxazine with high heat resistance is used for a binder in one embodiment of the present invention, the temperature of the heat treatment can be set high. Thus, the electrode with sufficiently improved discharge capacity can be fabricated.

For example, a lithium manganese complex oxide can be represented by a composition formula $Li_aMn_bM_cO_d$. Here, the element M is preferably silicon, phosphorus, or a metal element other than lithium and manganese, further preferably nickel. Furthermore, in the case where a whole particle of a lithium manganese complex oxide is measured, it is preferable to satisfy the following at the time of discharging: $0<a/(b+c)<2$; $c>0$; and $0.26 \leq (b+c)/d<0.5$. Note that the ratios of metal, silicon, phosphorus, and other elements to the total composition in the whole particle of a lithium manganese complex oxide can be measured with, for example, an inductively coupled plasma mass spectrometer (TCP-MS). The ratio of oxygen to the total composition in the whole particle of a lithium manganese complex oxide can be measured by, for example, energy dispersive X-ray spectroscopy (EDX). Alternatively, the ratio of oxygen to the total composition in the whole particle of a lithium manganese complex oxide can be measured by an inert gas fusion method and valence evaluation of X-ray absorption fine structure (XAFS) analysis combined with ICP-MS. Note that the lithium manganese complex oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like. The lithium manganese complex oxide preferably has a layered rock-salt crystal structure. The lithium manganese complex oxide may have a layered rock-salt crystal structure and a spinel crystal structure.

To achieve high capacity, the lithium manganese complex oxide preferably includes a region where the surface portion and the middle portion are different in the crystal structure, the crystal orientation, or the oxygen content. In order that such a lithium manganese complex oxide can be obtained, the composition formula is preferably $Li_aMn_bNi_cO_d$ satisfying the following: $1.6 \leq a \leq 1.848$; $0.19 \leq c/b \leq 0.935$; and $2.5 \leq d \leq 3$. For example, it is preferable to use a lithium manganese complex oxide represented by a composition formula $Li_{1.68}Mn_{0.8062}Ni_{0.318}O_3$. In this specification and the like, a lithium manganese complex oxide represented by a composition formula $Li_{1.68}Mn_{0.8062}Ni_{0.318}O_3$ refers to that formed at a ratio (molar ratio) of the amounts of raw materials of $Li_2CO_3:MnCO_3:NiO=0.84:0.8062:0.318$. Although this lithium manganese complex oxide is represented by a composition formula $Li_{1.68}Mn_{0.8062}Ni_{0.318}O_3$, the composition might deviate from this.

Figure 2A:
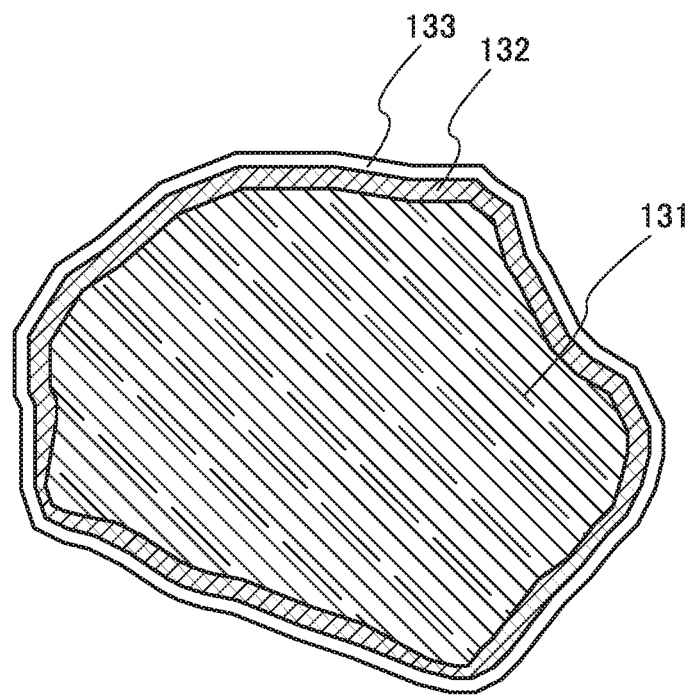
FIGS. 2A and 2B illustrate examples of a particle.
Figure 2B:
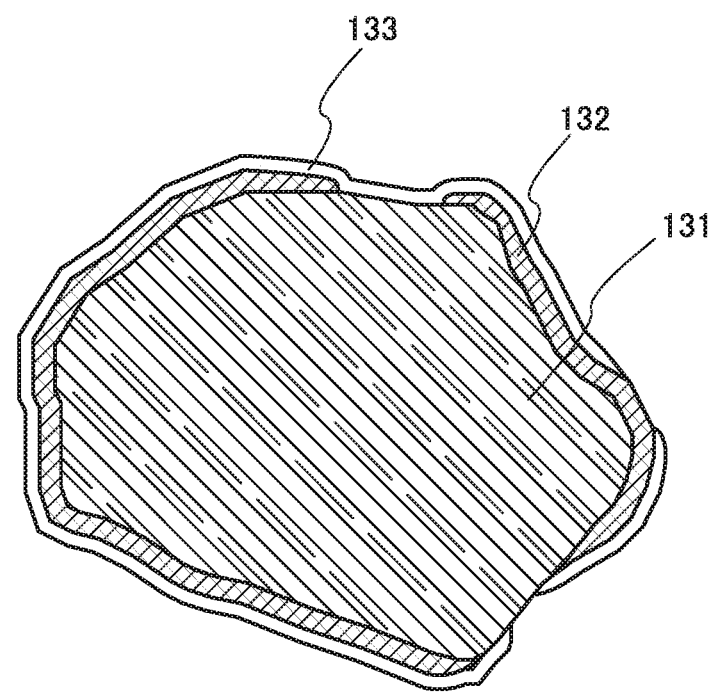

FIGS. 2A and 2B illustrate examples of a cross-sectional view of a particle of a lithium manganese complex oxide whose crystal structure, crystal orientation, or oxygen content is different from region to region.

As illustrated in FIGS. 2A and 2B, the lithium manganese complex oxide whose crystal structure, crystal orientation, or oxygen content is different from region to region preferably has a first region 131, a second region 132, and a third region 133.

As shown in FIG. 2A, at least part of the second region 132 is in contact with the first region 131. The second region 132 is positioned outside the first region 131. At least part of the third region 133 is in contact with the second region 132. The third region 133 is positioned outside the second region 132. Here, the term "outside" refers to the side closer to a surface of a particle.

As shown in FIG. 2B, the first region 131 may include a region not covered with the second region 132. The second region 132 may include a region not covered with the third region 133. For example, the first region 131 may include a region in contact with the third region 133. The first region 131 may include a region covered with neither the second region 132 nor the third region 133.

The first region 131 and the second region 132 contain lithium and oxygen. At least one of the first region 131 and the second region 132 contains manganese. At least one of the first region 131 and the second region 132 contains the element M. More preferably, each of the first region 131 and the second region 132 contains both manganese and the element M.

Here, the element M is preferably silicon, phosphorus, or a metal element other than lithium and manganese, more preferably Si, P, or a metal element selected from Ni, Ga, Fe, Mo, In, Nb, Nd, Co, Sm, Mg, Al, Ti, Cu, and Zn, still more preferably nickel.

In the case where the second region 132 includes a layered region, the thickness of the layered region is preferably greater than or equal to 0.1 nm and less than or equal to 50 nm, further preferably greater than or equal to 1 nm and less than or equal to 20 nm, still further preferably greater than or equal to 2 nm and less than or equal to 10 nm, for example. For example, a layer containing carbon in the second region 132 preferably has a thickness of greater than or equal to 0.4 nm and less than or equal to 40 nm.

The third region 133 preferably includes a surface of a particle containing the lithium manganese complex oxide.

For the third region 133, carbon or a metal compound can be used. Examples of the metal include cobalt, aluminum, nickel, iron, manganese, titanium, zinc, and lithium. As an example of the metal compound, an oxide of the metal, a fluoride of the metal, or the like can be given.

It is particularly preferable that the third region 133 contain carbon. Since carbon has high conductivity, the particle coated with carbon in the electrode of the storage battery can reduce the resistance of the electrode, for example. When the third region 133 contains carbon, the second region in contact with the third region can be oxidized. The third region 133 may contain graphene, graphene oxide, or graphene oxide subjected to reduction. Graphene and reduced graphene oxide have excellent electrical characteristics of high conductivity and excellent physical properties of high flexibility and high mechanical strength. Moreover, a particle of the lithium manganese complex oxide can be coated efficiently.

When the third region 133 includes a carbon material such as graphene, the secondary battery using the lithium manganese complex oxide as the positive electrode material can have improved cycle characteristics.

In the case where the third region 133 includes a layered region, the thickness of the layered region is preferably greater than or equal to 0.1 nm and less than or equal to 50 nm, further preferably greater than or equal to 1 nm and less than or equal to 20 nm, still further preferably greater than or equal to 2 nm and less than or equal to 10 nm, for example. For example, a layer containing carbon in the third region 133 preferably has a thickness of greater than or equal to 0.4 nm and less than or equal to 40 nm.

In the case where a power storage device is manufactured using the particle containing the lithium manganese complex oxide, the third region 133 is preferably more stable than the first region 131 and the second region 132 against a battery reaction, e.g., charging or discharging.

Furthermore, the average diameter of primary particles of the lithium manganese complex oxide is preferably greater than or equal to 5 nm and less than or equal to 50 μm, more preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average diameter of secondary particles is preferably greater than or equal to 5 μm and less than or equal to 50 μm. Note that the average particle diameters can be measured with a particle size distribution analyzer or the like using a laser diffraction and scattering method or by observation with a scanning electron microscope (SEM) or a TEM. The specific surface area can be measured by a gas adsorption method.

The second region 132 preferably has composition different from that of the first region 131.

For example, the case is described where the composition of the first region 131 and that of the second region 132 are separately measured and the first region 131 and the second region 132 each contain lithium, manganese, the element M, and oxygen; the atomic ratio between lithium, manganese, the element M, and oxygen in the first region 131 is represented by a1:b1:c1:d1; and the atomic ratio between lithium, manganese, the element M, and oxygen in the second region 132 is represented by a2:b2:c2:d2. Note that the composition of each of the first region 131 and the second region 132 can be measured by, for example, energy dispersive X-ray spectroscopy (EDX) using a transmission electron microscope (TEM). In measurement by EDX, the ratio of lithium to the total composition is sometimes difficult to measure. Thus, a difference between the first region and the second region in composition ratios of elements other than lithium is described below. Here, $d1/(b1+c1)$ is preferably greater than or equal to 2.2, more preferably greater than or equal to 2.3, much more preferably greater than or equal to 2.35 and less than or equal to 3. Furthermore, $d2/(b2+c2)$ is preferably less than 2.2, more preferably less than 2.1, much more preferably greater than or equal to 1.1 and less than or equal to 1.9. Also in this case, the composition of a whole particle of the lithium manganese complex oxide including the first region 131 and the second region 132 preferably satisfies $0.26 \leq (b+c)/d < 0.5$ as described above.

The valence of manganese in the second region 132 may be different from that of manganese in the first region 131. The valence of the element M in the second region 132 may be different from that of the element M in the first region 131.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region 132 and the first region 131. Here, the transition layer is a region where composition is changed continuously or gradually, a region where a crystal structure is changed continuously or gradually, or a region where the lattice constant of a crystal is changed continuously or gradually.

A mixed layer may be provided between the second region 132 and the first region 131. The mixed layer is a region in which, for example, two or more crystals having different crystal orientations are mixed, two or more crystals having different crystal structures are mixed, or two or more crystals having different compositions are mixed.

The second region 132 may include a crystal structure different from that of the first region 131. The second region 132 may include a crystal whose orientation is different from that of the first region 131.

The first region 131 preferably has a layered rock-salt crystal structure. The second region 132 preferably has at least one of a spinel crystal structure and a layered rock-salt crystal structure.

It is preferable that the second region 132 have a spinel crystal structure and that the first region 131 have a layered rock-salt crystal structure, for example.

Alternatively, it is preferable that the first region 131 and the second region 132 have a layered rock-salt crystal structure and that a first plane of a first crystal included in the first region 131 be parallel to a second plane of a second crystal included in the second region 132, for example.

Here, the {0 0 1} plane of the first crystal is preferably parallel to at least one of a {1 0 0} plane, a {1 3 −1} plane, and a {−1 3 1} plane of the second crystal. Alternatively, the {1 0 0} plane of the first crystal is preferably parallel to at least one of a {0 0 1} plane, a {1 3 −1} plane, and a {−1 3 1} plane of the second crystal. Alternatively, the {1 3 −1} plane of the first crystal is preferably parallel to at least one of a {0 0 1} plane, a {1 0 0} plane, and a {−1 3 1} plane of the second crystal. Alternatively, the {−1 3 1} plane of the first crystal is preferably parallel to at least one of a {0 0 1} plane, a {1 0 0} plane, and a {1 3 −1} plane of the second crystal.

It is preferable that the first region 131 and the second region 132 have a layered rock-salt crystal structure and that a first orientation of the crystal included in the first region 131 be parallel to a second orientation of the crystal included in the second region 132, for example. Here, crystal orientations of the crystal included in the first region 131 and the crystal included in the second region 132 will be described.

Here, a first group includes three crystal orientations of <1 0 0>, <1 1 0>, and <−1 1 0>, a second group includes <0 0 1>, <0 1 1>, and <0 1 −1>, a third group includes <−3 2 3>, <3 1 6>, and <6 −1 3>, and a fourth group includes <3 2 −3>, <3 −1 6>, and <6 1 3>.

The crystal included in the first region 131 has an orientation selected from the orientations in one of the first group to the fourth group. The crystal included in the second region 132 has an orientation selected from the orientations in a group different from the group from which the orientation of the crystal included in the first region 131 is selected.

A combination example will be described below. Description will be made on the (0 0 1) plane and the (1 0 0) plane. In the following description, indices are written using notation in which the symmetry of a crystal is not taken into consideration.

Figure 3:
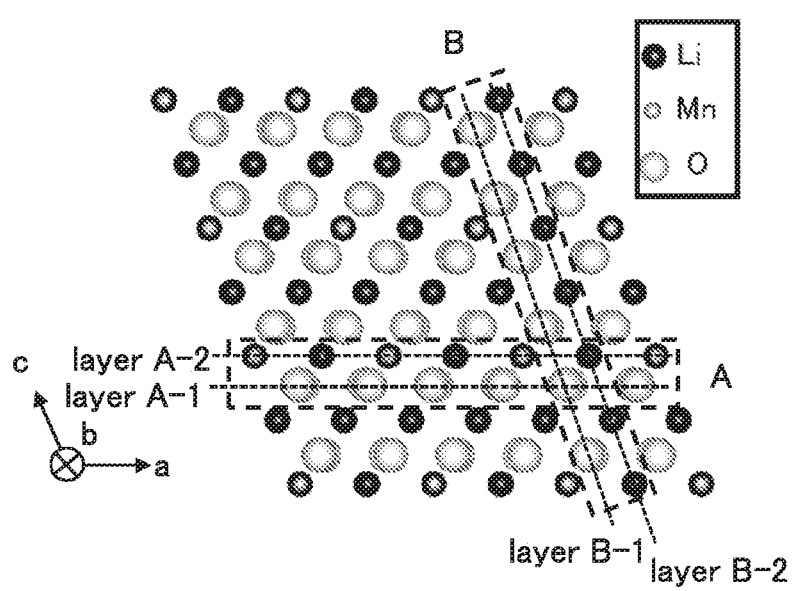
FIG. 3 illustrates an example of a crystal structure.

FIG. 3 shows a crystal structure of $Li_2MnO_3$ seen in the negative direction of a b-axis. FIG. 4A shows a layer A-1 and a layer A-2 in a region surrounded by the dashed line A shown in FIG. 3. In FIG. 4A, the layer A-1 and the layer A-2 are observed from the layer A-2 side in a direction perpendicular to the layer A-1 and the layer A-2. The layer A-1 contains oxygen, and the layer A-2 contains lithium and manganese.

FIG. 4B shows a layer B-1 and a layer B-2 in a region surrounded by the dashed line B shown in FIG. 3. In FIG. 4B, the layer B-1 and the layer B-2 are observed from the layer B-2 side in a direction perpendicular to the layer B-1 and the layer B-2.

In FIG. 4A, lithium or manganese is stacked over an oxygen atom and is shifted in a [1 1 0] direction, a [−1 0 0] direction, or a [1 −1 0] direction. Similarly, in FIG. 4B, lithium or manganese is stacked over a hexagonal structure formed by oxygen and is shifted in a [0 −1 1] direction, a [0 0 −1] direction, or a [0 1 1] direction. The positions of metal atoms (lithium and manganese) in FIGS. 4A and 4B are substantially the same. Thus, it is probable that the two structures have many common parts and are therefore compatible with each other when stacked.

Figure 5:
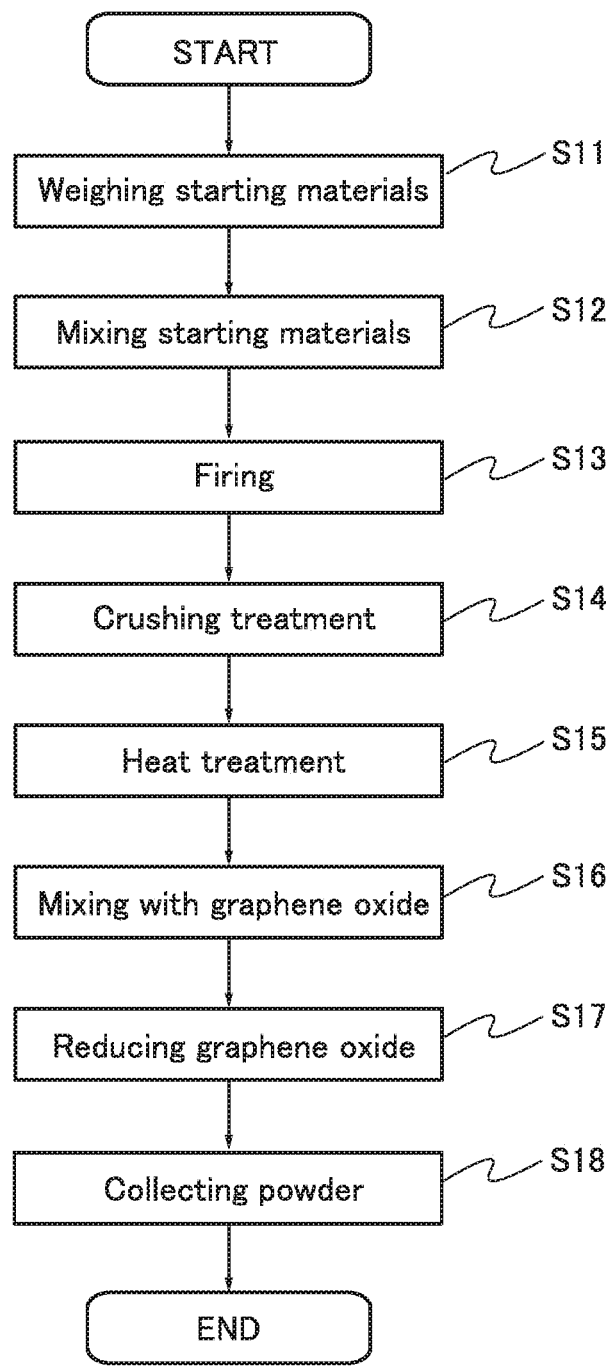
FIG. 5 is a flow chart of an example of a method for manufacturing an active material.

An example of a manufacturing method of the above particle is described below with reference to FIG. 5. In this embodiment, the lithium manganese complex oxide is synthesized first. Then, a coating layer is formed on the lithium manganese complex oxide, so that a particle including a first region, a second region, and a third region is obtained.

[Step S11: Weighing Starting Materials]

First, starting materials are weighed.

A manganese compound and a lithium compound can be used as raw materials of the lithium manganese complex oxide. In addition to the manganese compound and the lithium compound, a compound containing at least one selected from chromium, cobalt, aluminum, nickel, iron, magnesium, molybdenum, zinc, indium, gallium, copper, titanium, niobium, silicon, phosphorus, and the like can be used as a raw material. Examples of the manganese compound are manganese dioxide, dimanganese trioxide, trimanganese tetraoxide, manganese oxide hydrate, manganese carbonate, and manganese nitrate. Examples of the lithium compound are lithium hydroxide, lithium carbonate, and lithium nitrate.

In this embodiment, $MnCO_3$ (manganese compound), $Li_2CO_3$ (lithium compound), and NiO are used as starting materials.

In the case where $Li_2CO_3$, $MnCO_3$, and NiO are used as starting materials at a ratio for weighing (molar ratio) of 1:0.7:0.3, for example, a lithium manganese complex oxide $Li_2Mn_{0.7}Ni_{0.3}O_3$ is synthesized as a final product. In this case, the atomic ratio of Li to (Mn+Ni) is 2:1 in the lithium manganese complex oxide.

In this embodiment, the ratio for weighing (molar ratio) between the starting materials is adjusted so that the atomic ratio of Li to (Mn+Ni) in the lithium manganese complex oxide slightly deviates from 2:1.

In this embodiment, the starting materials are weighed so that the ratio for weighing (molar ratio) of $Li_2CO_3$ to $MnCO_3$ to NiO is 0.84:0.8062:0.318.

[Step S12: Mixing Starting Materials]

Next, $Li_2CO_3$, $MnCO_3$, and NiO are mixed. There is no particular limitation on a method for mixing the starting materials, and a crusher or a mill such as a ball mill, a bead mill, a jet mill, or a roller mill can be used, for example. A mixing method may be a dry method or a wet method. There is no particular limitation on a solvent that is used in a wet method, and water, alcohol, or acetone can be used as the solvent, for example.

In the case where the starting materials are mixed by a wet method, heat treatment is performed after mixing. The solvent contained in the mixed starting materials is evaporated by the heat treatment, whereby a mixed material can be obtained. The heat treatment is performed at higher than or equal to 50° C. and lower than or equal to 150° C., for example.

[Step S13: Firing]

Then, the mixed material is put in a crucible and firing is performed. The firing temperature is, for example, higher than or equal to 800° C. and lower than or equal to 1000° C. The firing is performed for longer than or equal to 5 hours and shorter than or equal to 20 hours in dry air at a flow rate of 10 L/min. The firing atmosphere may be an air atmosphere or an atmosphere containing an oxygen gas. Owing to the firing of the mixed material, a fired object (lithium manganese complex oxide) is formed.

[Step S14: Crushing Treatment]

The lithium manganese complex oxide which is synthesized by firing is in a state where the plurality of primary particles are sintered and a large secondary particle is formed. Therefore, crushing treatment is performed on the lithium manganese complex oxide in which the plurality of primary particles are sintered. By performing the crushing treatment on the fired object, the fired object is crushed into the primary particles or powder as small as the primary particles. The crushing treatment in this specification and the like includes an operation of grinding a sintered object. Note that grinding means crushing of the primary particles. As in the case of mixing the starting materials, a crusher or a mill such as a ball mill, a bead mill, a jet mill, or a roller mill can be used for the crushing treatment. A crushing and grinding method may be a dry method or a wet method. There is no particular limitation on a solvent that is used in a wet method, and water, alcohol, or acetone can be used as the solvent, for example.

The size of the particle subjected to crushing and grinding can be evaluated by measuring the specific surface area of the particle, for example. By increasing the specific surface area of the particle, for example, the area of contact between the particle and an electrolytic solution can be increased in the case of manufacturing a power storage device in which the particle is used for an electrode. The increase in the area of contact with the electrolytic solution can increase the reaction rate of the power storage device and increase the output characteristics, for example.

It is preferable to perform the crushing treatment because the specific surface area of the particle can be increased. The specific surface area of the "particle containing the lithium manganese complex oxide" is preferably greater than or equal to 0.1 $m^2/g$, for example. If the specific surface area of the particle is too much increased, the amount of binders in the electrode containing the particle with respect to the surface area becomes insufficient, and accordingly, the strength of the electrode is reduced in some cases. When the amount of binders is increased in this case, the capacity of the electrode per unit weight and unit volume is reduced in some cases. Therefore, the "specific surface area of the particle containing the lithium manganese complex oxide" is preferably greater than or equal to 1 m$^2$/g and less than or equal to 50 m$^2$/g, more preferably greater than or equal to 5 m$^2$/g and less than or equal to 30 m$^2$/g, for example.

In this embodiment, the crushing treatment of the lithium manganese complex oxide in which primary particles are sintered is performed with a bead mill by a wet method using acetone.

When the crushing treatment is performed by a wet method, heat treatment is performed after the crushing treatment. By the heat treatment, a solvent can be evaporated. The heat treatment is performed at higher than or equal to 50° C. and lower than or equal to 150° C., for example. After that, vacuum drying is performed, whereby powdery lithium manganese complex oxide is obtained.

[Step S15: Heat Treatment]

Next, heat treatment is performed in the following manner: the lithium manganese complex oxide subjected to the crushing treatment are put in a crucible and heated at higher than or equal to 300° C. and lower than or equal to 1000° C., preferably higher than or equal to 600° C. and lower than or equal to 900° C. The heat treatment is performed for longer than or equal to 5 hours and shorter than or equal to 20 hours in dry air at a flow rate of 10 L/min, for example. The heating atmosphere may be an air atmosphere or an atmosphere containing an oxygen gas.

Through the above steps, the lithium manganese complex oxide represented by the composition formula $Li_aMn_bM_cO_d$ can be formed. In this embodiment, the raw materials are weighed so that the ratio for weighing (molar ratio) of $Li_2CO_3$ to $MnCO_3$ to NiO becomes 0:84:0.8062:0.318, whereby a lithium manganese complex oxide represented by a composition formula $Li_{1.68}Mn_{0.8062}M_{0.318}O_3$ can be formed.

The crystallinity of the lithium manganese complex oxide subjected to the crushing treatment might be disordered by the impact of the crushing treatment. In addition, oxygen vacancies might be formed in the lithium manganese complex oxide. Thus, heat treatment is preferably performed on the powdery lithium manganese complex oxide subjected to the vacuum drying.

The heat treatment performed on the lithium manganese complex oxide subjected to the crushing treatment can repair oxygen vacancies and compensate the crystal disorder caused by the crushing treatment. Another crushing treatment may be performed on the powdery lithium manganese complex oxide subjected to the heat treatment.

The atomic ratio of Li to (Mn+Ni) in the lithium manganese complex oxide described in this embodiment slightly deviates from 2:1. Thus, when the electrode containing such a lithium manganese complex oxide is used, the voltage and the discharge capacity can be higher than when the electrode containing a lithium manganese complex oxide whose atomic ratio of Li to (Mn+Ni) is 2:1 is used.

Through the above steps, the lithium manganese complex oxide in the form of particles can be obtained. Here, the lithium manganese complex oxide preferably includes the first region and the second region.

Next, the coating layer is formed on the lithium manganese complex oxide. Here, the coating layer may correspond to the third region of the "particle containing the lithium manganese complex oxide," or may include the third region and part of the lithium manganese complex oxide. The second region included in the "particle containing the lithium manganese complex oxide" may include part of the coating layer, for example. The second region may include a layered region that is part of the coating layer.

In this embodiment, a layer containing carbon is provided as the coating layer. It is preferred to use graphene as the layer containing carbon.

In this embodiment, reduced graphene oxide (abbreviated to RGO) obtained by reducing graphene oxide (abbreviated to GO) is used as the layer containing carbon.

Various synthesis methods such as a Hummers method, a modified Hummers method, and oxidation of graphite can be used to form graphene oxide.

For example, in a Hummers method, graphite such as flake graphite is oxidized to give graphite oxide. The obtained graphite oxide is graphite that is oxidized in places and thus to which a functional group such as a carbonyl group, a carboxyl group, or a hydroxyl group is bonded. In the graphite oxide, the crystallinity of the graphite is impaired and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm. It is preferable that the flake size be as large as possible to cover surfaces of the lithium manganese complex oxide with ease.

First, graphene oxide and water are mixed to form a dispersion solution of graphene oxide. At this time, graphene oxide at greater than or equal to 0.5 wt % and less than or equal to 5 wt % is preferably used. Graphene oxide at less than 0.5 wt % might be insufficient to cover the surfaces of the lithium manganese complex oxide, whereas graphene oxide at greater than 5 wt % causes an increase in the volume and weight of the electrode.

[Step S16: Mixing with Graphene Oxide]

Next, the lithium manganese complex oxide is put in the dispersion solution of graphene oxide and kneading is performed. Note that kneading means mixing something so that it has a high viscosity. The kneading can separate aggregation of the powdery lithium manganese complex oxide; thus, the graphene oxide and the lithium manganese complex oxide can be uniformly dispersed.

Then, the mixture of the graphene oxide and the lithium manganese complex oxide is dried and then is ground, so that the lithium manganese complex oxide coated with graphene oxide is obtained. The drying can be performed in a bell jar under a reduced pressure, and the grinding can be performed using a mortar.

[Step S17: Reducing Graphene Oxide]

Subsequently, reduction treatment is performed on the graphene oxide covering the surface of the lithium manganese complex oxide. The reduction treatment of the graphene oxide may be performed by heat treatment or by causing a reaction in a solvent containing a reducing agent. In this embodiment, the graphene oxide is made to react in a solvent containing a reducing agent.

Note that the reduction of the graphene oxide may be performed during manufacture of the electrode. For example, the graphene oxide may be reduced after the lithium manganese complex oxide coated with the graphene oxide, the binder, and a conductive additive are mixed. Alternatively, the graphene oxide may be reduced after a layer containing the mixture is formed over a current collector. Polybenzoxazine is used as the binder in one embodiment of the present invention. Since polybenzoxazine has high heat resistance, the active material layer can be heated at high temperatures to reduce the graphene oxide. Thus, the graphene oxide may be thermally reduced by heating the mixture to give graphene. Alternatively, the graphene oxide may be chemically reduced by mixing the mixture with a reducing agent to give graphene.

When the graphene oxide is made to react in the solvent containing the reducing agent, the graphene oxide covering the surface of the lithium manganese complex oxide is reduced to give graphene. Note that oxygen in graphene oxide is not necessarily entirely deintercalated and may remain partly in the graphene. In the case where graphene contains oxygen, the proportion of oxygen in the graphene, which is measured by XPS, is higher than or equal to 2 atomic % and lower than or equal to 20 atomic %, preferably higher than or equal to 3 atomic % and lower than or equal to 15 atomic %. This reduction treatment is preferably performed at temperatures of room temperature to 150° C., more preferably at temperatures of room temperature to 80° C. The reduction treatment with heating can promote the reduction reaction. The reduction time of the graphene oxide can be longer than or equal to 3 minutes and shorter than or equal to 10 hours.

Examples of the reducing agent include ascorbic acid, hydrazine, dimethyl hydrazine, hydroquinone, sodium boron hydride ($NaBH_4$), lithium aluminum hydride ($LiAlH_4$), N,N-diethylhydroxylamine, and a derivative thereof. For example, ascorbic acid and hydroquinone are preferable to hydrazine or sodium tetrahydroborate in that they are safe owing to low reducing ability and utilized industrially with ease.

A polar solvent can be used as the solvent. Any material can be used for the solvent as long as it can dissolve the reducing agent. Examples of the material of the solvent include water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, glycerin, and a mixed solution of any two or more of the above.

As the reducing solution containing a reducing agent and a solvent, a mixed solution of ethanol and ascorbic acid, or a mixed solution of water, ascorbic acid, and lithium hydroxide can be used. In this embodiment, a reducing solution containing ascorbic acid, water, and lithium hydroxide is used.

When the graphene oxide covering the lithium manganese complex oxide is made to react in the reducing solution, protons of ascorbic acid are added to the graphene oxide and then $H_2O$ is released, whereby the graphene oxide is reduced.

[Step S18: Collecting Powder]

After the reduction treatment, collection of powder is performed. In this step, the reducing solution is filtrated. A substance obtained in this step is referred to as a substance A. The filtration can be suction filtration or the like. Alternatively, the substance A and a liquid may be separated from each other by centrifugation.

Next, the obtained substance A is washed. The washing is preferably performed using a solvent given as the solvent contained in the reducing solution. The solvent may be the same as or different from the solvent contained in the reducing solution.

Next, heating is performed. The heat treatment is preferably performed, for example, at a temperature higher than or equal to 50° C. and lower than 500° C., further preferably higher than or equal to 120° C. and lower than or equal to 400° C. for 1 hour to 48 hours. The heat treatment allows evaporation or removal of the polar solvent or moisture. The heat treatment can also facilitate the reduction of graphene oxide. The heat treatment is preferably performed under a reduced pressure (in vacuum), in a reduction atmosphere, or under an atmospheric pressure. As a gas, air, nitrogen, or any of other inert gases can be used.

Here, in the case where the substance A is a particle, the particle preferably forms a secondary particle, for example. In the case where the substance A forms a secondary particle, the average value of the particle diameters of secondary particles is preferably less than or equal to 50 μm, more preferably less than or equal to 30 μm, still more preferably greater than or equal to 1 μm and less than or equal to 20 μm. The particle diameter refers to, for example, a particle diameter measured with a particle size analyzer. The particle diameter may refer to a particle diameter of the secondary particle of the substance A. The particle diameter of the secondary particle can also be obtained by observation of the particle with a microscope, for example, as well as measurement with a particle size analyzer. Alternatively, as the diameter of the secondary particle, a diameter of a circle whose cross section is equal to that of the secondary particle can be calculated.

Note that another method may be used in which, after the substance A is washed, a liquid is formed by dispersing the substance A in a solvent, and the solution is subjected to spray dry treatment and dried, for example. By the spray dry treatment, the substance A forms a secondary particle, for example, so that a particle diameter is changed in some cases.

Heat treatment is preferably performed after the spray dry treatment. For example, the heat treatment is preferably performed at a temperature higher than or equal to 50° C. and lower than 500° C., further preferably higher than or equal to 120° C. and lower than or equal to 400° C. for 1 hour to 48 hours. The heat treatment allows evaporation or removal of the polar solvent or moisture. The heat treatment can also facilitate the reduction of graphene oxide. The heat treatment is preferably performed under a reduced pressure (in vacuum), in a reduction atmosphere, or under an atmospheric pressure. As a gas, air, nitrogen, or any of other inert gases can be used.

Through the above steps, the graphene oxide is reduced, so that graphene can be formed on the surface of the lithium manganese complex oxide. Through the above steps, a particle in which graphene is provided on at least part of a surface of the lithium manganese complex oxide can be formed.

Graphene has excellent electrical characteristics of high conductivity and excellent physical properties of high flexibility and high mechanical strength. Therefore, the use of the electrode containing the particle in a battery can improve the electrical conductivity and physical properties of the electrode, for example.

In some cases, the heat treatment after the reduction treatment can increase electrical conductivity of graphene as compared to that before the heat treatment.

The heat treatment can be performed at any of the following timings: before the formation of the electrode, during the formation process of the electrode, and after formation of the electrode.

By performing the heat treatment after the reduction treatment, the first region to the third region are formed in the "particle containing the lithium manganese complex oxide" in some cases. The first region to the third region may be formed before the heat treatment or in the heat treatment. The thickness, the composition, the crystal structure, and the like of the first region to the third region which have been formed before the heat treatment, for example, may be changed in the heat treatment.

For example, in the formation process of the electrode, heat treatment may be performed after the "particle containing the lithium manganese complex oxide" and the binder are mixed. As a result, an element of the binder and an element of the particle may react with each other.

For example, in the case where PVdF, which is a compound containing fluorine, is used as the binder, fluorine contained in PVdF and one or more of lithium, manganese, and the element M of the particle may form metal fluoride. An element contained in the coating layer and fluorine may form a bond. Here, a bond means a bonding state that can be observed by XPS analysis or the like, for example. Alternatively, bonding here means containing a material having the bond, for example. In the case where the coating layer is the layer containing carbon, a compound containing fluorine and carbon may be formed.

In one embodiment of the present invention, an element contained in the binder may have a bond with an element of another material included in the electrode (e.g., an active material, a conductive additive, or a current collector).

When a bond is formed between an element of the binder and an element of the particle (or an element of another material of the electrode), for example, the strength of the electrode can be further increased in some cases. When the bond is formed in advance, for example, an irreversible reaction can be suppressed in some cases when charging and discharging of the manufactured power storage device are performed.

The temperature of the heat treatment is lower than or equal to the temperature that the materials included in the particle or the electrode can withstand. For example, the temperature is higher than or equal to 120° C., preferably higher than or equal to 160° C., further preferably higher than or equal to 200° C., still further preferably higher than or equal to 250° C. Furthermore, the temperature is lower than or equal to 600° C., preferably lower than or equal to 500° C., further preferably lower than or equal to 400° C., still further preferably lower than or equal to 300° C., for example.

A gas such as oxygen, air, nitrogen, and a rare gas can be used as an atmosphere of the heat treatment. The heat treatment may be performed under an atmospheric pressure or a reduced pressure. For example, in the case where a gas containing oxygen is used, a reaction between materials of the electrode, such as the particle containing the lithium manganese complex oxide and the binder, can be promoted. Here, "a reaction with the binder is promoted" means that, for example, a bond between an element in the binder and an element in the particle containing the lithium manganese complex oxide is observed by XPS analysis or the like. In the case where an inert gas such as nitrogen or a rare gas is used, a change in the quality of materials of the electrode, such as the current collector, can be suppressed in some cases. In the case where the heat treatment is performed under a reduced pressure, a change in the quality of a material of the electrode, such as the current collector, can be suppressed in some cases.

By the above-described method, the "particle containing the lithium manganese complex oxide" can be formed.

In the case where a power storage device or the like is manufactured using the "particle containing the lithium manganese complex oxide," the first region to the third region might be formed in any of the steps before the completion of the power storage device. The regions may be formed in the formation process of the "particle containing the lithium manganese complex oxide" or the formation process of the storage battery. For example, the first region to the third region may be formed before the formation of the electrode, e.g., after the synthesis of the particle. Alternatively, the first region to the third region may be formed during the formation process of the electrode. The thickness, the composition, the crystal structure, and the like of the first region to the third region which are formed after the synthesis of the particle, for example, may be changed in the formation of the electrode. The first region to the third region may be formed in heat treatment in any of steps in the process for manufacturing the power storage device or the like.

In a process for forming the lithium manganese complex oxide, a crushing step of the lithium manganese complex oxide (Step S14, for example) in which primary particles are sintered is important because the step influences the characteristics of a battery. In the crushing step, a shear (grinding stress) is applied to the lithium manganese complex oxide in which the primary particles are sintered, whereby powdery lithium manganese complex oxide is formed. In the case where the lithium manganese complex oxide has a layered rock-salt crystal structure, a primary particle might be cleaved and cracked along a plane parallel or perpendicular to the layer at this time. The cleaved and cracked primary particle is called a particle having a cleavage plane or a particle with a cleavage plane exposed, in this specification and the like. Note that some cracked primary particles do not have a cleavage plane.

In the case where a particle having a cleavage property, such as the lithium manganese complex oxide having a layered rock-salt crystal structure, is used as the active material, the active material might be cracked not only in the crushing step but also in a formation process of an electrode because a pressure is applied to an active material layer when the electrode is pressurized.

When a wound battery is formed, a great stress is caused at the time of winding an electrode. Even when a wound body of the electrode is stored in a housing, the active material might be further cracked because an outward stress from an axis of winding is exerted all the time.

Such cleavage and cracking of the primary particle of the lithium manganese complex oxide as the active material cause a decrease in the discharge capacity or cycle characteristics of a battery.

Also in the above-described case, a layer containing carbon is preferably formed on a cleavage plane of the lithium manganese complex oxide. The layer containing carbon may cover the entire cleavage plane or the whole lithium manganese complex oxide having a cleavage plane. Here, "cleavage plane" includes a plane exposed by cleavage, for example.

In one embodiment of the present invention, graphene is formed so as to cover the lithium manganese complex oxide. The graphene may be formed on either the whole or part of the surface of the lithium manganese complex oxide. The graphene is preferably formed so as to cover an exposed cleavage plane of a particle. The graphene is formed on at least part of a cleavage plane of the lithium manganese complex oxide. When the active material in which at least part of the cleavage plane is covered with graphene is used for an electrode, a decrease in the voltage or discharge capacity of a battery can be prevented. Accordingly, the charge-discharge cycle characteristics of the battery can be improved.

Graphene has excellent physical properties of high flexibility and high mechanical strength. For this reason, in a battery including an electrode containing the active material, the lithium manganese complex oxide can be prevented from being further cleaved and cracked because of the volume change even when the lithium manganese complex oxide repeats expansion and contraction accompanying repeated charging and discharging of the battery.

In addition, pressure applied to the lithium manganese complex oxide, which is due to pressure applied to the electrode in a formation process of the electrode, can be alleviated owing to the mechanical strength of graphene. This can prevent the lithium manganese complex oxide from being further cleaved and cracked.

Moreover, even when a great stress is exerted at the time of winding an electrode of a wound battery or even when an outward stress from an axis of winding is applied to the electrode all the time in the case where a wound body of the electrode is stored in a housing, the lithium manganese complex oxide can be prevented from being further cleaved and cracked.

As described above, in the case where the particle containing the lithium manganese complex oxide described in this embodiment is used for an electrode, polybenzoxazine that has resistance to a base and high heat resistance can be favorably used for a binder as in one embodiment of the present invention. Furthermore, by using polybenzoxazine and a compound containing fluorine (e.g., PVdF) for a binder, a bond may be formed between an atom of the particle and fluorine. Note that a bond may be formed between an atom of the particle and an atom of polybenzoxazine.

This embodiment can be implemented in appropriate combination with any of other embodiments.

Embodiment 3

In this embodiment, a variety of modes of the power storage device of one embodiment of the present invention are described with reference to FIGS. 6A to 6C, FIGS. 7A and 7B, FIGS. 8A and 8B, FIG. 9, FIGS. 10A and 10B, FIGS. 11A to 11C, FIG. 12, FIGS. 13A and 13B, FIGS. 14A and 14B, FIGS. 15A and 15B, FIGS. 16A and 16B, FIGS. 17A to 17C, FIGS. 18A and 18B, FIGS. 19A1, 19A2, 19B1, and 19B2, and FIGS. 20A and 20B. Note that the power storage device of one embodiment of the present invention is not limited to the structures described in this embodiment, and various shapes and modes can be used.

Although a lithium ion secondary battery is described as an example in this embodiment, the power storage device of one embodiment of the present invention is not limited to this example.

The power storage device in this embodiment includes a pair of electrodes (a positive electrode and a negative electrode), and the pair of electrodes each include an active material layer and a current collector. The power storage device in this embodiment includes polybenzoxazine as a binder in at least one of the positive electrode active material layer and the negative electrode active material layer. In this manner, the power storage device can have excellent charge and discharge characteristics. For example, the positive electrode active material layer preferably contains polybenzoxazine. Furthermore, the positive electrode active material layer may contain a compound having a benzoxazine ring. In addition to polybenzoxazine, a material serving as a binder may be contained in the positive electrode active material layer.

[Thin Storage Battery]

Figure 6A:
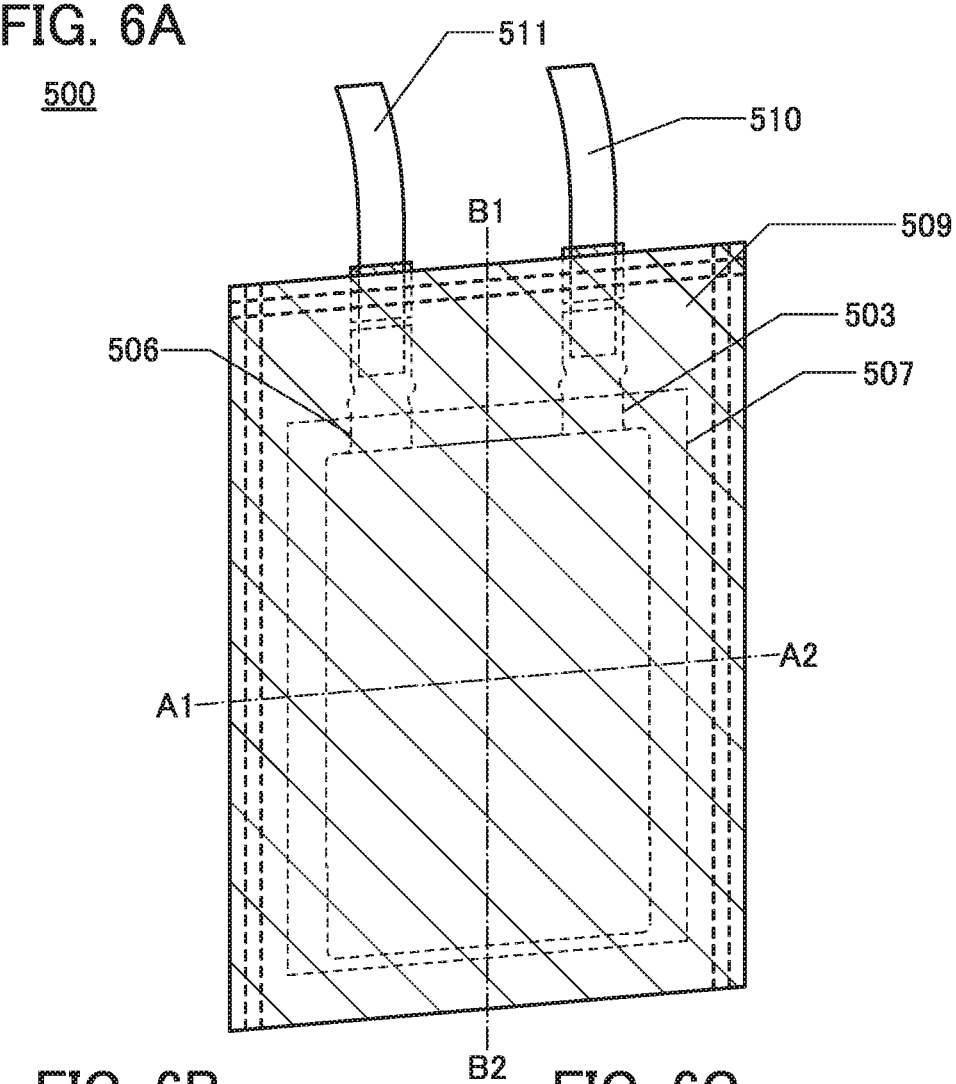
FIGS. 6A to 6C illustrate an example of a power storage device and examples of electrodes.

FIG. 6A illustrates a battery cell 500. Although FIG. 6A illustrates a mode of a thin storage battery as an example of the battery cell 500, the power storage device of one embodiment of the present invention is not limited to this example.

As illustrated in FIG. 6A, the battery cell 500 includes a positive electrode 503, a negative electrode 506, a separator 507, and an exterior body 509. The battery cell 500 may include a positive electrode lead 510 and a negative electrode lead 511.

Figure 7A:
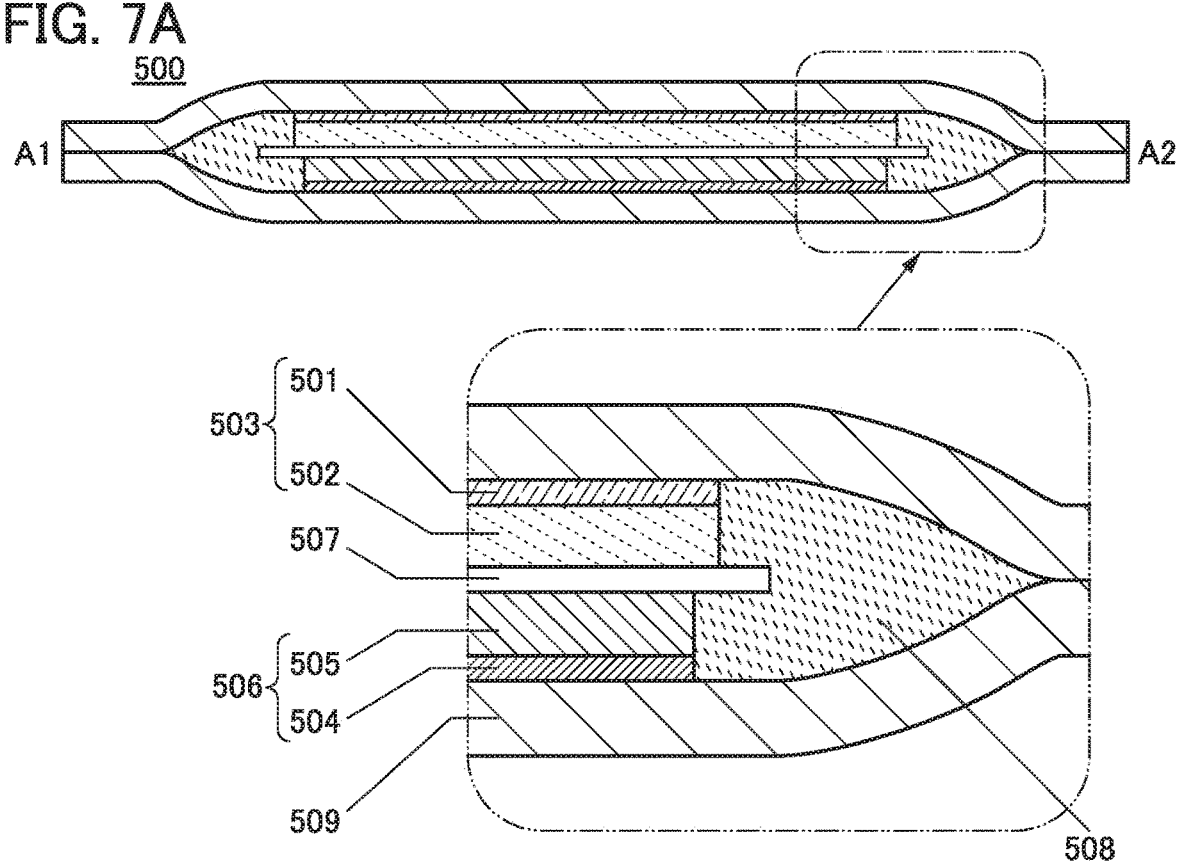
FIGS. 7A and 7B illustrate examples of a power storage device.
Figure 7B:
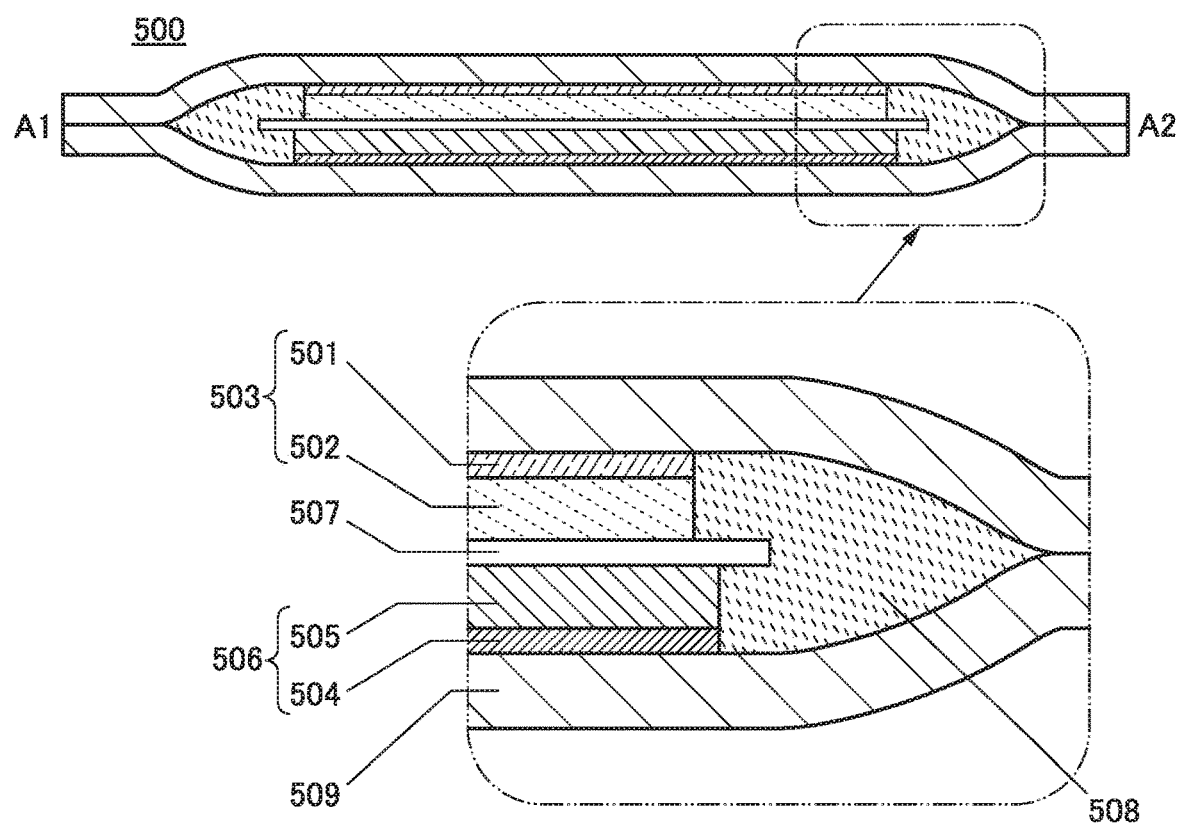

FIGS. 7A and 7B each illustrate an example of a cross-sectional view taken along the dashed-dotted line A1-A2 in FIG. 6A. FIGS. 7A and 7B each illustrate a cross-sectional structure of the battery cell 500 that is formed using a pair of the positive electrode 503 and the negative electrode 506.

As illustrated in FIGS. 7A and 7B, the battery cell 500 includes the positive electrode 503, the negative electrode 506, the separator 507, an electrolytic solution 508, and the exterior body 509. The separator 507 is interposed between the positive electrode 503 and the negative electrode 506. The exterior body 509 is filled with the electrolytic solution 508.

The positive electrode 503 includes a positive electrode active material layer 502 and a positive electrode current collector 501. The negative electrode 506 includes a negative electrode active material layer 505 and a negative electrode current collector 504. The active material layer can be formed on one or both surfaces of the current collector. The separator 507 is positioned between the positive electrode current collector 501 and the negative electrode current collector 504.

The battery cell includes one or more positive electrodes and one or more negative electrodes. For example, the battery cell can have a stacked-layer structure including a plurality of positive electrodes and a plurality of negative electrodes.

Figure 8A:
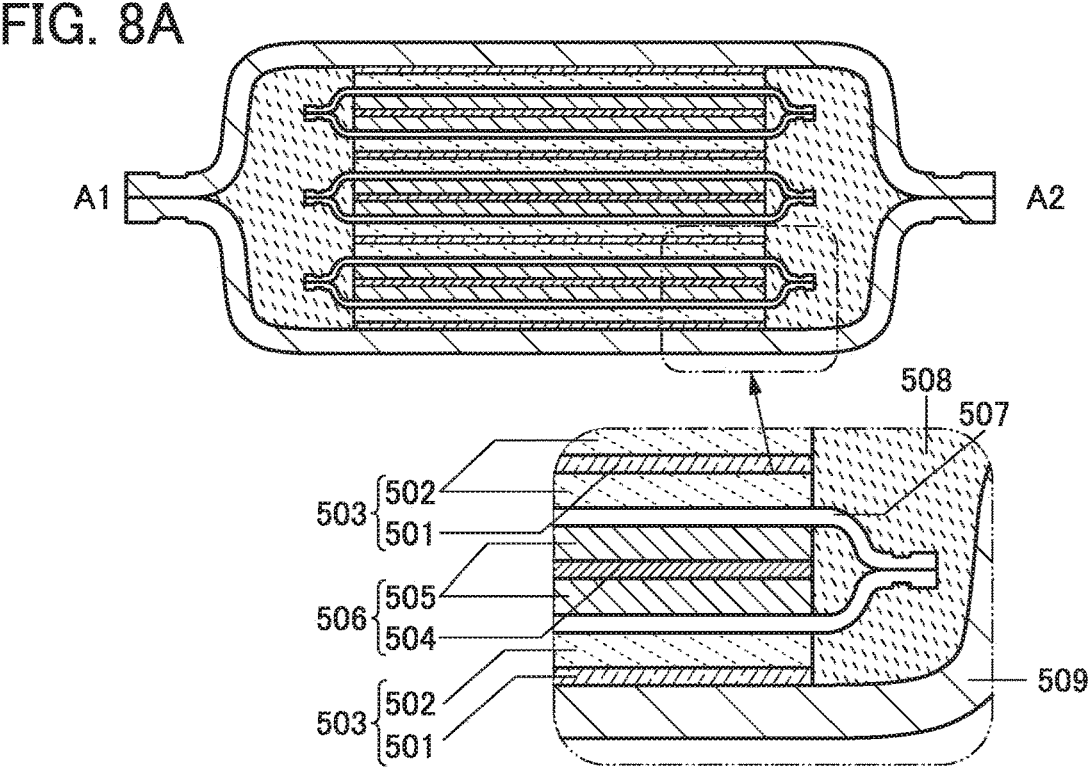
FIGS. 8A and 8B illustrate an example of a power storage device.
Figure 8B:
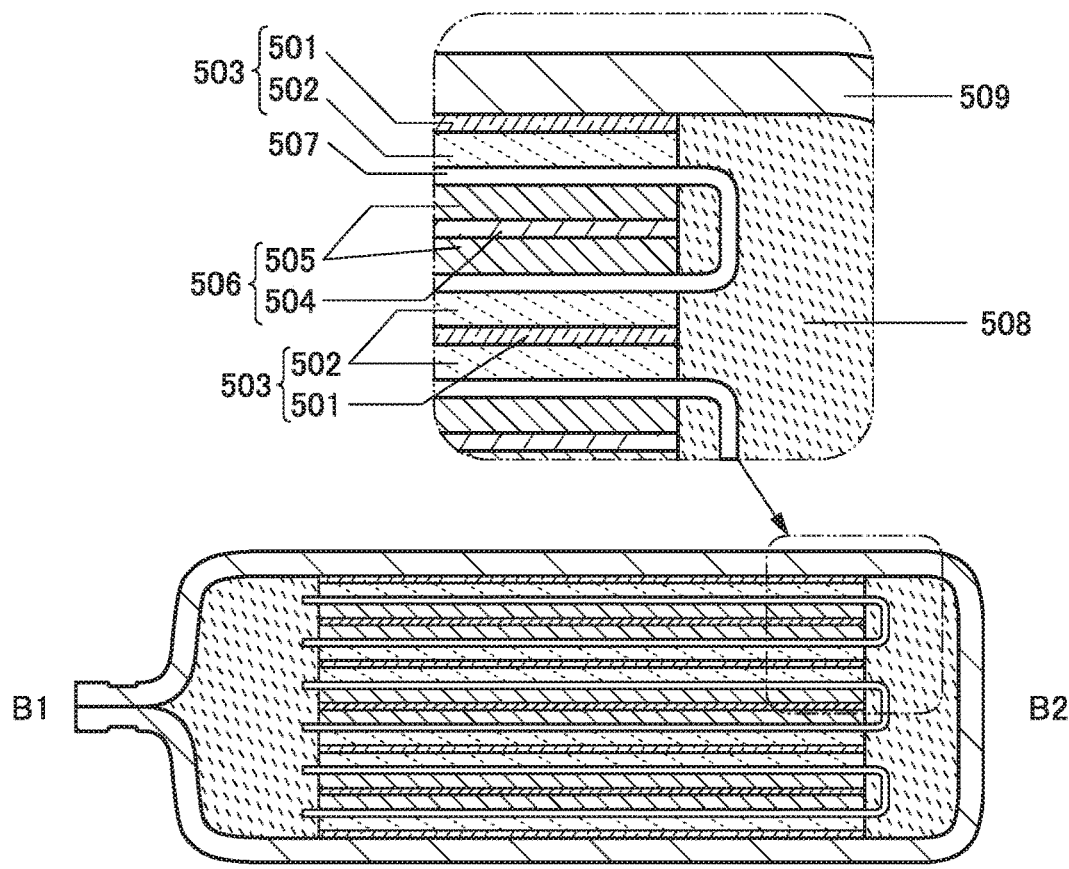

FIG. 8A illustrates another example of a cross-sectional view taken along the dashed-dotted line A1-A2 in FIG. 6A. FIG. 8B is a cross-sectional view taken along the dashed-dotted line B1-B2 in FIG. 6A.

FIGS. 8A and 8B illustrate a cross-sectional structure of the battery cell 500 that is formed using a plurality of pairs of the positive electrode 503 and the negative electrode 506. There is no limitation on the number of electrode layers of the battery cell 500. In the case of using a large number of electrode layers, the power storage device can have high capacity. In contrast, in the case of using a small number of electrode layers, the power storage device can have a small thickness and high flexibility.

The examples in FIGS. 8A and 8B each include two positive electrodes 503 in each of which the positive electrode active material layer 502 is provided on one surface of the positive electrode current collector 501; two positive electrodes 503 in each of which the positive electrode active material layers 502 are provided on both surfaces of the positive electrode current collector 501; and three negative electrodes 506 in each of which the negative electrode active material layers 505 are provided on both surfaces of the negative electrode current collector 504. In other words, the battery cell 500 includes six positive electrode active material layers 502 and six negative electrode active material layers 505. Note that although the separator 507 has a bag-like shape in the examples illustrated in FIGS. 8A and 8B, the present invention is not limited to this example and the separator 507 may have a strip shape or a bellows shape.

Figure 6B:
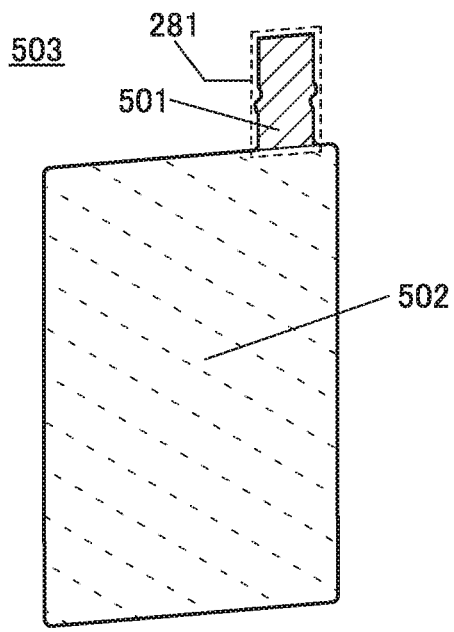

FIG. 6B illustrates the appearance of the positive electrode 503. The positive electrode 503 includes the positive electrode current collector 501 and the positive electrode active material layer 502.

Figure 6C:
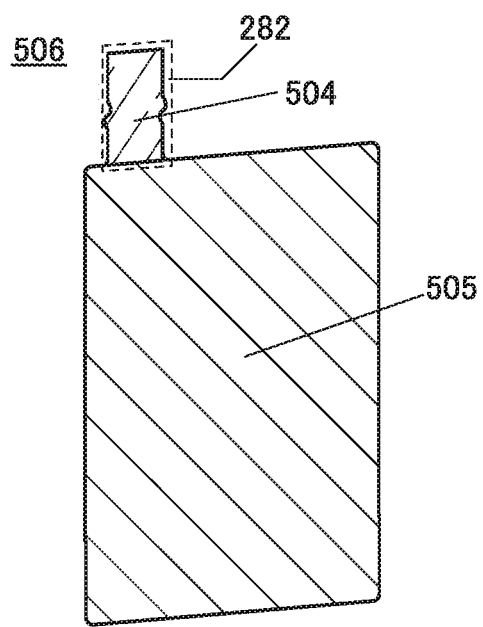

FIG. 6C illustrates the appearance of the negative electrode 506. The negative electrode 506 includes the negative electrode current collector 504 and the negative electrode active material layer 505.

The positive electrode 503 and the negative electrode 506 preferably include tab regions so that a plurality of stacked positive electrodes can be electrically connected to each other and a plurality of stacked negative electrodes can be electrically connected to each other. Furthermore, an electrode lead is preferably electrically connected to the tab region.

As illustrated in FIG. 6B, the positive electrode 503 preferably includes a tab region 281. The positive electrode lead 510 is preferably welded to part of the tab region 281. The tab region 281 preferably includes a region where the positive electrode current collector 501 is exposed. When the positive electrode lead 510 is welded to the region where the positive electrode current collector 501 is exposed, contact resistance can be further reduced. Although FIG. 6B illustrates the example where the positive electrode current collector 501 is exposed in the entire tab region 281, the tab region 281 may partly include the positive electrode active material layer 502.

As illustrated in FIG. 6C, the negative electrode 506 preferably includes a tab region 282. The negative electrode lead 511 is preferably welded to part of the tab region 282. The tab region 282 preferably includes a region where the negative electrode current collector 504 is exposed. When the negative electrode lead 511 is welded to the region where the negative electrode current collector 504 is exposed, contact resistance can be further reduced. Although FIG. 6C illustrates the example where the negative electrode current collector 504 is exposed in the entire tab region 282, the tab region 282 may partly include the negative electrode active material layer 505.

Although FIG. 6A illustrates the example where the end portions of the positive electrode 503 and the negative electrode 506 are substantially aligned with each other, part of the positive electrode 503 may extend beyond the end portion of the negative electrode 506.

In the battery cell 500, the area of a region where the negative electrode 506 does not overlap with the positive electrode 503 is preferably as small as possible.

In the example illustrated in FIG. 7A, the end portion of the negative electrode 506 is positioned on an inner side of the positive electrode 503. With this structure, the entire negative electrode 506 can overlap with the positive electrode 503 or the area of the region where the negative electrode 506 does not overlap with the positive electrode 503 can be small.

The areas of the positive electrode 503 and the negative electrode 506 in the battery cell 500 are preferably substantially equal. For example, the areas of the positive electrode 503 and the negative electrode 506 that face each other with the separator 507 therebetween are preferably substantially equal. For example, the areas of the positive electrode active material layer 502 and the negative electrode active material layer 505 that face each other with the separator 507 therebetween are preferably substantially equal.

For example, as illustrated in FIGS. 8A and 8B, the area of the positive electrode 503 on the separator 507 side is preferably substantially equal to the area of the negative electrode 506 on the separator 507 side. When the area of the positive electrode 503 on the negative electrode 506 side is substantially equal to the area of the negative electrode 506 on the positive electrode 503 side, the region where the negative electrode 506 does not overlap with the positive electrode 503 can be small (does not exist, ideally), whereby the battery cell 500 can have reduced irreversible capacity. Alternatively, as illustrated in FIGS. 8A and 8B, the area of the positive electrode active material layer 502 on the separator 507 side is preferably substantially equal to the area of the negative electrode active material layer 505 on the separator 507 side.

As illustrated in FIGS. 8A and 8B, the end portion of the positive electrode 503 and the end portion of the negative electrode 506 are preferably substantially aligned with each other. End portions of the positive electrode active material layer 502 and the negative electrode active material layer 505 are preferably substantially aligned with each other.

In the example illustrated in FIG. 7B, the end portion of the positive electrode 503 is positioned on an inner side of the negative electrode 506. With this structure, the entire positive electrode 503 can overlap with the negative electrode 506 or the area of the region where the positive electrode 503 does not overlap with the negative electrode 506 can be small. In the case where the end portion of the negative electrode 506 is positioned inward from the end portion of the positive electrode 503, a current sometimes concentrates at the end portion of the negative electrode 506. For example, concentration of a current in part of the negative electrode 506 results in deposition of lithium on the negative electrode 506 in some cases. By reducing the area of the region where the positive electrode 503 does not overlap with the negative electrode 506, concentration of a current in part of the negative electrode 506 can be inhibited. As a result, deposition of lithium on the negative electrode 506 can be inhibited, for example.

As illustrated in FIG. 6A, the positive electrode lead 510 is preferably electrically connected to the positive electrode 503. Similarly, the negative electrode lead 511 is preferably electrically connected to the negative electrode 506. The positive electrode lead 510 and the negative electrode lead 511 are exposed to the outside of the exterior body 509 so as to serve as terminals for electrical contact with an external portion.

The positive electrode current collector 501 and the negative electrode current collector 504 can double as terminals for electrical contact with an external portion. In that case, the positive electrode current collector 501 and the negative electrode current collector 504 may be arranged so that part of the positive electrode current collector 501 and part of the negative electrode current collector 504 are exposed outside the exterior body 509 without using electrode leads.

Figure 9:
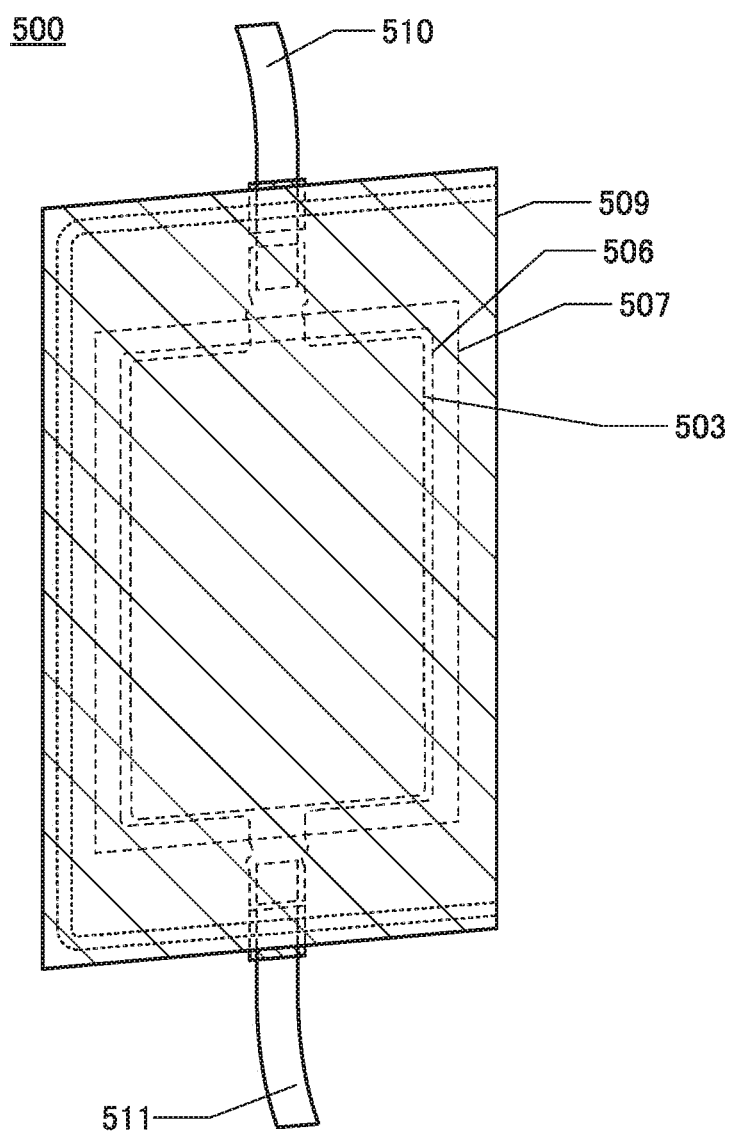
FIG. 9 illustrates an example of a power storage device.

Although the positive electrode lead 510 and the negative electrode lead 511 are provided on the same side of the battery cell 500 in FIG. 6A, the positive electrode lead 510 and the negative electrode lead 511 may be provided on different sides of the battery cell 500 as illustrated in FIG. 9. The electrode leads of the power storage device of one embodiment of the present invention can be freely positioned as described above; therefore, the degree of freedom in design is high. Accordingly, a product including the power storage device of one embodiment of the present invention can have a high degree of freedom in design. Furthermore, a yield of products each including the power storage device of one embodiment of the present invention can be increased.

Next, an example of a manufacturing method of the battery cell 500 is described with reference to FIGS. 10A and 10B, FIGS. 11A to 11C, and FIG. 12.

First, the positive electrode 503, the negative electrode 506, and the separator 507 are stacked. Specifically, the separator 507 is positioned over the positive electrode 503. Then, the negative electrode 506 is positioned over the separator 507. In the case of using two or more positive electrode-negative electrode pairs, another separator 507 is positioned over the negative electrode 506, and then, the positive electrode 503 is positioned. In this manner, the positive electrodes 503 and the negative electrodes 506 are alternately stacked and separated by the separator 507.

Alternatively, the separator 507 may have a bag-like shape. When the electrode is surrounded by the separator 507, damage caused to the electrode during a manufacturing process can be inhibited.

First, the positive electrode 503 is positioned over the separator 507. Then, the separator 507 is folded along the broken line in FIG. 10A so that the positive electrode 503 is sandwiched by the separator 507. Although the example where the positive electrode 503 is sandwiched by the separator 507 is described here, the negative electrode 506 may be sandwiched by the separator 507.

Here, it is preferable that the outer edges of the separator 507 outside the positive electrode 503 be bonded so that the separator 507 has a bag-like shape (or an envelope-like shape). The bonding of the outer edges of the separator 507 can be performed with the use of an adhesive or the like, by ultrasonic welding, or by thermal fusion bonding.

Figure 10A:
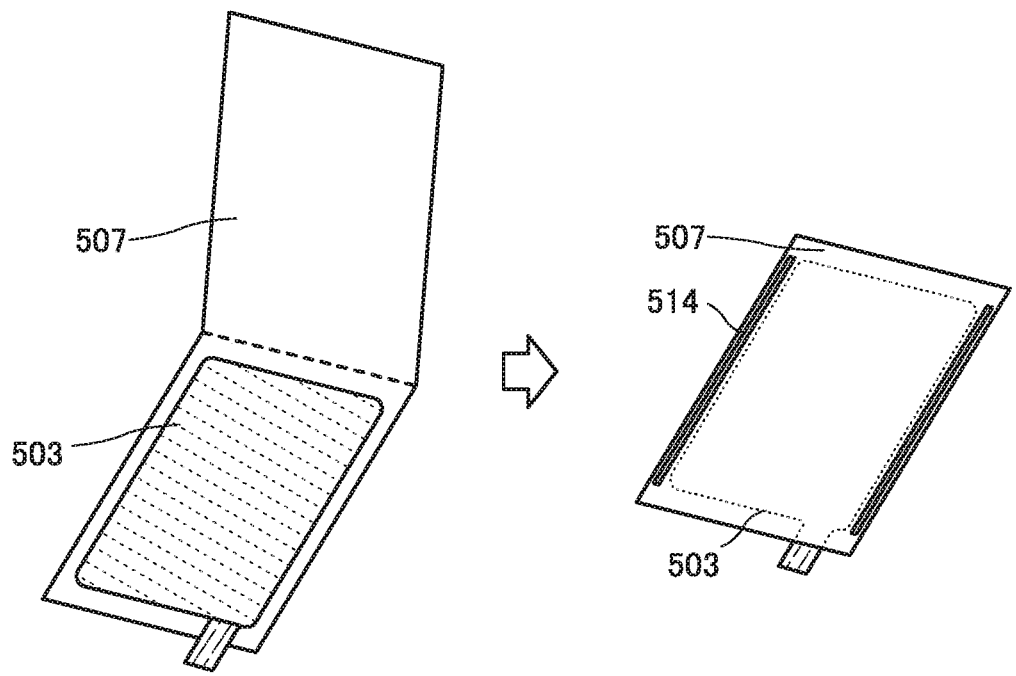
FIGS. 10A and 10B illustrate an example of a method for manufacturing a power storage device.

In this embodiment, polypropylene is used as the separator 507 and the outer edges of the separator 507 are bonded by heating. Bonding portions 514 are illustrated in FIG. 10A. In such a manner, the positive electrode 503 can be covered with the separator 507.

Figure 10B:
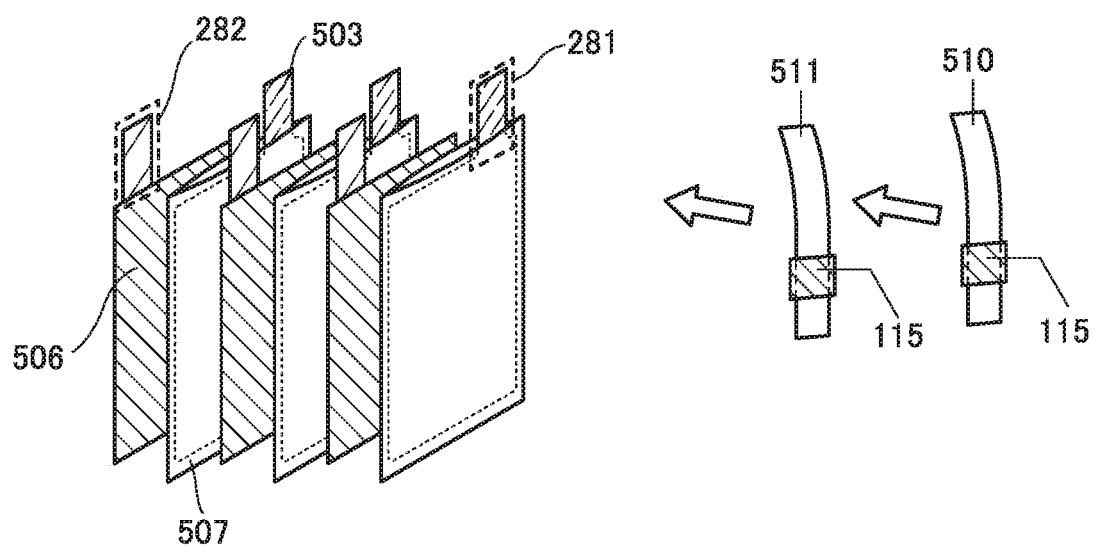

Then, the negative electrodes 506 and the positive electrodes 503 each covered with the separator are alternately stacked as illustrated in FIG. 10B. Furthermore, the positive electrode lead 510 and the negative electrode lead 511 each having a sealing layer 115 are prepared.

Figure 11A:
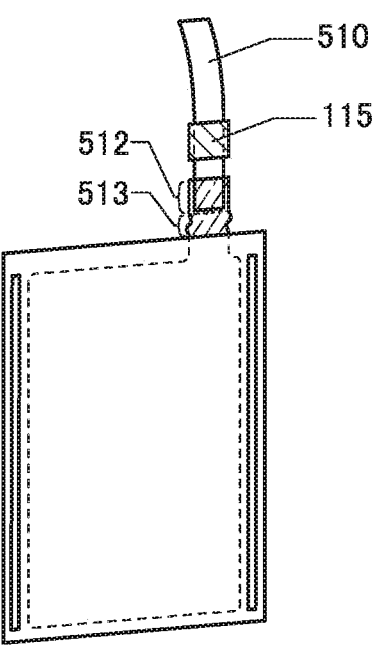
FIGS. 11A to 11C illustrate an example of a method for manufacturing a power storage device.
Figure 11B:
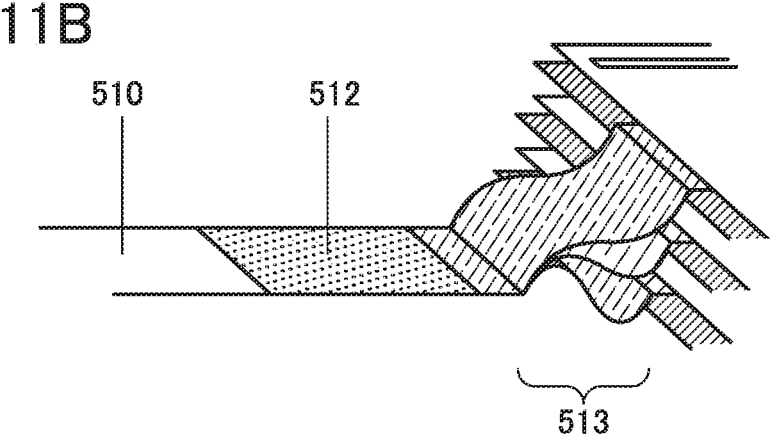

After that, the positive electrode lead 510 having the sealing layer 115 is connected to the tab region 281 of the positive electrode 503 as illustrated in FIG. 11A. FIG. 11B is an enlarged view of a connection portion. The tab region 281 of the positive electrode 503 and the positive electrode lead 510 are electrically connected to each other by irradiating the bonding portion 512 with ultrasonic waves while applying pressure thereto (ultrasonic welding). In that case, a curved portion 513 is preferably provided in the tab region 281.

This curved portion 513 can relieve stress due to external force applied after fabrication of the battery cell 500. Thus, the battery cell 500 can have high reliability.

The tab region 282 of the negative electrode 506 and the negative electrode lead 511 can be electrically connected to each other by a similar method.

Subsequently, the positive electrode 503, the negative electrode 506, and the separator 507 are positioned over the exterior body 509.

Figure 11C:
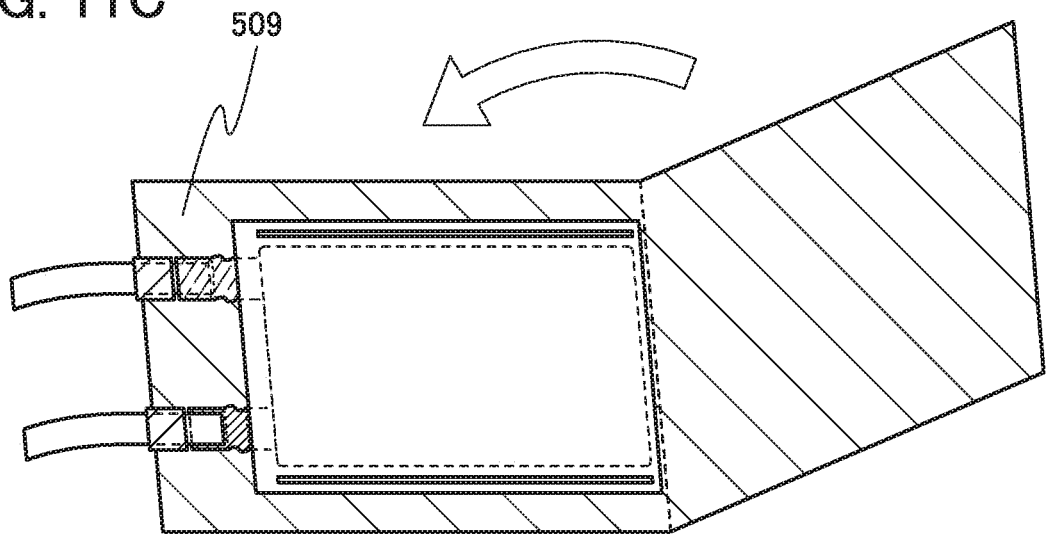

Then, the exterior body 509 is folded along a portion shown by the dotted line in the vicinity of a center portion of the exterior body 509 in FIG. 11C.

Figure 12:
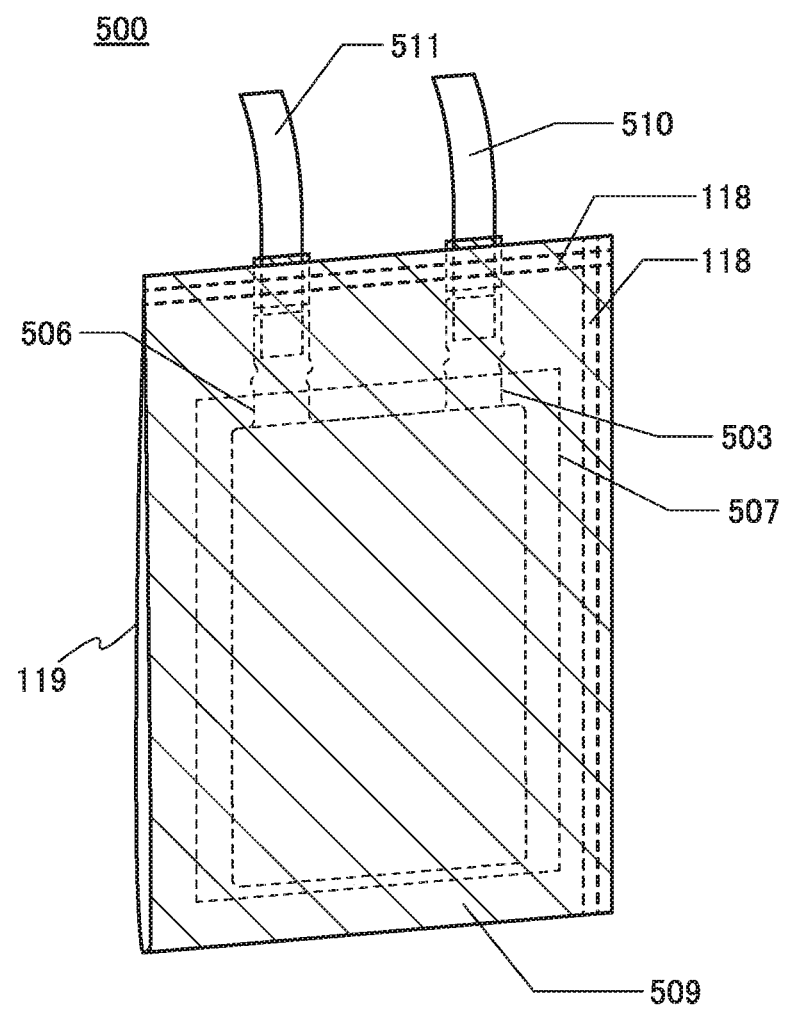
FIG. 12 illustrates an example of a method for manufacturing a power storage device.

In FIG. 12, the thermocompression bonding portion in the outer edges of the exterior body 509 is illustrated as a bonding portion 118. The outer edges of the exterior body 509 except an inlet 119 for introducing the electrolytic solution 508 are bonded by thermocompression bonding. In thermocompression bonding, the sealing layers provided over the electrode leads are also melted, thereby fixing the electrode leads and the exterior body 509 to each other. Moreover, adhesion between the exterior body 509 and the electrode leads can be increased.

After that, in a reduced-pressure atmosphere or an inert gas atmosphere, a desired amount of electrolytic solution 508 is introduced to the inside of the exterior body 509 from the inlet 119. Lastly, the inlet 119 is sealed by thermocompression bonding. Through the above steps, the battery cell 500, which is a thin storage battery, can be fabricated.

Aging is preferably performed after fabrication of the battery cell 500. The aging can be performed under the following conditions, for example. Charging is performed at a rate of 0.001 C or more and 0.2 C or less at a temperature higher than or equal to room temperature and lower than or equal to 50° C. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual current density is increased.

When the current density is extremely high, a voltage drop occurs depending on the resistance of the electrode, lithium is intercalated into graphite and lithium is deposited on the surface of graphite. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

In the case of performing degasification, for example, part of the exterior body of the thin storage battery is cut to open the storage battery. When the exterior body is expanded because of a gas, the form of the exterior body is preferably adjusted. Furthermore, the electrolytic solution may be added as needed before resealing.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charging, an electrolytic solution decomposed on the surface forms a coating film. The formed coating film may thus be densified when the charging state is held at a temperature higher than room temperature after the release of the gas, for example.

Other components of the power storage device of one embodiment of the present invention are described in detail below. When a flexible material is selected from materials of the members described in this embodiment and used, a flexible power storage device can be fabricated. Note that Embodiments 1 and 2 can be referred to for materials that can be used for the positive electrodes and negative electrodes of the power storage devices described in this embodiment.

<<Electrolytic Solution>>

As a solvent of the electrolytic solution 508, an aprotic organic solvent is preferably used. For example, one of ethylene carbonate (EC), propylene carbonate (PC), butylene carbonate, chloroethylene carbonate, vinylene carbonate (VC), γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more kinds of ionic liquids (room temperature molten salts) which have features of non-flammability and non-volatility as a solvent of the electrolytic solution can prevent a power storage device from exploding or catching fire even when the power storage device internally shorts out or the internal temperature increases owing to overcharging or the like. An ionic liquid contains a cation and an anion. The ionic liquid contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $Li(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is preferably less than or equal to 1%, further preferably less than or equal to 0.1%, and still further preferably less than or equal to 0.01%.

Furthermore, an additive agent such as vinylene carbonate (VC), propane sultone (PS), tert-butylbenzene (TBB), fluoroethylene carbonate (FEC), and LiBOB may be added to the electrolytic solution. The concentration of such an additive agent in the whole solvent is, for example, higher than or equal to 0.1 wt % and lower than or equal to 5 wt %.

Alternatively, a polymer gel electrolyte obtained in such a manner that a polymer is swelled with an electrolytic solution may be used.

Examples of the polymer include a polymer having a polyalkylene oxide structure, such as polyethylene oxide (PEO); PVdF; polyacrylonitrile; and a copolymer containing any of them. For example, PVdF-HFP, which is a copolymer of PVdF and hexafluoropropylene (HFP) can be used. The polymer may be porous.

An electrolytic solution may be gelated by adding a polymerization initiator and a cross-linking agent to the electrolytic solution. For example, the ionic liquid itself may be polymerized in such a manner that a polymerizable functional group is introduced into a cation or an anion of the ionic liquid and polymerization thereof is caused with the polymerization initiator. Then, the polymerized ionic liquid may be gelated with a cross-linking agent.

In combination with the electrolytic solution, a solid electrolyte including an inorganic material such as a sulfide-based inorganic material and an oxide-based inorganic material, or a solid electrolyte including a macromolecular material such as a polyethylene oxide (PEO)-based macromolecular material may alternatively be used. For example, the solid electrolyte may be formed over a surface of the active material layer. In the case of using the solid electrolyte and the electrolytic solution in combination, at least one of a separator and a spacer does not need to be provided in some cases.

When a macromolecular material that undergoes gelation is used as the solvent for the electrolytic solution, safety against liquid leakage and the like is improved. Further, the power storage device can be thinner and more lightweight. For example, a polyethylene oxide-based polymer, a polyacrylonitrile-based polymer, a polyvinylidene fluoride-based polymer, a polyacrylate based polymer, and a polymethacrylate-based polymer can be used. A polymer which can gelate the electrolytic solution at normal temperature (e.g., 25° C.) is preferably used. Alternatively, a silicone gel may be used. In this specification and the like, the term polyvinylidene fluoride-based polymer, for example, refers to a polymer including polyvinylidene fluoride (PVdF), and includes a poly(vinylidene fluoride-hexafluoropropylene) copolymer and the like.

The above polymer can be qualitatively analyzed using a Fourier transform infrared (FT-IR) spectrometer or the like. For example, the polyvinylidene fluoride-based polymer has an absorption peak showing a C—F bond in a spectrum obtained with the FT-IR spectrometer. Furthermore, the polyacrylonitrile-based polymer has an absorption peak showing a C≡N bond in a spectrum obtained with the FT-Ir spectrometer.

<<Separator>>

As the separator 507, paper, nonwoven fabric, a glass fiber, ceramics, a synthetic fiber such as nylon (polyamide), vinylon (a polyvinyl alcohol based fiber), polyester, acrylic, polyolefin, or polyurethane, or the like can be used. The separator 507 may have a single-layer structure or a stacked-layer structure.

More specifically, for the separator 507, fluorine-based polymers, polyethers such as a polyethylene oxide and a polypropylene oxide, polyolefins such as polyethylene and polypropylene, polyacrylonitrile, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, and polyurethane based high molecular compounds, and derivatives thereof, cellulose, paper, nonwoven fabric, and glass fiber can be used either alone or in combination, for example.

<<Exterior Body>>

It is preferred that the surface of the exterior body 509 that is in contact with the electrolytic solution 508, i.e., the inner surface of the exterior body 509, not react with the electrolytic solution 508 significantly. When moisture enters the battery cell 500 from the outside, a reaction between a component of the electrolytic solution 508 or the like and water might occur. Thus, the exterior body 509 preferably has low moisture permeability.

As the exterior body 509, for example, a film having a three-layer structure in which a highly flexible metal thin film of aluminum, stainless steel, copper, nickel, or the like is provided over a film formed using a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be obtained. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inside in two, the sealing portion is formed in the place other than the fold, and a first region of the exterior body and a second region of the exterior body that overlaps with the first region are fusion-bonded, for example. In the case where two exterior bodies are stacked, the sealing portion is formed along the entire outer region by heat fusion bonding or the like.

The battery cell 500 can be flexible by using the exterior body 509 with flexibility. When the battery cell has flexibility, it can be used in an electronic device at least part of which is flexible, and the battery cell 500 can be bent as the electronic device is bent.

[Storage Battery Using Wound Body]

FIGS. 13A and 13B and FIGS. 14A and 14B illustrate structural examples of a storage battery using a wound body that is a power storage device of one embodiment of the present invention.

Figure 13A:
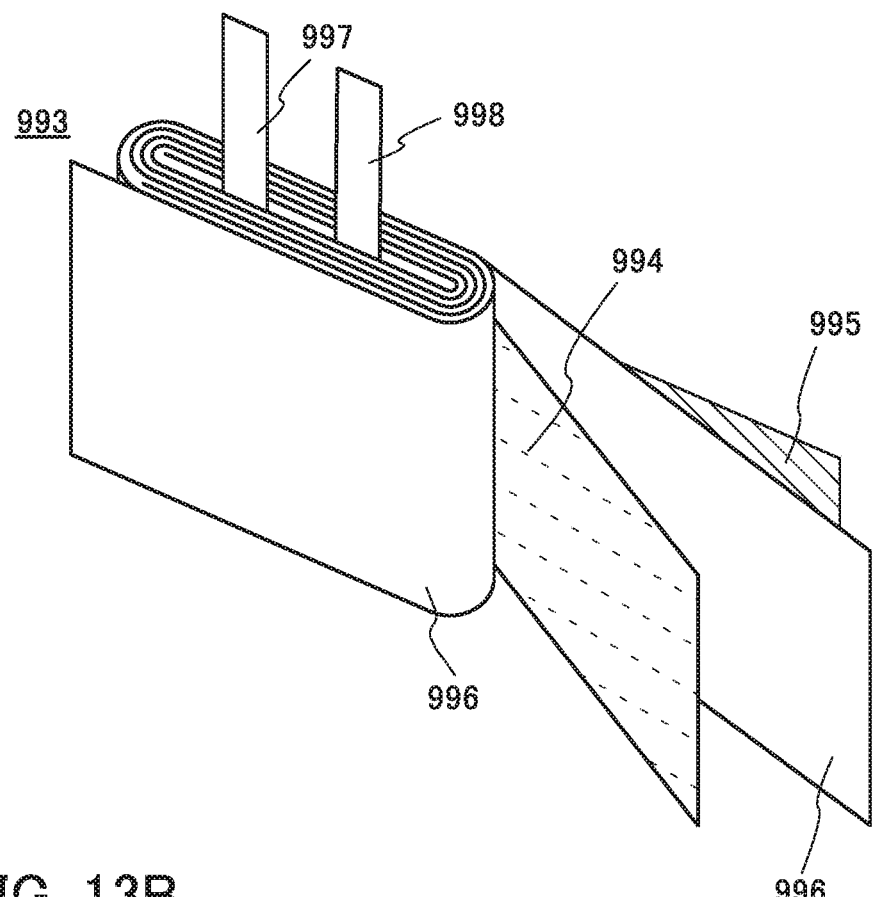
FIGS. 13A and 13B illustrate examples of a power storage device.
Figure 13B:
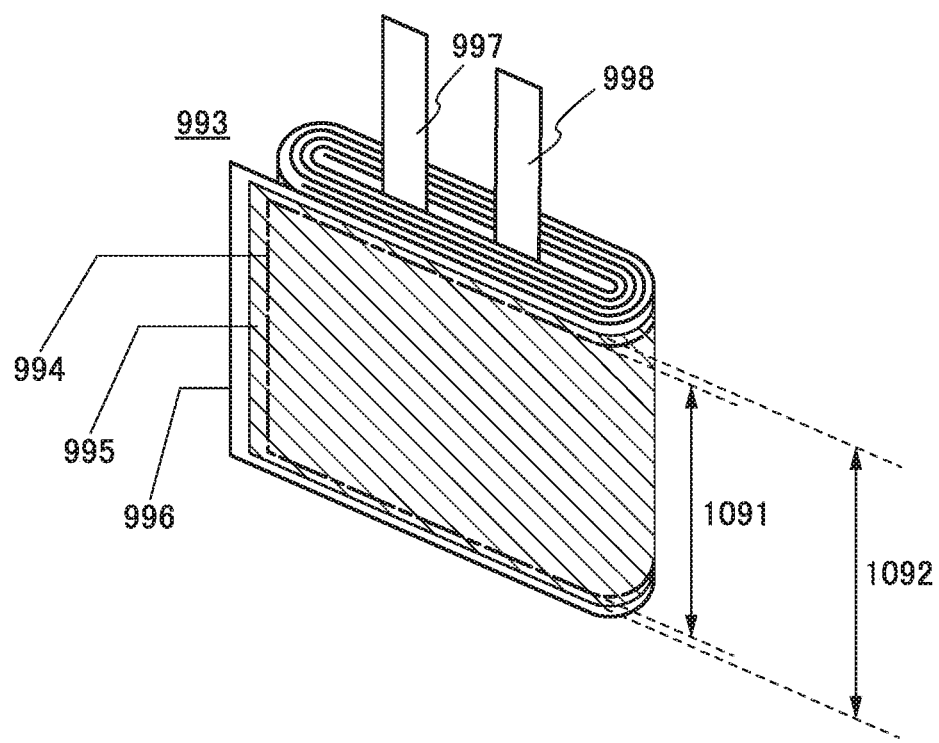

A wound body 993 illustrated in FIGS. 13A and 13B includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular storage battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a terminal 997 and a terminal 998. The positive electrode 995 is connected to a positive electrode current collector (not illustrated) via the other of the terminal 997 and the terminal 998.

The area of a region where the negative electrode 994 does not overlap with the positive electrode 995 is preferably as small as possible. FIG. 13B illustrates the example where a width 1091 of the negative electrode 994 is smaller than a width 1092 of the positive electrode 995. In addition, an end portion of the negative electrode 994 is located on an inner side of the positive electrode 995. With such a structure, the entire negative electrode 994 can overlap with the positive electrode 995 or the area of a region where the negative electrode 994 and the positive electrode 995 do not overlap with each other can be reduced.

In the case where the area of the positive electrode 995 is too larger than that of the negative electrode 994, an excess portion of the positive electrode 995 is large, which reduces the capacity of a storage battery per unit volume, for example. Thus, the end portion of the negative electrode 994 is preferably located inward from the end portions of the positive electrode 995, for example. Furthermore, the distance between the end portion of the positive electrode 995 and the end portion of the negative electrode 994 is preferably 3 mm or less, more preferably 0.5 mm or less, still more preferably 0.1 mm or less. Alternatively, the difference between the widths of the positive electrode 995 and the negative electrode 994 is preferably 6 mm or less, more preferably 1 mm or less, still more preferably 0.2 mm or less.

Alternatively, it is preferred that the widths 1091 and 1092 be approximately equal values and the end portion of the negative electrode 994 be substantially aligned with the end portion of the positive electrode 995.

Figure 14A:
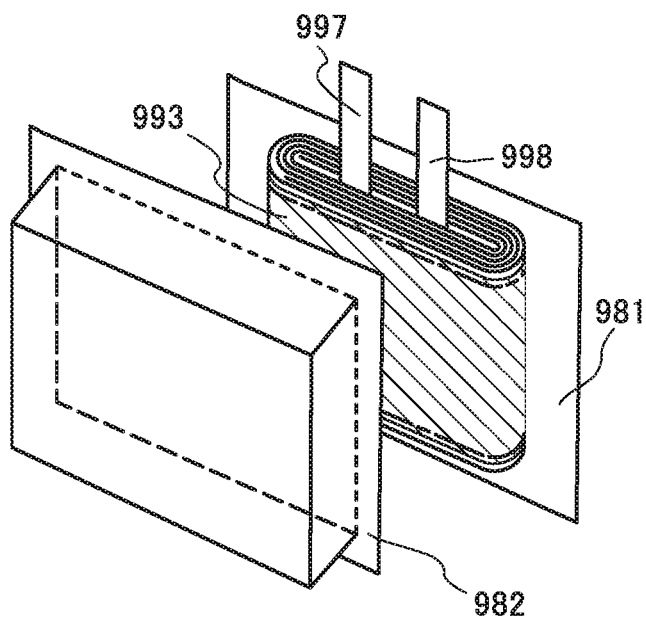
FIGS. 14A and 14B illustrate an example of a power storage device.
Figure 14B:
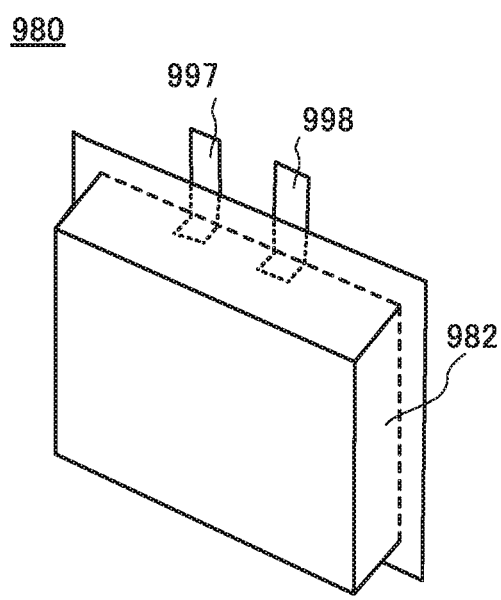

A storage battery 980 illustrated in FIG. 14B includes, as illustrated in FIG. 14A, a film 981, a film 982 having a depressed portion, and the wound body 993. In the storage battery 980, the wound body 993 is packed in a space formed by bonding the film 981 and the film 982 that serve as exterior bodies by thermocompression bonding or the like. The wound body 993 includes the terminal 997 and the terminal 998, and is soaked in an electrolytic solution inside a space surrounded by the film 981 and the film 982.

For the film 981 and the film 982, a metal material such as aluminum or a resin material can be used, for example. With the use of a resin material for the film 981 and the film 982, the film 981 and the film 982 can be changed in their forms when external force is applied; thus, a flexible storage battery can be fabricated.

Although FIGS. 14A and 14B illustrate an example where a space is formed by two films, the wound body 993 may be placed in a space formed by bending one film.

Furthermore, use of a resin material or the like for an exterior body or a sealed container enables the entire power storage device to be flexible. Note that in the case where a resin material is used for the exterior body or the sealed container, a conductive material is used for a portion connected to the outside.

Figure 15A:
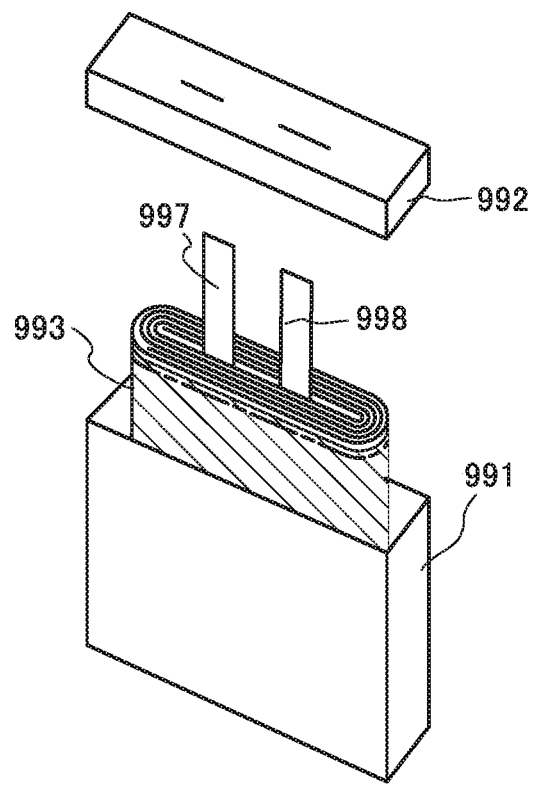
FIGS. 15A and 15B illustrate an example of a power storage device.
Figure 15B:
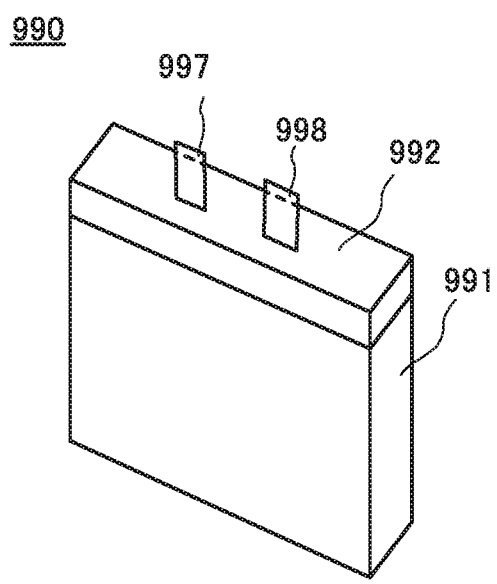

The storage battery 990 illustrated in FIG. 15B includes, as illustrated in FIG. 15A, an exterior body 991, an exterior body 992, and the wound body 993.

In the storage battery 990 illustrated in FIG. 15B, the wound body 993 is packed in the exterior body 991. The wound body 993 includes the terminal 997 and the terminal 998, and is soaked in an electrolytic solution inside a space surrounded by the exterior body 991 and the exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible storage battery can be fabricated.

[Cylindrical Storage Battery]

Next, a cylindrical storage battery will be described as an example of a storage battery using a wound body.

Figure 16A:
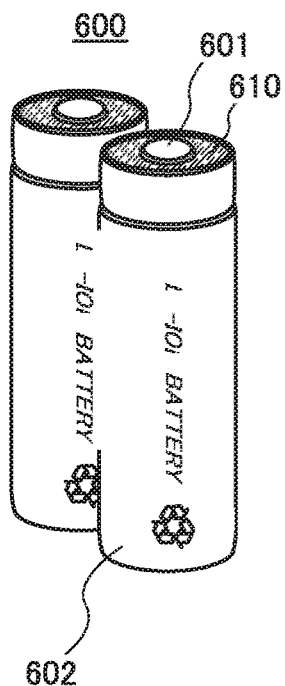
FIGS. 16A and 16B illustrate an example of a cylindrical storage battery.

A cylindrical storage battery 600 illustrated in FIG. 16A includes a positive electrode cap (battery cap) 601 on the top surface and a battery can (outer can) 602 on the side surface and bottom surface. The positive electrode cap and the battery can 602 are insulated from each other by a gasket (insulating gasket) 610.

Figure 16B:
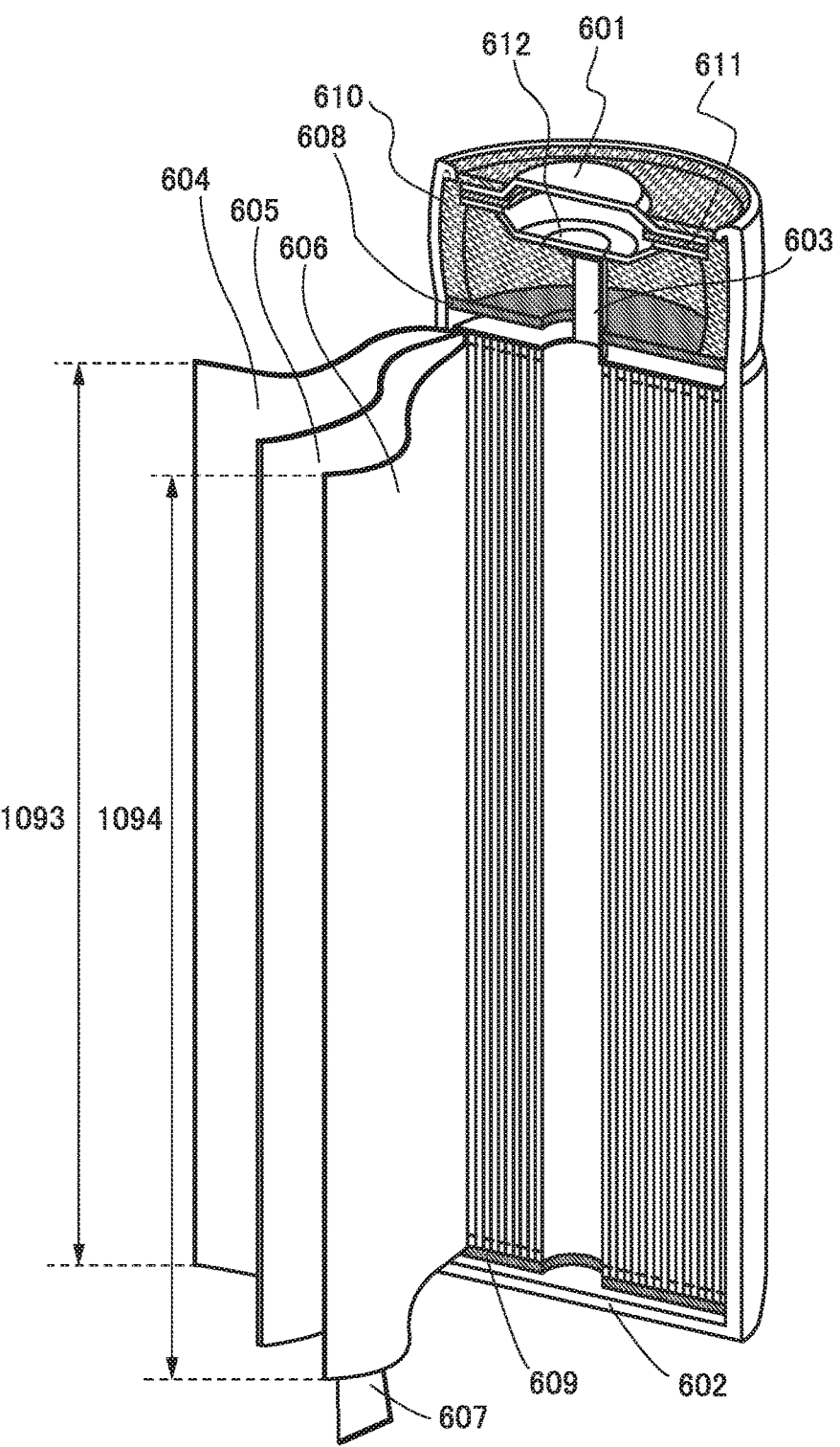

FIG. 16B is a schematic cross-sectional view illustrating the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having corrosion resistance to an electrolytic solution, such as aluminum or titanium, an alloy of such a metal, or an alloy of such a metal and another metal (e.g., stainless steel or the like) can be used. Alternatively, the battery can 602 is preferably covered with aluminum or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element.

Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

The area of a region where the negative electrode 606 does not overlap with the positive electrode 604 is preferably as small as possible. For example, an end portion of the negative electrode 606 is located inward from an end portion of the positive electrode 604. Furthermore, the distance between the end portion of the positive electrode 604 and the end portion of the negative electrode 606 is preferably 3 mm or less, more preferably 0.5 mm or less, still more preferably 0.1 mm or less. Alternatively, the difference between a width 1093 of the positive electrode 604 and a width 1094 of the negative electrode 606 is preferably 6 mm or less, more preferably 1 mm or less, still more preferably 0.2 mm or less. Alternatively, it is preferred that the widths 1093 and 1094 be approximately equal values and the end portion of the negative electrode 606 be substantially aligned with the end portion of the positive electrode 604.

[Coin-Type Storage Battery]

Figure 17A:
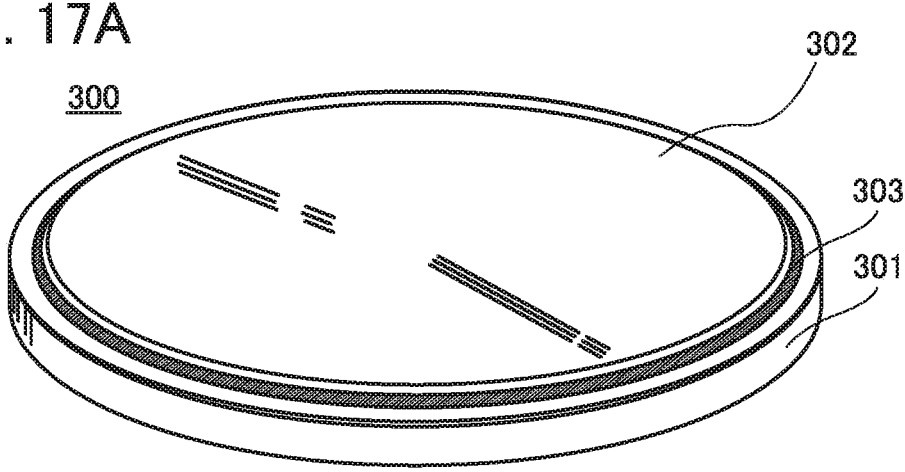
FIGS. 17A to 17C illustrate examples of a coin-type storage battery.
Figure 17B:
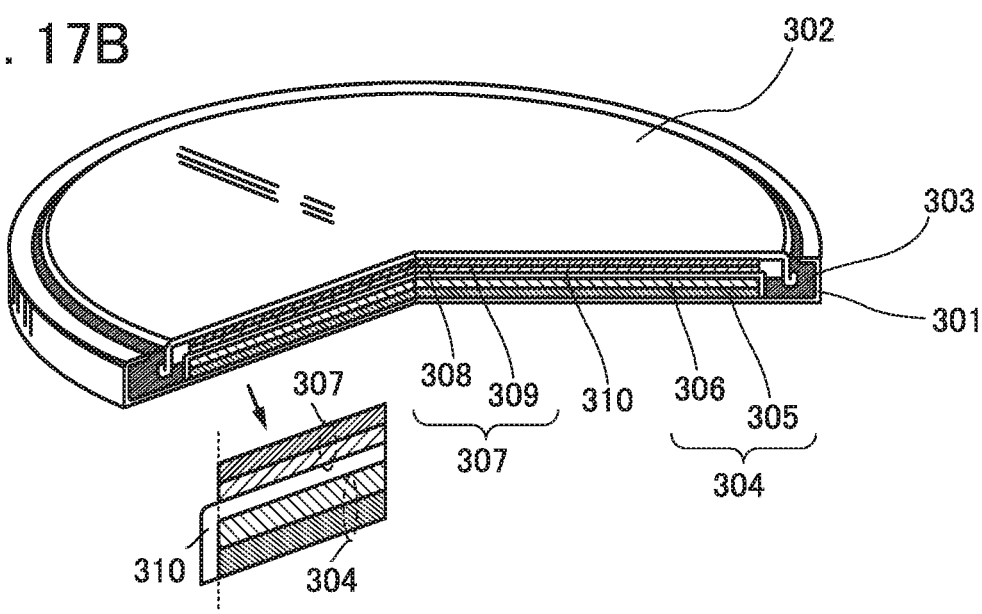
Figure 17C:
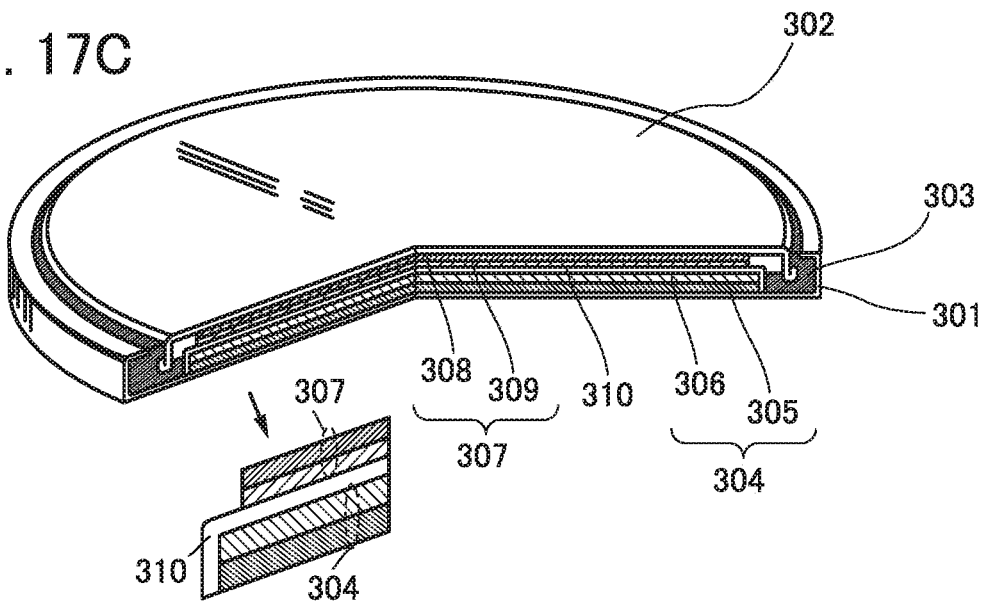

Examples of a coin-type storage battery, which is a power storage device of one embodiment of the present invention, are illustrated in FIGS. 17A to 17C. FIG. 17A is an external view of a coin-type (single-layer flat type) storage battery, and FIGS. 17B and 17C are examples of a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like.

A positive electrode 304 includes a positive electrode current collector 305 and a positive electrode active material layer 306 that are in contact with each other. A negative electrode 307 includes a negative electrode current collector 308 and a negative electrode active material layer 309 that are in contact with each other. Note that only one surface of each of the positive electrode and the negative electrode used for the coin-type storage battery is provided with an active material layer.

The positive electrode active material layer 306 may further include a binder for increasing adhesion of the positive electrode active material, a conductive additive for increasing the conductivity of the positive electrode active material layer, and the like in addition to the positive electrode active material. The negative electrode active material layer 309 may further include a binder for increasing adhesion of the negative electrode active material, a conductive additive for increasing the conductivity of the negative electrode active material layer, and the like in addition to the negative electrode active material.

A separator 310 and an electrolyte (not illustrated) are included between the positive electrode active material layer 306 and the negative electrode active material layer 309.

It is preferred that the shape and area of the positive electrode 304 be preferably substantially the same as those of the negative electrode 307 and an end portion of the positive electrode 304 be substantially aligned with an end portion of the negative electrode 307. FIG. 17B illustrates an example where the end portion of the positive electrode 304 is aligned with the end portion of the negative electrode 307.

Alternatively, it is preferred that the area of the negative electrode 307 be larger than that of the positive electrode 304 and the end portion of the positive electrode 304 be located on an inner side of the end portions of the negative electrode 307, FIG. 17C illustrates an example where the end portion of the positive electrode 304 is located on an inner side of the end portions of the negative electrode 307.

For the positive electrode can 301 and the negative electrode can 302, a metal having corrosion resistance to an electrolytic solution, such as aluminum or titanium, an alloy of such a metal, or an alloy of such a metal and another metal (e.g., stainless steel or the like) can be used. Alternatively, the positive electrode can 301 and the negative electrode can 302 are preferably covered with aluminum or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte. Then, as illustrated in FIGS. 17B and 17C, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be fabricated.

[Power Storage System]

Next, structural examples of power storage systems will be described with reference to FIGS. 18A and 18B, FIGS. 19A1, 19A2, 19B1, and 19B2, and FIGS. 20A and 20B. Here, a power storage system refers to, for example, a device including a power storage device. The power storage system described in this embodiment includes a power storage device of one embodiment of the present invention.

Figure 18A:
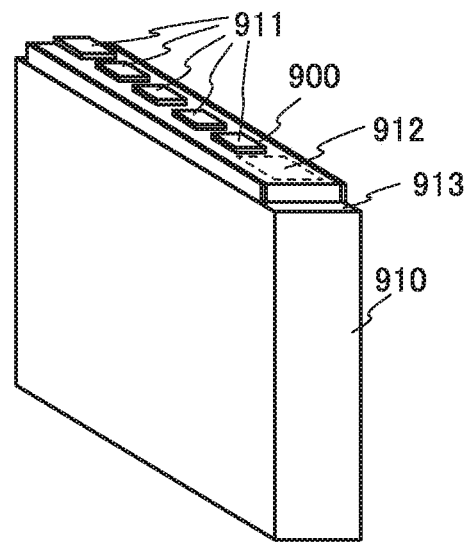
FIGS. 18A and 18B illustrate an example of a power storage system.
Figure 18B:
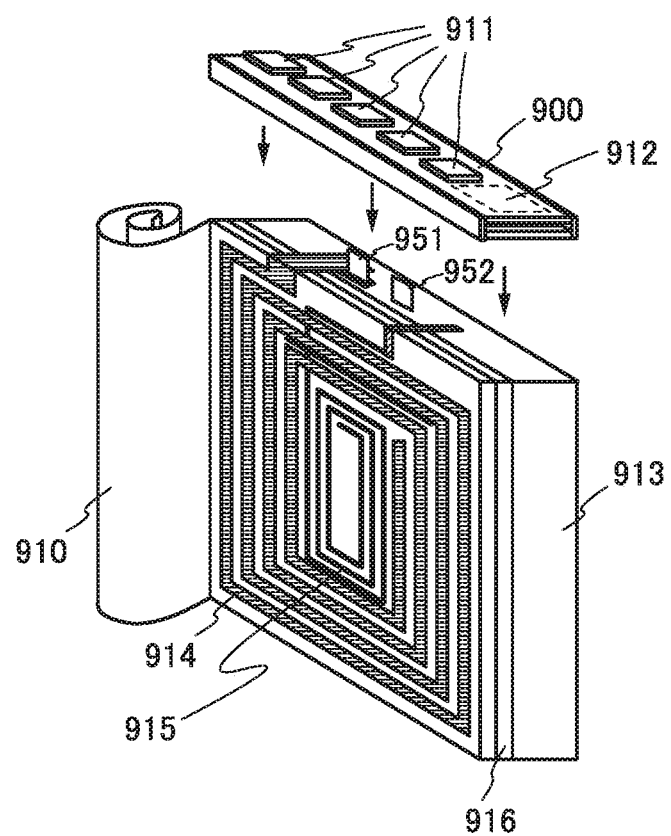

FIGS. 18A and 18B are external views of a power storage system. The power storage system includes a circuit board 900 and a storage battery 913. A label 910 is attached to the storage battery 913. As shown in FIG. 18B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 18A and 18B. A modification example is described below. Note that the above description can be appropriately referred to for a portion that is similar to a portion of the power storage system in FIGS. 18A and 18B.

For example, as shown in FIGS. 19A1 and 19A2, two opposite surfaces of the storage battery 913 in FIGS. 18A and 18B may be provided with respective antennas. FIG. 19A1 is an external view showing one of the opposite surfaces, and FIG. 19A2 is an external view showing the other of the opposite surfaces.

As illustrated in FIG. 19A1, the antenna 914 is provided on one of the opposite surfaces of the storage battery 913 with the layer 916 interposed therebetween, and as illustrated in FIG. 19A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 19B1 and 19B2, two opposite surfaces of the storage battery 913 in FIGS. 18A and 18B may be provided with different types of antennas. FIG. 19B1 is an external view showing one of the opposite surfaces, and FIG. 19B2 is an external view showing the other of the opposite surfaces.

As illustrated in FIG. 19B1, the antennas 914 and 915 are provided on one of the opposite surfaces of the storage battery 913 with the layer 916 interposed therebetween, and as illustrated in FIG. 19A2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 20A:
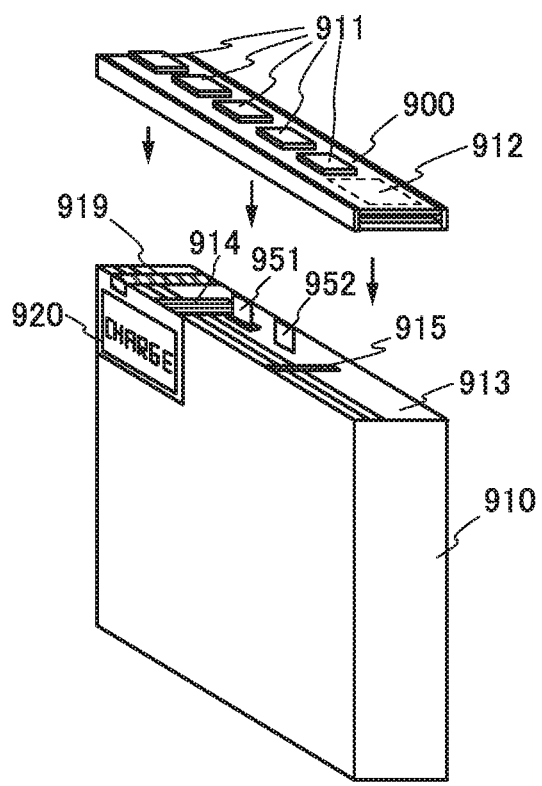
FIGS. 20A and 20B illustrate examples of a power storage system.

Alternatively, as illustrated in FIG. 20A, the storage battery 913 in FIGS. 18A and 18B may be provided with a display device 920. The display device 920 is electrically connected to the terminal 911 via a terminal 919. It is possible that the label 910 is not provided in a portion where the display device 920 is provided.

The display device 920 can display, for example, an image showing whether charging is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 20B:
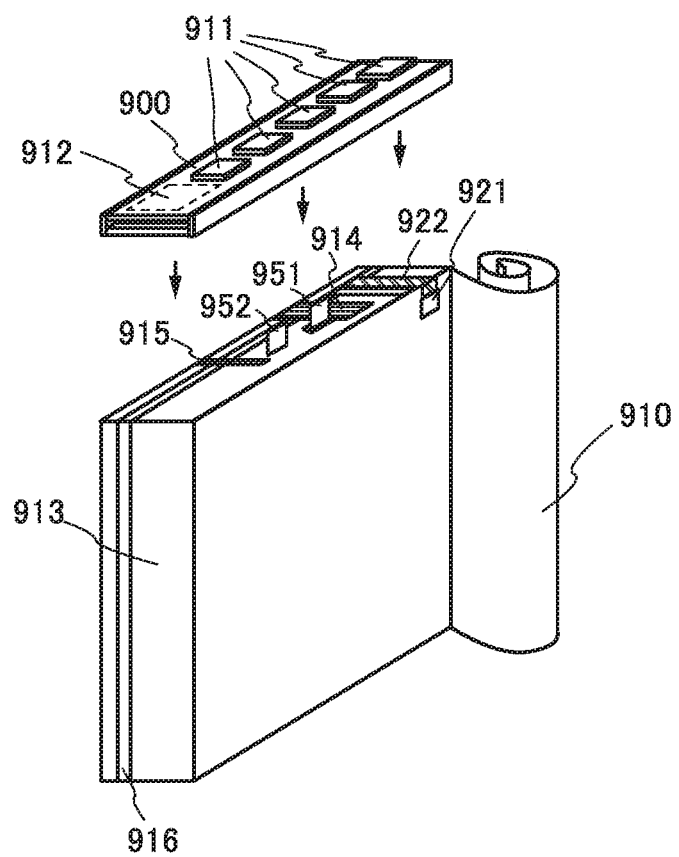

Alternatively, as illustrated in FIG. 20B, the storage battery 913 illustrated in FIGS. 18A and 18B may be provided with a sensor 921. The sensor 921 is electrically connected to the terminal 911 via a terminal 922.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be acquired and stored in a memory inside the circuit 912.

This embodiment can be combined with any other embodiment as appropriate.

Embodiment 4

In this embodiment, a flexible power storage device that is one embodiment of the present invention is described with reference to FIGS. 21A and 21B, FIGS. 22A and 22B, FIG. 23, FIGS. 24A to 24D, FIGS. 25A, 25B, 25C1, and 25C2, FIG. 26, FIGS. 27A to 27D, and FIG. 28. A power storage device of one embodiment of the present invention may have a curved shape. The power storage device of one embodiment of the present invention may be flexible and capable of being used in any of a curved state and a flat state.

Structure Example 1

Figure 21A:
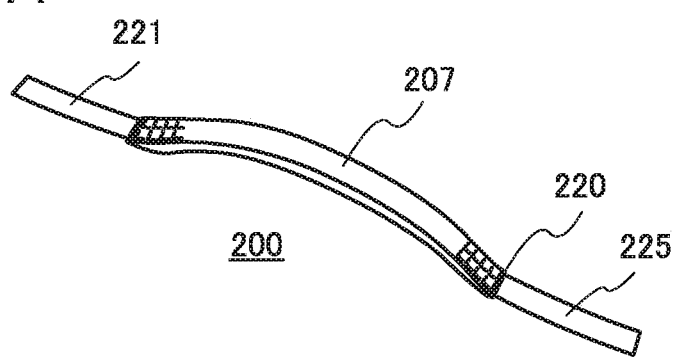
FIGS. 21A and 21B illustrate an example of a power storage device.
Figure 21B:
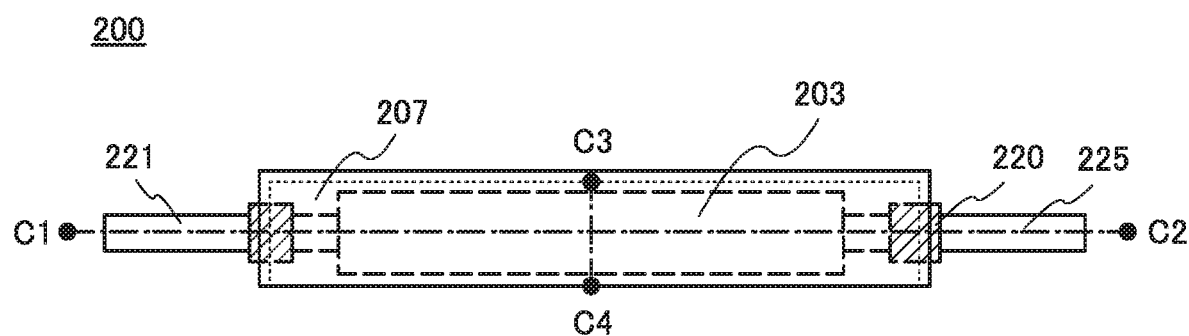

FIG. 21A is a perspective view of a secondary battery 200 and FIG. 21B is a top view of the secondary battery 200.

Figure 22A:
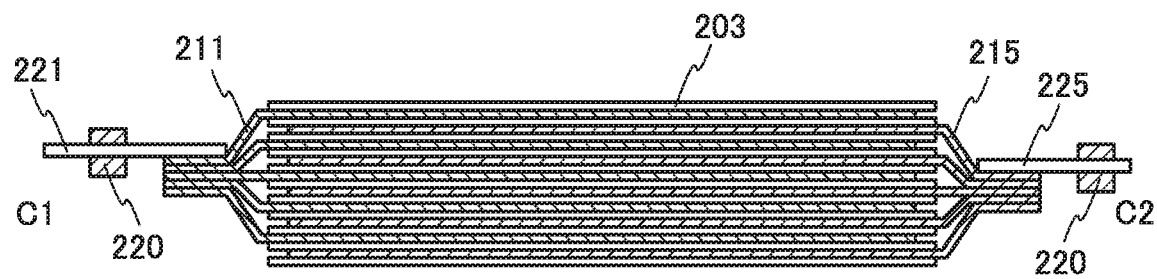
FIGS. 22A and 22B illustrate an example of a power storage device.
Figure 22B:
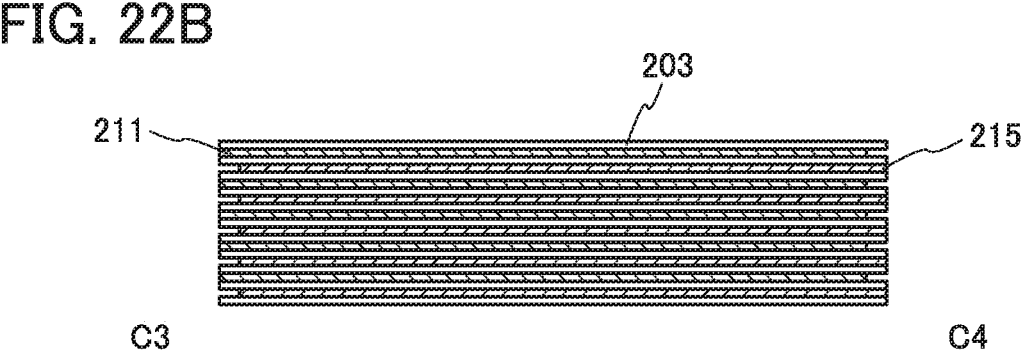

FIG. 22A is a cross-sectional view taken along the dashed-dotted line C1-C2 in FIG. 21B, and FIG. 22B is a cross-sectional view taken along the dashed-dotted line C3-C4 in FIG. 21B. Note that FIGS. 22A and 22B do not illustrate all components for clarity of the drawings.

The secondary battery 200 includes a positive electrode 211, a negative electrode 215, and a separator 203. The secondary battery 200 further includes a positive electrode lead 221, a negative electrode lead 225, and an exterior body 207.

The positive electrode 211 and the negative electrode 215 each include a current collector and an active material layer. The positive electrode 211 and the negative electrode 215 are provided such that the active material layers face each other with the separator 203 provided therebetween.

One of the electrodes (the positive electrode 211 and the negative electrode 215) of the secondary battery 200 that is positioned on the outer diameter side of a curved portion is preferably longer than the other electrode that is positioned on the inner diameter side of the curved portion, in the direction in which the electrode is curved. With such a structure, end portions of the positive electrode 211 and those of the negative electrode 215 are aligned when the secondary battery 200 is curved with a desired curvature. That is, the entire region of the positive electrode active material layer included in the positive electrode 211 can face the negative electrode active material layer included in the negative electrode 215. Thus, positive electrode active materials included in the positive electrode 211 can efficiently contribute to a battery reaction. Therefore, the capacity of the secondary battery 200 per volume can be increased. Such a structure is particularly effective in a case where the curvature of the secondary battery 200 is fixed in using the secondary battery 200.

The positive electrode lead 221 is electrically connected to a plurality of positive electrodes 211. The negative electrode lead 225 is electrically connected to a plurality of negative electrodes 215. The positive electrode lead 221 and the negative electrode lead 225 each include a sealing layer 220.

The exterior body 207 covers a plurality of positive electrodes 211, a plurality of negative electrodes 215, and a plurality of separators 203. The secondary battery 200 includes an electrolytic solution (not shown) in a region covered with the exterior body 207. Three sides of the exterior body 207 are bonded, whereby the secondary battery 200 is sealed.

In FIGS. 22A and 22B, the separators 203 each having a strip-like shape are used and each pair of the positive electrode 211 and the negative electrode 215 sandwich the separator 203; however, the present invention is not limited to this structure. One separator sheet may be folded in zigzag (or into a bellows shape) or wound so that the separator is positioned between the positive electrode and the negative electrode.

An example of a method for manufacturing the secondary battery 200 is illustrated in FIGS. 24A to 24D, FIG. 23 is a cross-sectional view taken along the dashed-dotted line C1-C2 in FIG. 21B in the case of employing this manufacturing method.

First, the negative electrode 215 is positioned over the separator 203 (FIG. 24A) such that the negative electrode active material layer of the negative electrode 215 overlaps with the separator 203.

Then, the separator 203 is folded to overlap with the negative electrode 215. Next, the positive electrode 211 overlaps with the separator 203 (FIG. 24B) such that the positive electrode active material layer of the positive electrode 211 overlaps with the separator 203 and the negative electrode active material layer. Note that in the case of using an electrode in which one surface of a current collector is provided with an active material layer, the positive electrode active material layer of the positive electrode 211 and the negative electrode active material layer of the negative electrode 215 are positioned to face each other with the separator 203 provided therebetween.

Figure 24A:
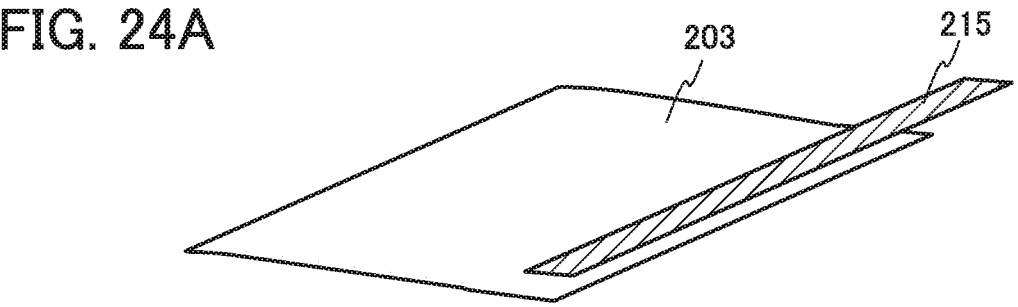
FIGS. 24A to 24D illustrate an example of a method for manufacturing a power storage device.
Figure 24B:
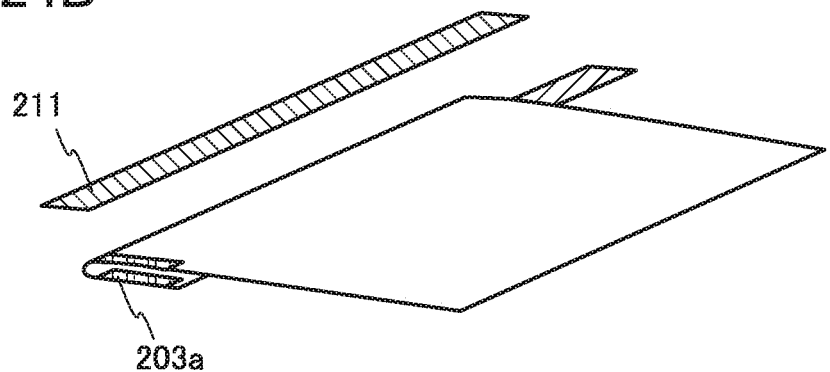

In the case where the separator 203 is formed using a material that can be thermally welded, such as polypropylene, a region where the separator 203 overlaps with itself is thermally welded and then another electrode overlaps with the separator 203, whereby the slippage of the electrode in the fabrication process can be suppressed. Specifically, a region which does not overlap with the negative electrode 215 or the positive electrode 211 and in which the separator 203 overlaps with itself, e.g., a region denoted as 203a in FIG. 24B, is preferably thermally welded.

Figure 24C:
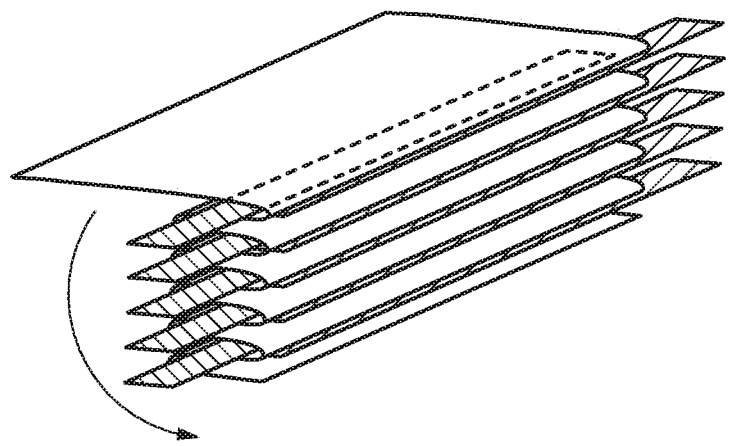

By repeating the above steps, the positive electrode 211 and the negative electrode 215 can overlap with each other with the separator 203 provided therebetween as illustrated in FIG. 24C.

Note that a plurality of positive electrodes 211 and a plurality of negative electrodes 215 may be placed to be alternately sandwiched by the separator 203 that is repeatedly folded in advance.

Then, as illustrated in FIG. 24C, a plurality of positive electrodes 211 and a plurality of negative electrodes 215 are covered with the separator 203.

Figure 24D:
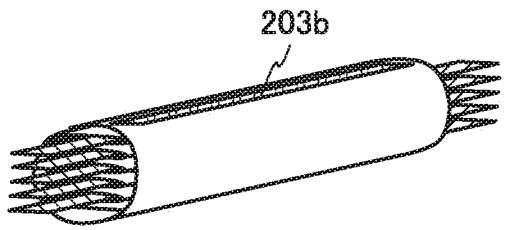

Furthermore, the region where the separator 203 overlaps with itself, e.g., a region 203b in FIG. 24D, is thermally welded as illustrated in FIG. 24D, whereby a plurality of positive electrodes 211 and a plurality of negative electrodes 215 are covered with and tied with the separator 203.

Note that a plurality of positive electrodes 211, a plurality of negative electrodes 215, and the separator 203 may be tied with a binding material.

Since the positive electrodes 211 and the negative electrodes 215 are stacked in the above process, one separator 203 has a region sandwiched between the positive electrode 211 and the negative electrode 215 and a region covering a plurality of positive electrodes 211 and a plurality of negative electrodes 215.

Figure 23:
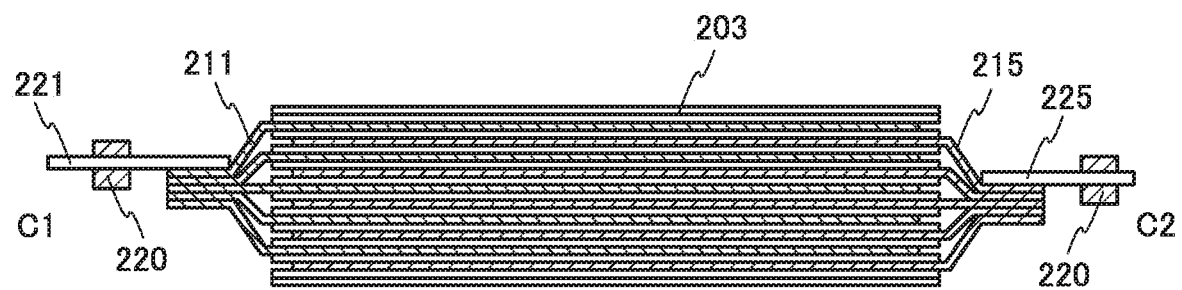
FIG. 23 illustrates an example of a power storage device.

In other words, the separator 203 included in the secondary battery 200 in FIG. 23 and FIG. 24D is a single separator which is partly folded. In the folded regions of the separator 203, a plurality of positive electrodes 211 and a plurality of negative electrodes 215 are provided.

Structure Example 2

FIG. 25A is a perspective view of a secondary battery 250 and FIG. 25B is a top view of the secondary battery 250. Furthermore, FIG. 25C1 is a cross-sectional view of a first electrode assembly 230 and FIG. 25C2 is a cross-sectional view of a second electrode assembly 231.

The secondary battery 250 includes the first electrode assembly 230, the second electrode assembly 231, and the separator 203. The secondary battery 250 further includes the positive electrode lead 221, the negative electrode lead 225, and the exterior body 207.

As illustrated in FIG. 25C1, in the first electrode assembly 230, a positive electrode 211a, the separator 203, a negative electrode 215a, the separator 203, and the positive electrode 211a are stacked in this order. The positive electrode 211a and the negative electrode 215a each include active material layers on both surfaces of a current collector.

As illustrated in FIG. 25C2, in the second electrode assembly 231, a negative electrode 215a, the separator 203, the positive electrode 211a, the separator 203, and the negative electrode 215a are stacked in this order. The positive electrode 211a and the negative electrode 215a each include active material layers on both surfaces of a current collector.

In other words, in each of the first electrode assembly 230 and the second electrode assembly 231, the positive electrode and the negative electrode are provided such that the active material layers face each other with the separator 203 provided therebetween.

The positive electrode lead 221 is electrically connected to a plurality of positive electrodes 211. The negative electrode lead 225 is electrically connected to a plurality of negative electrodes 215. The positive electrode lead 221 and the negative electrode lead 225 each include the sealing layer 220.

Figure 26:
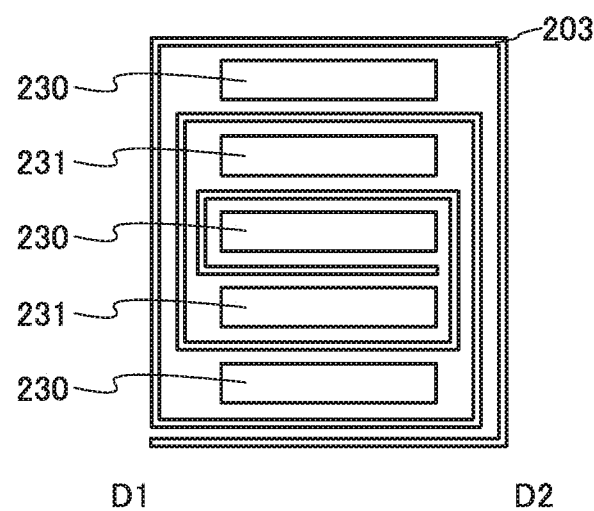
FIG. 26 illustrates an example of a power storage device.

FIG. 26 is an example of a cross-sectional view taken along the dashed-dotted line D1-D2 in FIG. 25B. Note that FIG. 26 does not illustrate all components for clarity of the drawings.

As illustrated in FIG. 26, the secondary battery 250 has a structure in which a plurality of first electrode assemblies 230 and a plurality of second electrode assemblies 231 are covered with the wound separator 203.

The exterior body 207 covers a plurality of first electrode assemblies 230, a plurality of second electrode assemblies 231, and the separator 203. The secondary battery 200 includes an electrolytic solution (not shown) in a region covered with the exterior body 207. Three sides of the exterior body 207 are bonded, whereby the secondary battery 200 is sealed.

An example of a method for manufacturing the secondary battery 250 is illustrated in FIGS. 27A to 27D.

Figure 27A:
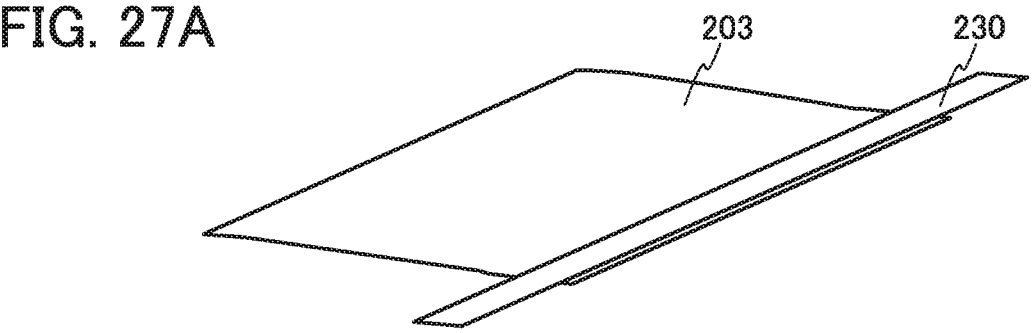
FIGS. 27A to 27D illustrate an example of a method for manufacturing a power storage device.

First, the first electrode assembly 230 is positioned over the separator 203 (FIG. 27A).

Figure 27B:
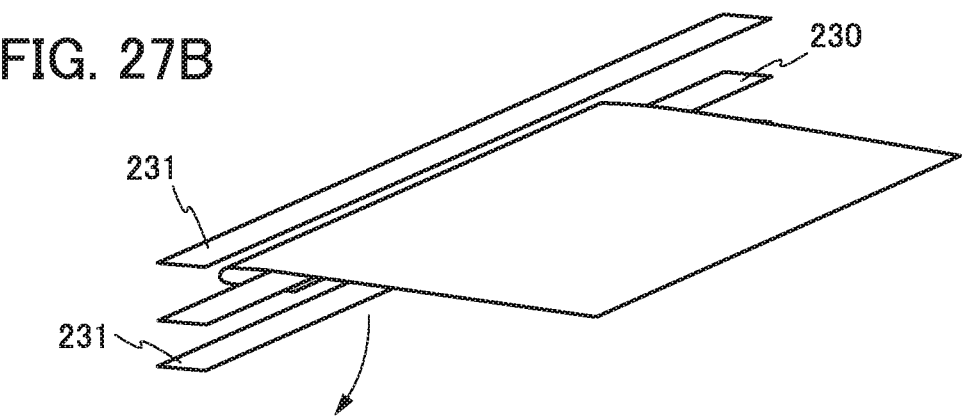

Then, the separator 203 is folded to overlap with the first electrode assembly 230. After that, two second electrode assemblies 231 are positioned over and under the first electrode assembly 230 with the separator 203 positioned between each of the second electrode assemblies 231 and the first electrode assembly 230 (FIG. 27B).

Figure 27C:
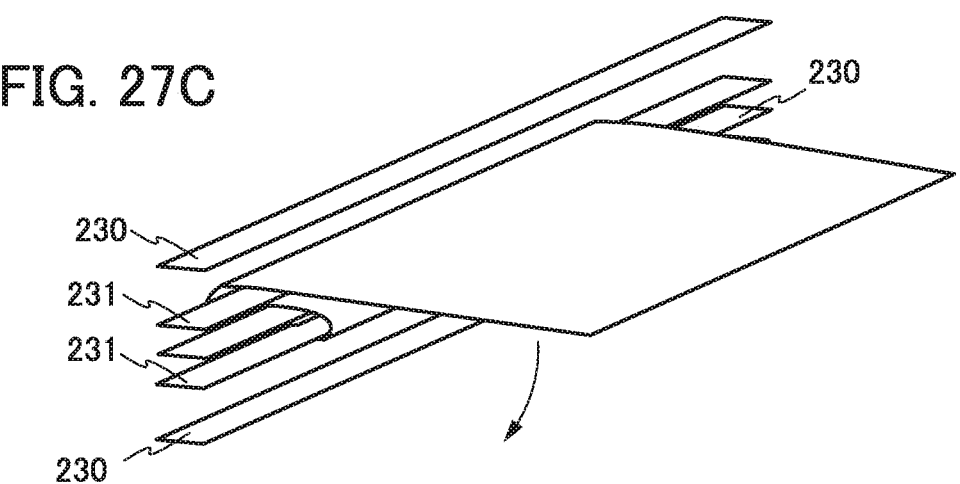

Then, the separator 203 is wound to cover the two second electrode assemblies 231. Moreover, two first electrode assemblies 230 are positioned over and under the two second electrode assemblies 231 with the separator 203 positioned between each of the first electrode assemblies 230 and each of the second electrode assemblies 231 (FIG. 27C).

Figure 27D:
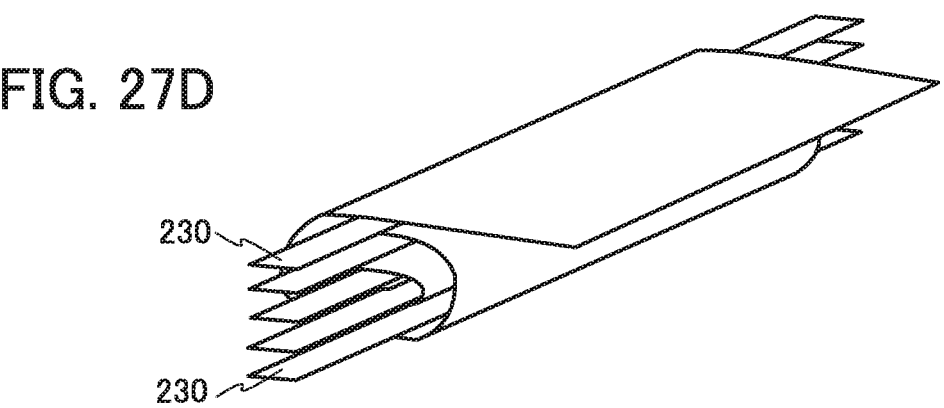

Then, the separator 203 is wound to cover the two first electrode assemblies 230 (FIG. 27D).

Since a plurality of first electrode assemblies 230 and a plurality of second electrode assemblies 231 are stacked in the above process, these electrode assemblies are each positioned surrounded with the spirally wound separator 203.

Note that the outermost electrode preferably does not include an active material layer on the outer side.

Although FIGS. 25C1 and 25C2 each illustrate a structure in which the electrode assembly includes three electrodes and two separators, one embodiment of the present invention is not limited to this structure. The electrode assembly may include four or more electrodes and three or more separators. A larger number of electrodes lead to higher capacity of the secondary battery 250. Alternatively, the electrode assembly may include two electrodes and one separator. A smaller number of electrodes enable higher resistance of the secondary battery against bending. Although FIG. 26 illustrates the structure in which the secondary battery 250 includes three first electrode assemblies 230 and two second electrode assemblies 231, one embodiment of the present invention is not limited to this structure. The number of the electrode assemblies may be increased. A larger number of electrode assemblies lead to higher capacity of the secondary battery 250. The number of the electrode assemblies may be decreased. A smaller number of electrode assemblies enable higher resistance of the secondary battery against bending.

Figure 28:
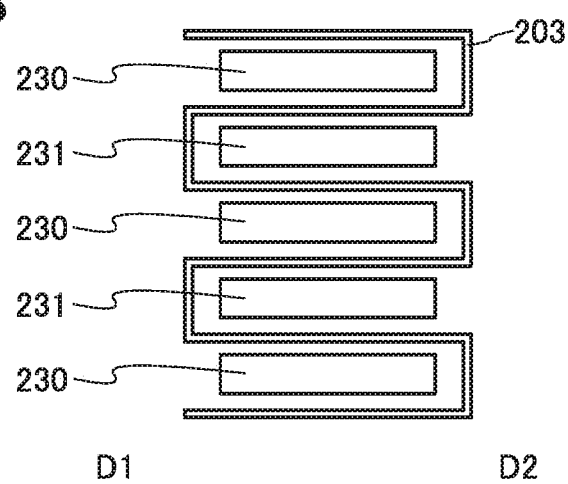
FIG. 28 illustrates an example of a power storage device.

FIG. 28 illustrates another example of a cross-sectional view taken along the dashed-dotted line D1-D2 in FIG. 25B. As illustrated in FIG. 28, the separator 203 may be folded into a bellows shape so that the separator 203 is positioned between the first electrode assembly 230 and the second electrode assembly 231.

This embodiment can be combined with any other embodiment as appropriate.

Embodiment 5

In this embodiment, application examples of the power storage device of one embodiment of the present invention will be described with reference to FIGS. 29A to 29G, FIG. 30A to 30C, FIG. 31, and FIGS. 32A and 32B.

The power storage device of one embodiment of the present invention can be used for an electronic device or a lighting device, for example. The power storage device of one embodiment of the present invention has excellent charge and discharge characteristics. Therefore, the electronic device or the lighting device can be used for a long time on a single charge. Moreover, since a decrease in capacity due to charge and discharge cycles is inhibited, the time between charges is less likely to be reduced by repetitive charge. Safety or reliability of the electronic device or the lighting device can be high.

Examples of electronic devices include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

Since the power storage device of one embodiment of the present invention is flexible, the electronic device or lighting device including the power storage device can be incorporated along a curved inside/outside wall surface of a house or a building or a curved interior/exterior surface of a car.

Figure 29A:
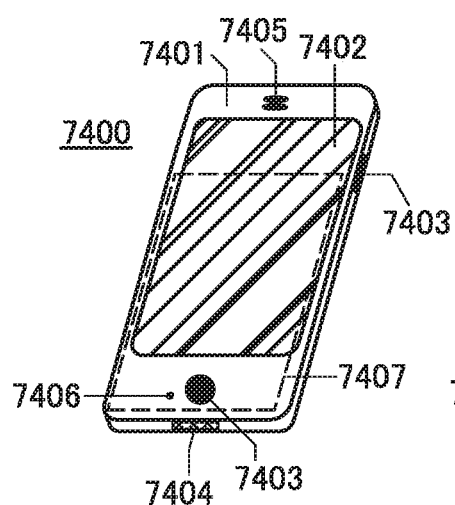
FIGS. 29A to 29G illustrate examples of electronic devices.

FIG. 29A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 29B:
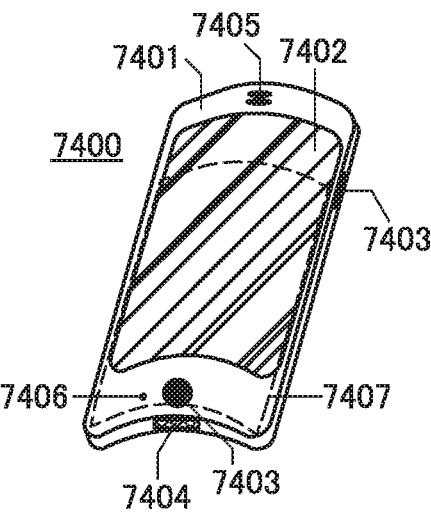
Figure 29C:
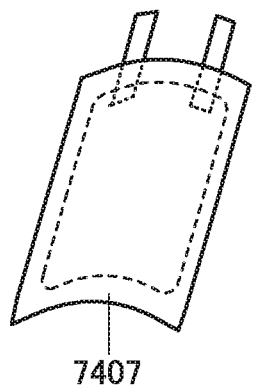

FIG. 29B illustrates the mobile phone 7400 that is curved. When the whole mobile phone 7400 is curved by the external force, the power storage device 7407 included in the mobile phone 7400 is also curved. The power storage device 7407 is a thin storage battery. The power storage device 7407 is fixed in a state of being curved. FIG. 29C illustrates the curved storage device 7407.

Figure 29D:
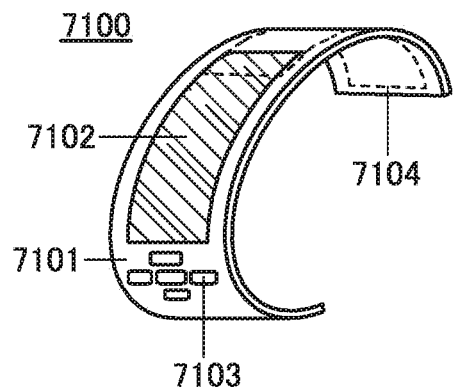
Figure 29E:
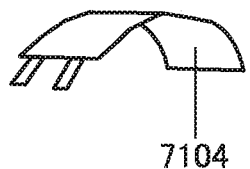

FIG. 29D illustrates an example of a bangle display device. A portable display device 7100 includes a housing 7101, a display portion 7102, an operation button 7103, and a power storage device 7104. FIG. 29E illustrates the bent power storage device 7104.

Figure 29F:
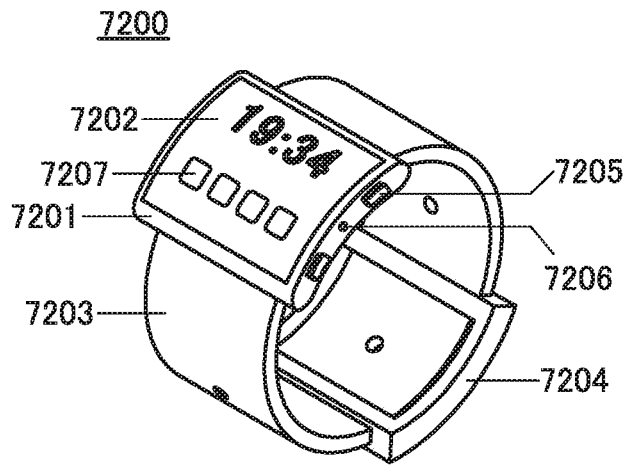

FIG. 29F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with the power storage device of one embodiment of the present invention. For example, the power storage device 7104 illustrated in FIG. 29E that is in the state of being curved can be provided in the housing 7201. Alternatively, the power storage device 7104 illustrated in FIG. 29E can be provided in the band 7203 such that it can be curved.

Figure 29G:
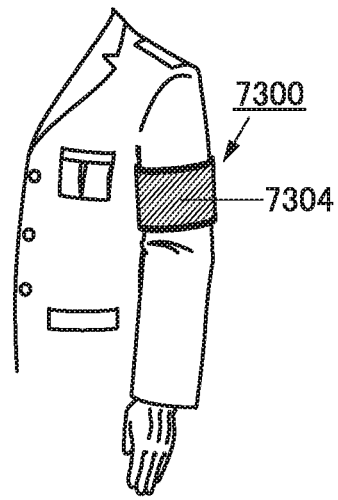

FIG. 29G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is curved, and images can be displayed on the curved display surface A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

Figure 30A:
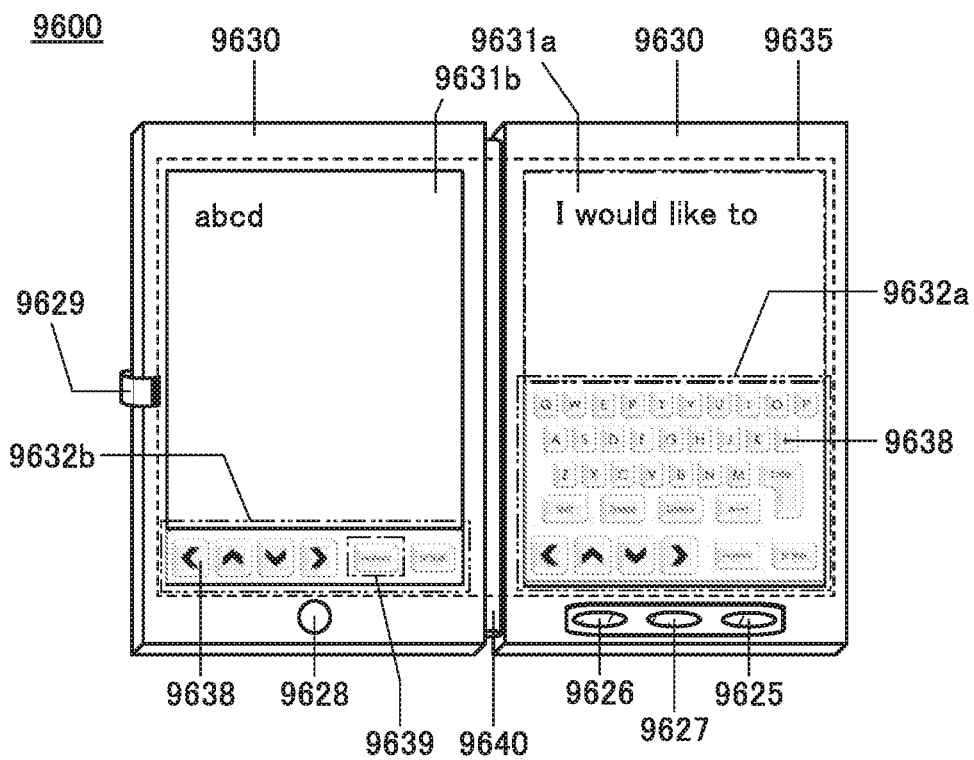
FIGS. 30A to 30C illustrate an example of an electronic device.
Figure 30B:
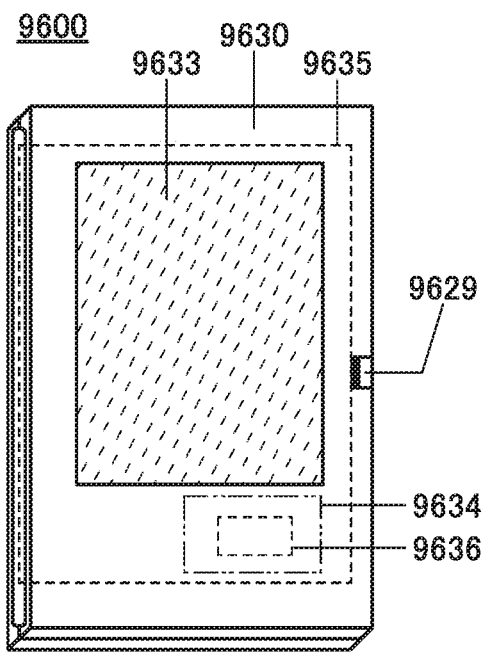

FIGS. 30A and 30B illustrate an example of a tablet terminal that can be folded in half. A tablet terminal 9600 illustrated in FIGS. 30A and 30B includes a pair of housings 9630, a movable portion 9640 connecting the pair of housings 9630, a display portion 9631a, a display portion 9631b, a display mode changing switch 9626, a power switch 9627, a power saving mode changing switch 9625, a fastener 9629, and an operation switch 9628. FIG. 30A illustrates the tablet terminal 9600 that is opened, and FIG. 30B illustrates the tablet terminal 9600 that is closed.

The tablet terminal 9600 includes a power storage unit 9635 inside the housings 9630. The power storage unit 9635 is provided from one of the housings 9630 to the other, passing through the movable portion 9640.

Part of the display portion 9631a can be a touch panel region 9632a, and data can be input by touching operation keys 9638 that are displayed. Note that FIG. 30A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 30A, one embodiment of the present invention is not limited to this example. The display portions may have different areas or different display quality. For example, one of the display portions may display higher definition images than the other.

The tablet terminal is closed in FIG. 30B. The tablet terminal includes the housing 9630, a solar cell 9633, and a charge and discharge control circuit 9634 including a DC-DC converter 9636. The power storage device of one embodiment of the present invention is used as the power storage unit 9635.

The tablet terminal 9600 can be folded such that the pair of housings 9630 overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 30A and 30B can also have a function of displaying various kinds of data (e.g., a still image, a moving image, and a text image) on the display portion, a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 30C:
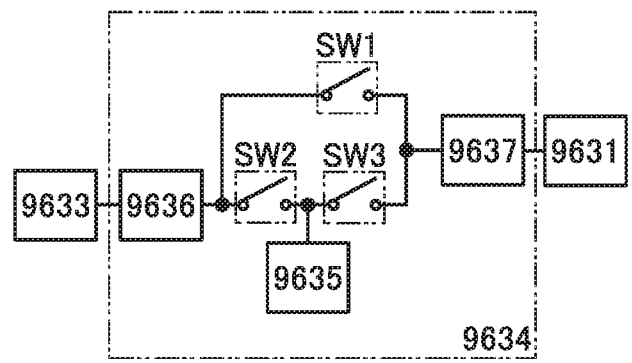

The structure and operation of the charge and discharge control circuit 9634 illustrated in FIG. 30B will be described with reference to a block diagram in FIG. 30C. The solar cell 9633, the power storage unit 9635, the DC-DC converter 9636, a converter 9637, switches SW1 to SW3, and the display portion 9631 are illustrated in FIG. 30C, and the power storage unit 9635, the DC-DC converter 9636, the converter 9637, and the switches SW1 to SW3 correspond to the charge and discharge control circuit 9634 in FIG. 30B.

First, an example of operation when electric power is generated by the solar cell 9633 using external light will be described. The voltage of electric power generated by the solar cell is raised or lowered by the DC-DC converter 9636 to a voltage for charging the power storage unit 9635. When the display portion 9631 is operated using the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element and a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 31:
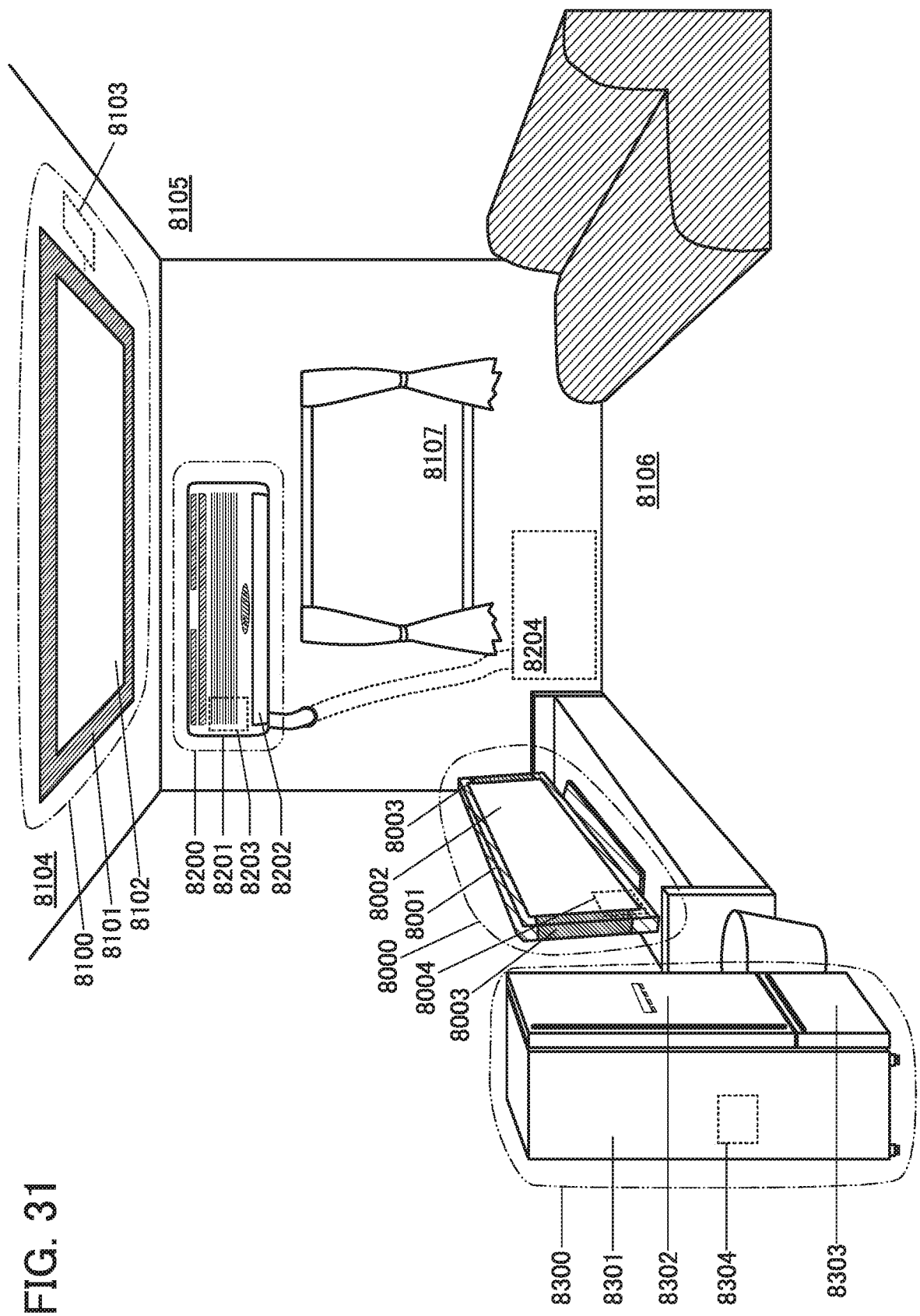
FIG. 31 illustrates examples of electronic devices.

FIG. 31 illustrates other examples of electronic devices. In FIG. 31, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 31, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 31 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 31 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 31, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203 and the like. Although FIG. 31 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 31 as an example, the power storage device of one embodiment of the present invention can be used in an air conditioner in which the functions of an indoor unit and an outdoor unit are integrated in one housing.

In FIG. 31, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 31. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used in the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

The power storage device of one embodiment of the present invention can be provided in a vehicle.

The use of power storage devices in vehicles enables production of next-generation clean energy vehicles such as hybrid electric vehicles (HEVs), electric vehicles (EVs), and plug-in hybrid electric vehicles (PBEVs).

Figure 32A:
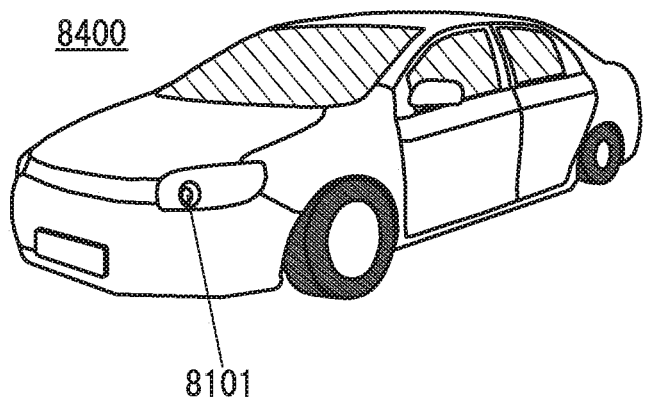
FIGS. 32A and 32B illustrate examples of electronic devices.
Figure 32B:
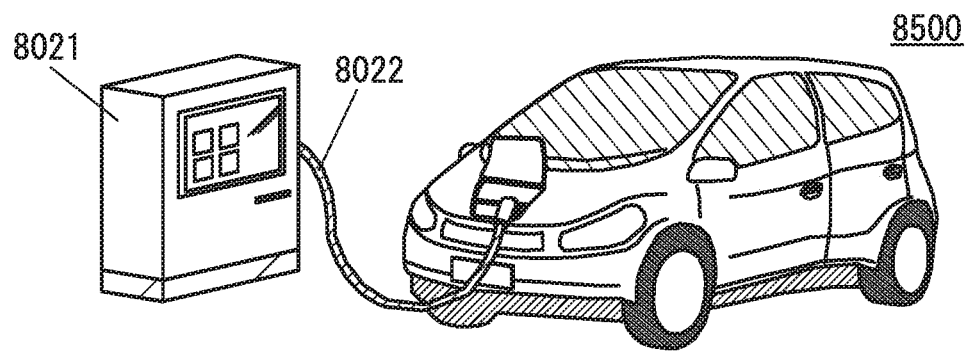

FIGS. 32A and 32B each illustrate an example of a vehicle using the power storage device of one embodiment of the present invention. An automobile 8400 illustrated in FIG. 32A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor but also for supplying electric power to light-emitting devices such as a headlight 8401 and a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 32B illustrates an automobile 8500 including a power storage device. The automobile 8500 can be charged when the power storage device is supplied with electric power through external charging equipment by a plug-in system, a contactless power feeding system, or the like. In FIG. 32B, the power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, and the like as appropriate. The ground-based charging apparatus 8021 may be a charging station provided in a commerce facility or a power source in a house. For example, with the use of a plug-in technique, the power storage device included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight owing to improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be combined with any other embodiment as appropriate.

Example 1

In this example, electrodes of embodiments of the present invention were formed.

The electrodes formed in this example each included an active material, a binder, and a conductive additive.

As the active material, powdery lithium manganese complex oxide with graphene on the surface was used. A synthesis method is described below.

<Formation of Active Material>

First, $Li_2CO_3$, $MnCO_3$, and NiO were weighed as starting materials so that the ratio (molar ratio) of $Li_2CO_3$ to $MnCO_3$ to NiO was 0.84:0.8062:0.318.

Ethanol was added to the starting materials. Then, ethanol and the starting materials were mixed in a chamber of a bead mill rotating at a peripheral speed of 10 m/s.

Next, heat treatment was performed on the mixed material to evaporate ethanol contained in the mixed material, and a mixed material was obtained. The heat treatment was performed at 75° C. in an air atmosphere.

Subsequently, the mixed material was put in a crucible and firing was performed at 1000° C. in a dry air atmosphere at a flow rate of 10 L/min for 10 hours, whereby a lithium manganese complex oxide was synthesized.

Then, crushing treatment was performed to separate sintered lithium manganese complex oxide in which primary particles were sintered, so that powdery lithium manganese complex oxide was obtained. In the crushing treatment, after ethanol was added to 600 g of the sintered lithium manganese complex oxide, a chamber of a bead mill was rotated at a peripheral speed of 12 m/s for 10 hours.

After that, heat treatment was performed on the lithium manganese complex oxide subjected to the crushing treatment to evaporate ethanol. The heat treatment was performed at 75° C. in an air atmosphere. Next, the obtained lithium manganese complex oxide was put in a crucible and tiring was performed at 800° C. in a dry air atmosphere at 10 L/min for 3 hours. The resulting powder is referred to as a sample A.

Next, a layer containing carbon was formed on the sample A. First, water and graphene oxide were mixed in a mixer such that the amount of the water with respect to 0.1 g of the graphene oxide was 1.25 g, to form a dispersion solution of the graphene oxide.

Then, 250 g of the sample A was put in the formed aqueous dispersion solution, 120 g of water was further added, and the paste was kneaded. Thirty-minute kneading was performed twice at 80 rpm in a mixer. The obtained mixture was dried in a circulation dryer at 50° C. and then ground in an alumina mortar, so that a sample B (lithium manganese complex oxide coated with graphene oxide) was obtained.

Then, the graphene oxide coating the surface of the lithium manganese complex oxide was reduced. Ascorbic acid was used as a reducing agent, and an ethanol-water solution at a concentration of 80% was used as a solvent. A reducing solution was formed by adding 16.87 wt % the ascorbic acid and 3.9 wt % lithium hydroxide, where the weight percentages were with respect to the weight of the sample B. The obtained powder was put in the reducing solution, and reduction was performed at 60° C. for 3 hours.

Then, the solvent was separated from the obtained solution using a centrifuge, and a separated liquid was removed. After that, a step in which the precipitate was washed with pure water, centrifugation was performed, and a separated liquid was removed was repeated four times. The centrifugation was performed at 6000 rpm for three minutes.

Next, pure water was added to the sample from which the solvent was separated to obtain a solution at a concentration of 24 g/L. The obtained solution was heated at 60° C., supplied to a spray dryer, and subjected to spray dry treatment.

Then, powder obtained by the spray dry treatment was dried at 170° C. under a reduced pressure for 10 hours.

Through the above steps, powdery lithium manganese complex oxide (sample C) in which graphene was formed on a surface was formed.

<Formation of Electrode>

Next, a method for forming an electrode is described. The sample C that was formed by the above-described method was used as an active material, and acetylene black (AB) was used as a conductive additive. As a binder, an F-a benzoxazine compound (produced by SHIKOKU CHEMICALS CORPORATION) was used for Electrode 1 and a P-d benzoxazine compound (produced by SHIKOKU CHEMICALS CORPORATION) was used for Electrode 2. Two Electrodes 1 and two Electrodes 2 were formed.

For Electrode 1, a slurry was obtained by mixing the active material, the F-a benzoxazine compound, AB, and NMP, which is a polarity solvent, in a mixer. The compounding ratio of the sample C to AB to the F-a benzoxazine compound in the electrode binder composition was 90:5:5 (weight ratio). The proportion of the solid content in the slurry was 50%.

For Electrode 2, a slurry was obtained by mixing the active material, the P-d benzoxazine compound, AB, and NMP in a mixer. The compounding ratio of the sample C to AB to the P-d benzoxazine compound in the electrode binder composition was 90:5:5 (weight ratio). The proportion of the solid content in the slurry was 55%.

Next, the electrode binder composition was applied to aluminum foil which was a current collector. Note that an undercoat layer was formed on a surface of the aluminum foil in advance. After that, heating was performed at 80° C. for 30 minutes in a circulation drying furnace. The electrode was pressed with a roller press machine while the press pressure was adjusted so that the thickness after application of the electrode was reduced by 20%. The press temperature was 120° C.

After that, heat treatment was performed in a reduced-pressure atmosphere (1 kPa) for 10 hours. Here, one of two Electrodes 1 was heated at 250° C. and the other was heated at 300° C. Similarly, one of two Electrodes 2 was heated at 250° C. and the other was heated at 300° C. Note that since the benzoxazine compounds used for the binders in Electrodes 1 and Electrodes 2 each have a curing temperature of approximately 150° C., the above heat treatment can be regarded as a step of curing the binder (polymerizing the benzoxazine compound to form polybenzoxazine). Moreover, the heat treatment reduces graphene oxide that had not been reduced in formation of the active material in some cases to form graphene. In other words, this heat treatment can be regarded as a step of forming the third region (which is a region containing carbon here) on a particle containing the lithium manganese complex oxide.

<Half Cell Characteristics>

Next, half cells were fabricated using the obtained electrodes. For the cell, a coin cell was used. Lithium was used for a counter electrode of the half cell. An electrolytic solution was formed by dissolving $LiPF_6$ as an electrolyte in a mixed solution containing EC and DEC, which are aprotic organic solvents, at a volume ratio of 1:1. As a separator, polypropylene (PP) was used.

Figure 33A:
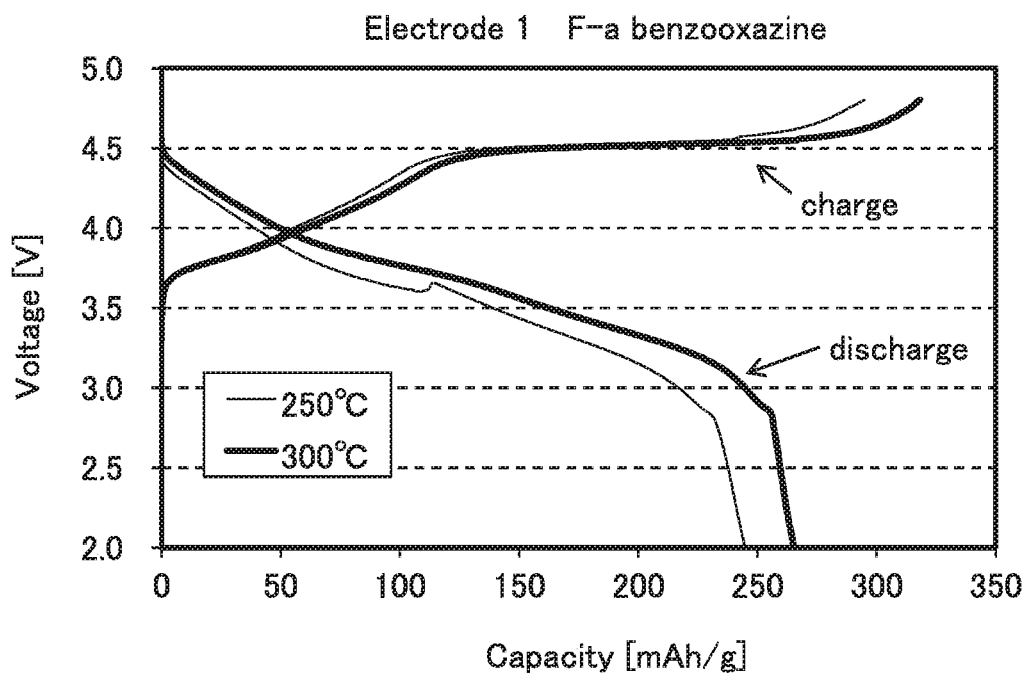
FIGS. 33A and 33B show charge and discharge characteristics in Example 1.
Figure 33B:
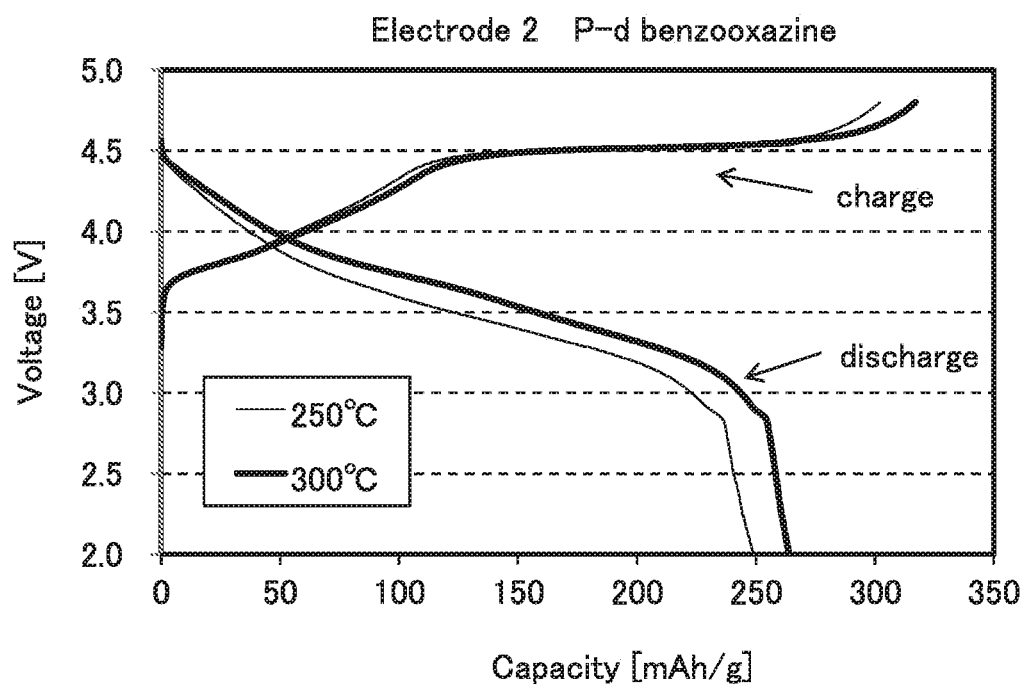

The charge and discharge characteristics were measured at 25° C. Constant current charging was performed at a current density per active material weight of 30 mA/g with the upper voltage limit set to 4.8 V and constant current discharging was performed at a current density per active material weight of 30 mA/g with the lower voltage limit set to 2 V. FIGS. 33A and 33B show charge and discharge curves obtained by the measurement. FIG. 33A shows the results of Electrodes 1 and FIG. 33B shows those of Electrodes 2.

As can be observed from FIGS. 33A and 33B, charging and discharging were performed by the electrodes formed using the benzoxazine compounds as the binders. The active material used in this example is basic. In this example, favorable charge and discharge characteristics were obtained by using the benzoxazine compound as the binder and a basic material as the active material.

In each of Electrodes 1 and 2, higher discharge capacity was achieved in the case where the heating was performed at 300° C. than in the case where it was performed at 250° C. In this example, the high heat resistance of the benzoxazine compound that was used for the binder allowed the high-temperature heat treatment to be performed on the electrode, so that high discharge capacity was achieved.

Example 2

In this example, an electrode of one embodiment of the present invention was formed.

The electrodes formed in this example each included an active material, a binder, and a conductive additive. As the active material, powdery lithium manganese complex oxide on which graphene was formed was used. Note that although the active material used in this example is similar to that used in Example 1, a different formation method was employed. The method for forming the active material used in this example is described below.

<Formation of Active Material>

First, as in Example 1, weighing, mixing, and firing of the starting materials were performed, whereby a lithium manganese complex oxide was synthesized.

Then, crushing treatment was performed to separate sintered lithium manganese complex oxide in which primary particles were sintered, so that powdery lithium manganese complex oxide was obtained. In the crushing treatment, after ethanol was added to 120 g of the sintered lithium manganese complex oxide, a chamber of a bead mill was rotated at a peripheral speed of 12 m/s for 5 hours.

After that, heat treatment was performed on the lithium manganese complex oxide subjected to the crushing treatment to evaporate ethanol. The heat treatment was performed at 75° C. in an air atmosphere. Next, the obtained lithium manganese complex oxide was put in a crucible and firing was performed at 800° C. in a dry air atmosphere at 10 L/min for 3 hours. The resulting powder is referred to as a sample A.

Next, a layer containing carbon was formed on the sample A. First, water and graphene oxide were mixed in a mixer such that the amount of the water with respect to 0.1 g of the graphene oxide was 1.5 g, to form a dispersion solution of the graphene oxide.

Then, the formed aqueous dispersion solution and the sample A were mixed. Here, the amount of the sample A with respect to 1 g of the graphene oxide was set to 50 g. The obtained mixture was dried in a circulation dryer at 50° C. and then ground in an alumina mortar, so that a sample B (lithium manganese complex oxide coated with graphene oxide) was obtained.

Then, the graphene oxide coating the surface of the lithium manganese complex oxide was reduced. Ascorbic acid was used as a reducing agent, and an ethanol-water solution at a concentration of 80% was used as a solvent. A reducing solution was formed by adding 16.87 wt % the ascorbic acid and 3.9 wt % lithium hydroxide, where the weight percentages were with respect to the weight of the sample B. The obtained powder was put in the reducing solution, and reduction was performed at 60° C. for 3 hours.

Then, the obtained solution was filtrated by suction filtration. For the filtration, filter paper with a particle retention capability of 1 µm was used. After that, washing and another filtration were performed.

Then, the obtained powder was ground in a mortar. Drying was performed at 170° C. under a reduced pressure for 10 hours.

Through the above steps, powdery lithium manganese complex oxide (sample C) in which graphene was formed on a surface was formed.

<Formation of Electrode>

First, a method for forming an electrode is described. The sample C formed in this example was used as an active material, and AB was used as a conductive additive. For the binder, a P-d benzoxazine compound and PVdF were used in a weight ratio of 1:1 in Electrode 3, and PVdF was used in a comparative electrode. For Electrode 3, a slurry was obtained by mixing the active material, the binder (the P-d benzoxazine compound and PVdF), AB, and NMP, which is a polarity solvent, in a mixer. The compounding ratio of the sample C to AB to the binder in the electrode binder composition was 85:5:10 (weight ratio). The proportion of the solid content in the slurry was 44%.

For the comparative electrode, a slurry was obtained by mixing the active material, PVdF, AB, and NMP in a mixer. The compounding ratio of the sample C to AB to PVdF in the electrode binder composition was 85:5:10 (weight ratio). The proportion of the solid content in the slurry was 35%.

Next, the electrode binder composition was applied to aluminum foil which was a current collector. Note that an undercoat layer was formed on a surface of the aluminum foil in advance. After that, heating was performed at 80° C. for 30 minutes in a circulation drying furnace. The electrode was pressed with a roller press machine while the press pressure was adjusted so that the thickness after application of the electrode was reduced by 20%. The press temperature was 120° C.

After that, heat treatment was performed at 270° C. in a reduced-pressure atmosphere (1 kPa) for 10 hours.

<Half Cell Characteristics>

Next, half cells were fabricated using the obtained electrodes. For the cell, a coin cell was used. Lithium was used for a counter electrode of the half cell. An electrolytic solution was formed by dissolving $LiPF_6$ as an electrolyte in a mixed solution containing EC and DEC, which are aprotic organic solvents, at a volume ratio of 1:1. As a separator, polypropylene (PP) was used. Two half cells were fabricated for each electrode.

The charge and discharge characteristics were measured at 25° C. for one of the two half cells. Constant current charging was performed at a current density per active material weight of 20 mA/g with the upper voltage limit set to 4.8 V and constant current discharging was performed at a current density per active material weight of 30 mA/g with the lower voltage limit set to 2 V.

Figure 34A:
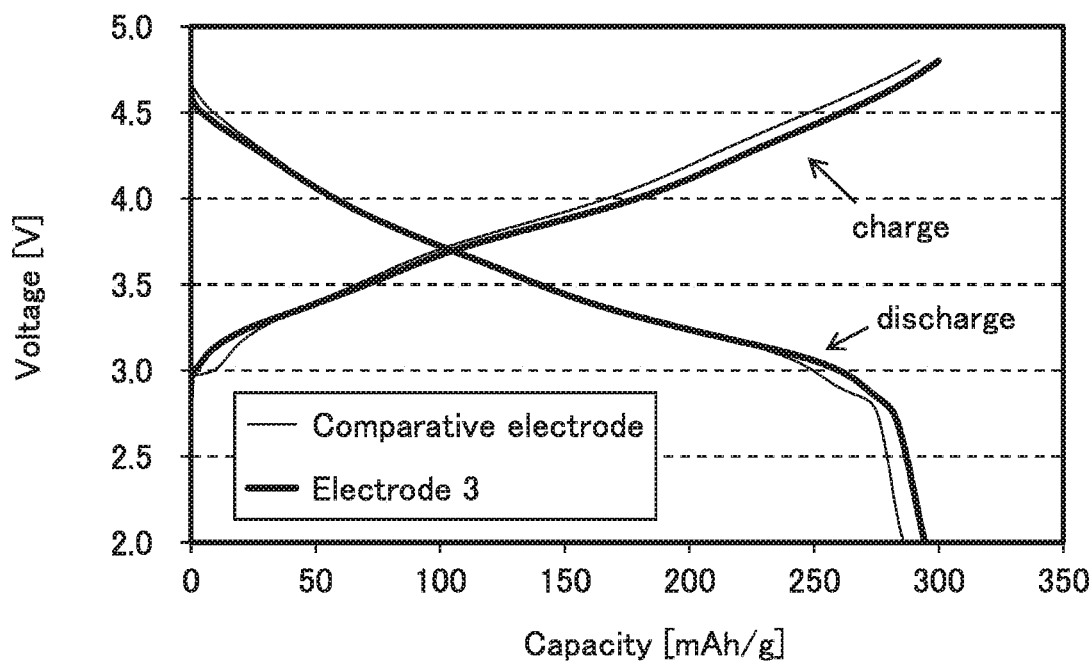
FIGS. 34A and 34B show charge and discharge characteristics and cycle characteristics in Example 2.
Figure 34B:
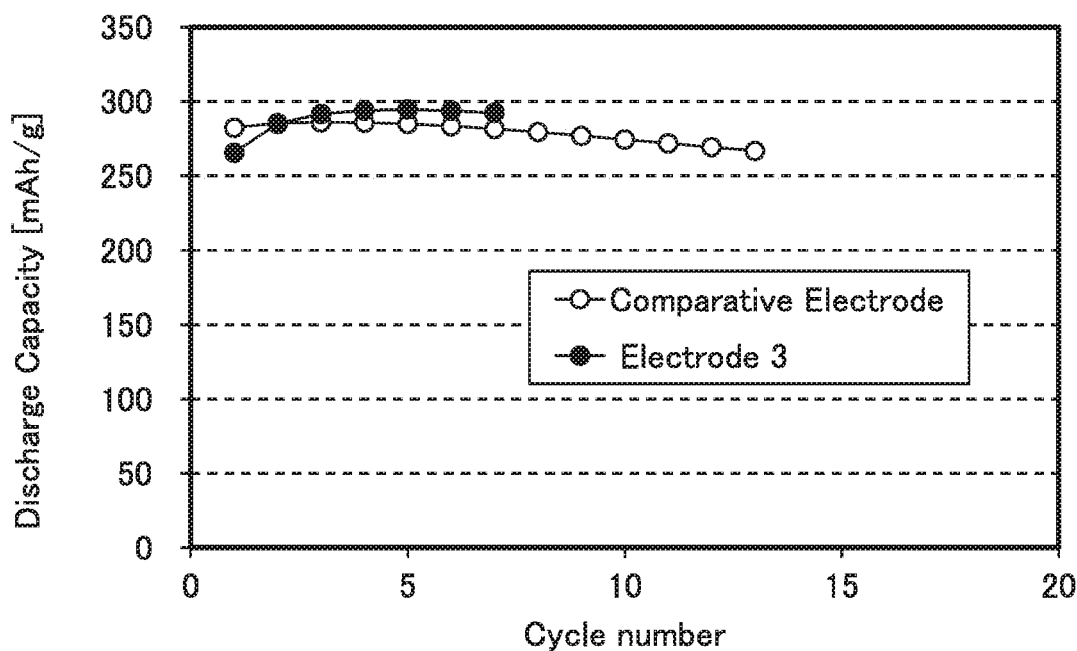

FIG. 34A shows charge and discharge curves of Electrode 3 in the fifth cycle and charge and discharge curves of the comparative electrode in the third cycle. FIG. 34B shows charge and discharge cycle characteristics.

As can be observed from FIGS. 34A and 34B, the maximum discharge capacity was higher when polybenzoxazine and PVdF were used for the binder than when only PVdF was used for the binder. As shown in FIG. 34B, Electrode 3 in which polybenzoxazine and PVdF were used for the binder exhibited higher discharge capacity than the comparative electrode in at least the third to seventh cycles. The results suggest that Electrode 3 fabricated in this example has favorable charge and discharge cycle characteristics.

The charge and discharge characteristics were measured for the other of the two half cells.

First, charging and discharging were repeated in a step-by-step manner. Specifically, constant current charging was performed at a rate of 0.1 C (current density of 30 mA/g) with a capacity of 150 mAh/g and constant current discharging was performed at a rate of 0.1 C with the lower voltage limit set to 2 V in the first cycle, constant current charging was performed at a rate of 0.1 C with a capacity of 180 mAh/g and constant current discharging was performed at a rate of 0.1 C with the lower voltage limit set to 2 V in the second cycle, constant current charging was performed at a rate of 0.1 C with a capacity of 210 mAh/g and constant current discharging was performed at a rate of 0.1 C with the lower voltage limit set to 2 V in the third cycle, constant current charging was performed at a rate of 0.1 C with a capacity of 240 mAh/g and constant current discharging was performed at a rate of 0.1 C with the lower voltage limit set to 2 V in the fourth cycle, and constant current charging was performed at a rate of 0.1 C with a capacity of 270 mAh/g and constant current discharging was performed at a rate of 0.1 C with the lower voltage limit set to 2 V in the fifth cycle.

Figure 35:
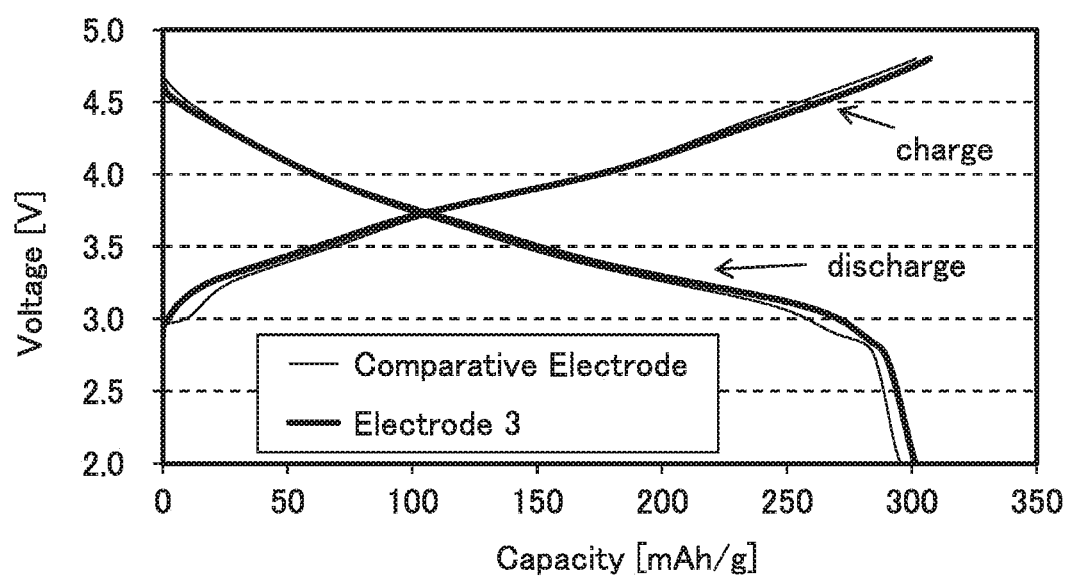
FIG. 35 shows charge and discharge characteristics in Example 2.

After that, two cycles of charging and discharging were performed. Constant current charging was performed at a current density per active material weight of 30 mA/g with the upper voltage limit set to 4.8 V and constant current discharging was performed at a current density per active material weight of 30 mA/g with the lower voltage limit set to 2 V. FIG. 35 shows charge and discharge curves of Electrode 3 and the comparative electrode in the second cycle (or the seventh cycle, the step-by-step charging and discharging included).

As can be observed from FIG. 35, the discharge capacity was higher when polybenzoxazine and PVdF were used for the binder than when only PVdF was used for the binder. Electrode 3 fabricated in this example had a discharge capacity as high as 300 mAh/g.

This application is based on Japanese Patent Application serial no. 2014-264159 filed with Japan Patent Office on Dec. 26, 2014, the entire contents of which are hereby incorporated by reference.

What is claimed is:

1. A method for manufacturing an electrode, comprising the steps of:
   forming a mixture comprising a benzoxazine monomer, an active material comprising lithium, and a solvent;
   applying the mixture over a current collector; and
   heating the mixture to form an active material layer comprising polybenzoxazine over the current collector.

2. The method according to claim 1,
   wherein the active material comprises an oxide comprising lithium, manganese and an element M, and
   wherein the element M is one element selected from the group consisting of chromium, cobalt, aluminum, nickel, iron, magnesium, molybdenum, zinc, indium, gallium, copper, titanium, niobium, silicon and phosphorus.

3. The method according to claim 1, a temperature of heating the mixture is higher than or equal to 150° C.

4. The method according to claim 1, further comprising the step of:
   evaporating the solvent after applying the mixture.

5. The method according to claim 2, wherein a particle of the active material comprises a first crystal having a layered rock-salt crystal structure.

6. The method according to claim 2,
   wherein a particle of the active material comprises a first region and a second region,
   wherein the second region is in contact with the first region,
   each of the first region and the second region comprises lithium and oxygen,
   wherein the first region comprises manganese, and
   wherein the second region comprises the element M.

7. The method according to claim 6,
   wherein the first region comprises a first crystal having a layered rock-salt crystal structure,
   wherein the second region comprises a second crystal having a layered rock-salt crystal structure, and
   wherein a direction of the first crystal and a direction of the second crystal are different from each other.

8. The method according to claim 1, wherein the mixture further comprises a fluororesin.

9. The method according to claim 1, wherein the mixture further comprises a conductive additive.

* * * * *